United States Patent
Ikeda et al.

(10) Patent No.: US 10,012,951 B2
(45) Date of Patent: Jul. 3, 2018

(54) END MEMBER, PHOTORECEPTOR DRUM UNIT, DEVELOPING ROLLER UNIT, AND PROCESS CARTRIDGE

(71) Applicant: MITSUBISHI CHEMICAL CORPORATION, Chiyoda-ku (JP)

(72) Inventors: Shuichi Ikeda, Kanagawa (JP); Yohei Matsuoka, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/402,761

(22) Filed: Jan. 10, 2017

(65) Prior Publication Data

US 2017/0146952 A1    May 25, 2017

Related U.S. Application Data

(63) Continuation of application No. PCT/JP2015/069804, filed on Jul. 9, 2015.

(30) Foreign Application Priority Data

Jul. 10, 2014  (JP) .................................. 2014-142720
Aug. 8, 2014  (JP) .................................. 2014-163063

(51) Int. Cl.
*G03G 21/18*    (2006.01)
*F16C 13/06*    (2006.01)
(Continued)

(52) U.S. Cl.
CPC ......... *G03G 21/1857* (2013.01); *F16C 13/06* (2013.01); *G03G 15/751* (2013.01); *G03G 21/1647* (2013.01); *F16C 2370/38* (2013.01)

(58) Field of Classification Search
CPC ........... G03G 21/1647; G03G 21/1857; G03G 21/186; G03G 21/1864; G03G 15/757; F16C 2370/38; F16C 13/06
See application file for complete search history.

(56) References Cited

U.S. PATENT DOCUMENTS 5,903,803 A   5/1999  Kawai et al.
6,226,478 B1  5/2001  Watanabe et al.
(Continued)

FOREIGN PATENT DOCUMENTS

JP         2875203        3/1999
JP      2008-233868      10/2008
(Continued)

OTHER PUBLICATIONS

International Search Report dated Oct. 6, 2015 in PCT/JP2015/069804 , filed on Jul. 9, 2015 (with English Translation).

(Continued)

*Primary Examiner* — Carla Therrien
(74) *Attorney, Agent, or Firm* — Oblon, McClelland, Maier & Neustadt, L.L.P.

(57) ABSTRACT

An end member (30) comprises: a tubular bearing member (40); and a shaft member (50), wherein the shaft member comprises: a shaft-like rotating shaft (51) which is disposed coaxially to the bearing member, and moves in the shaft line direction by rotating around a shaft line with respect to the bearing member; and a tip end member (55) which is disposed coaxially to the rotating shaft, and where a rotating force receiving member (58) provided with an engaging member (60) which engages with a driving shaft (70) of the image forming apparatus main body is disposed at a tip end, wherein a rotating force around the shaft line is transmitted to the rotating force receiving member, the rotating shaft, and the bearing member, in this order, and the rotating force receiving member moves to be inclined with respect to the shaft line.

12 Claims, 51 Drawing Sheets

(51) Int. Cl.
*G03G 21/16* (2006.01)
*G03G 15/00* (2006.01)

(56) References Cited

U.S. PATENT DOCUMENTS

| | | | |
|---|---|---|---|
| 6,240,266 B1 | 5/2001 | Watanabe et al. | |
| 2008/0260428 A1 | 10/2008 | Ueno et al. | |
| 2009/0317129 A1 | 12/2009 | Abe et al. | |
| 2011/0038649 A1* | 2/2011 | Miyabe | G03G 15/0896 399/119 |
| 2011/0159970 A1 | 6/2011 | Okabe | |
| 2012/0201566 A1 | 8/2012 | Abe et al. | |
| 2013/0071141 A1 | 3/2013 | Ueno et al. | |
| 2013/0164031 A1 | 6/2013 | Ueno et al. | |
| 2013/0336674 A1 | 12/2013 | Abe et al. | |
| 2014/0064783 A1 | 3/2014 | Ueno et al. | |
| 2014/0086634 A1 | 3/2014 | Ueno et al. | |
| 2014/0105639 A1* | 4/2014 | Kikuchi | G03G 15/757 399/117 |
| 2014/0153968 A1* | 6/2014 | Huck | G03G 21/1857 399/167 |
| 2015/0050048 A1* | 2/2015 | Huang | G03G 15/757 399/167 |
| 2016/0259290 A1* | 9/2016 | Ikeda | G03G 15/757 |
| 2016/0370750 A1* | 12/2016 | Ikeda | G03G 15/757 |

FOREIGN PATENT DOCUMENTS

| | | |
|---|---|---|
| JP | 2008-309871 | 12/2008 |
| JP | 2010-2688 | 1/2010 |
| JP | 2011-133682 | 7/2011 |

OTHER PUBLICATIONS

Written Opinion dated Oct. 6, 2015 in PCT/JP2015/069804, filed on Jul. 9, 2015.

Japan Institute of Invention and Innovation, Journal of Technical Disclosure No. 2010-502197, Apr. 22, 2010, pp. 18.

Office Action dated Aug. 22, 2017 in Japanese Patent Application No. 2014-163063 (with unedited computer generated English translation).

* cited by examiner

END MEMBER, PHOTORECEPTOR DRUM UNIT, DEVELOPING ROLLER UNIT, AND PROCESS CARTRIDGE

TECHNICAL FIELD

The present invention relates to a process cartridge which is mounted on an image forming apparatus, such as a laser printer or a copying machine, a photoreceptor drum unit which is disposed in the process cartridge, a developing roller unit, and an end member.

BACKGROUND ART

In an image forming apparatus which is represented by a laser printer or a copying machine, a process cartridge which is attachable to and detachable from a main body (hereinafter, referred to as an "apparatus main body") of the image forming apparatus is provided.

The process cartridge is a member which forms contents to be expressed by letters or figures and transfers the contents to a recording medium, such as a paper sheet. Therefore, in the process cartridge, the photoreceptor drum in which the transferred contents are formed is included, and various means for forming the contents to be transferred by acting on the photoreceptor drum are disposed together. Examples of these means include a developing roller unit, a charging roller unit, and means for performing cleaning.

The process cartridge attaches and detaches the same process cartridge to and from the apparatus main body for maintenance, or mounts a new process cartridge on the apparatus main body instead of disengaging an old process cartridge from the apparatus main body. Attaching and detaching the process cartridge in this manner is performed by users of the image forming apparatus themselves, and it is desirable to perform attaching and detaching as easily as possible.

Meanwhile, it is necessary that the photoreceptor drum included in the process cartridge is rotated around a shaft line during the operation thereof. Therefore, the photoreceptor drum is configured to be engaged with a driving shaft of the apparatus main body directly or via another member at least during the operation, to receive a rotating force from the driving shaft, and to rotate. Therefore, in order to attach and detach the process cartridge to and from the apparatus main body, it is necessary to release (disengage) the engagement between the driving shaft of the apparatus main body and the photoreceptor drum every time attaching and detaching occur, and to mount the process cartridge again.

Here, if it is possible to move the photoreceptor drum (process cartridge) in the shaft line direction of the driving shaft of the apparatus main body, and to attach and detach the photoreceptor drum, the above-described structure for attaching and detaching is relatively simple. However, from the viewpoint of reducing the image forming apparatus in size or ensuring an attachment and detachment space of the process cartridge, it is preferable to disengage the process cartridge from the apparatus main body to be pulled out in the direction which is different from the shaft line direction of the driving shaft, and to mount the process cartridge on the apparatus main body to be pushed from this direction.

In PTL 1, a technology in which the driving force from the apparatus main body side is transferred to the photoreceptor drum when a cover of the apparatus main body is closed, and movement to be separated is performed so that the driving force is not transferred to the photoreceptor drum when the cover is opened, is disclosed. Accordingly, the process cartridge can be attached to and detached from the apparatus main body in the direction which is different from the shaft line direction of the driving shaft.

In addition, in PTL 2, an invention in which the driving shaft of the apparatus main body and the photoreceptor drum are engaged with each other via a rotating force transmission component having a trunnion structure attached to the photoreceptor drum, and the photoreceptor drum is rotated, is disclosed. Since the rotating force transmission component can change an angle with respect to the shaft line of the photoreceptor drum by the trunnion structure, engagement and disengagement between the driving shaft of the apparatus main body and the photoreceptor drum unit is easy.

In NPL 1, a technology in which a bearing member of the photoreceptor drum unit engaged with the driving shaft is provided to be movable in the shaft line direction by an elastic member, such as a spring, is disclosed. Accordingly, while the bearing member is biased by the elastic member when attaching and detaching the bearing member and the driving shaft, the attachment and the detachment are smoothly performed by moving and retreating in the shaft line direction.

CITATION LIST

Patent Literature

[PTL 1] Japanese Patent No. 2875203
[PTL 2] JP-A-2008-233868

Non Patent Literature

[NPL 1] Japan Institute of Invention and Innovation, Journal of technical disclosure 2010-502197

SUMMARY OF INVENTION

Technical Problem

However, in the invention described in PTL 1, when attaching and detaching the process cartridge, a process of moving a rotating body in the shaft line direction of the rotating body by interlocking the rotating body with the opening and closing of a lid, is included, and a mechanism therefor is necessary.

In the invention according to PTL 2, it is possible to directly move the process cartridge in the direction (practically orthogonal direction) which is different from the shaft line direction of the photoreceptor drum, but a configuration which freely inclines the rotating force transmission component is necessary, and the structure becomes complicated. Accordingly, there has been a case where it is difficult to match the shaft line of a driving transmission shaft and the shaft line of a driven transmission shaft. In addition, the rotating force transmission component inclines greatly in this structure, and thus there has been also a case where the deterioration of accuracy of rotation transmission occurs.

In the invention according to NPL 1, there has been a case where the engagement between a groove of the rotating force transmission portion and the rotating force transmission portion on the driving shaft side is weak, and the transmission of the rotating force is not appropriately performed. In addition, when attaching and detaching the process cartridge, there has been also a case where a hooked state is generated according to the posture in the rotational direction of the member, and the attachment and the detachment are difficult.

Here, in consideration of the above-described problems, an object of the present invention is to provide an end member which can transmit an appropriate rotating force and can be smoothly attached to and detached from an apparatus main body. In addition, the present invention is to provide a photoreceptor drum unit provided with the end member, a developing roller unit, and a process cartridge.

Solution to Problem

Hereinafter, the present invention will be described. Here, a part of reference numerals in the drawings is illustrated as an example by being written in parentheses in order to make it easy to understand, but the present invention is not limited thereto.

According to the present invention, there is provided an end member (30) which is disposed in an end portion of a columnar rotating body (11) mounted on an image forming apparatus main body (2), comprising: a tubular bearing member (40); and a shaft member (50) held by the bearing member, in which the shaft member comprises: a shaft-like rotating shaft (51) which is disposed coaxially to the bearing member, and which moves in the shaft line direction by rotating around a shaft line with respect to the bearing member; and a tip end member (55) which is disposed coaxially to the rotating shaft, and where a rotating force receiving member (58) provided with an engaging member (60) which engages with a driving shaft (70) of the image forming apparatus main body is disposed at a tip end, and in which a rotating force around the shaft line is transmitted to the rotating force receiving member, the rotating shaft, and the bearing member, in this order, and the rotating force receiving member moves to be inclined with respect to the shaft line.

According to one aspect of the end member of the present invention, for example, the rotating shaft and/or the tip end member move in the direction along the shaft line direction regardless of the rotation around the shaft line of the shaft member.

According to one aspect of the end member of the present invention, for example, a range where the rotating force receiving member moves to be inclined with respect to the shaft line is larger than 0° and equal to or smaller than 18°.

According to one aspect of the end member of the present invention, for example, a range where the rotating force receiving member moves to be inclined with respect to the shaft line is larger than 0° and equal to or smaller than 10°.

According to one aspect of the end member of the present invention, for example, the engaging member (60) comprises an inclined surface inclined to the shaft line direction or a curved surface (60a, 60b, 60c).

According to one aspect of the end member of the present invention, for example, a recessed portion (60d) with which the driving shaft (70) is engaged is formed in the engaging member (60).

According to one aspect of the end member of the present invention, for example, a part (47) formed in a spiral shape is provided on an inner surface of the bearing member (40), a member (67) which moves inside the part formed in the spiral shape is provided in the rotating shaft (51), and the rotating shaft moves in the shaft line direction by rotating around the shaft line with respect to the bearing member.

According to a photoreceptor drum unit of the present invention, a photoreceptor drum which is the columnar rotating body, and the end member according to the description above which is disposed in at least one end portion of the photoreceptor drum, are provided.

According to a developing roller unit of the present invention, a developing roller which is the columnar rotating body, and the end member according to the description above which is disposed in at least one end portion of the developing roller, are provided.

A process cartridge of the present invention includes: a housing; and the photoreceptor drum unit according to the description above which is held by the housing.

A process cartridge of the present invention includes: a housing; and the developing roller unit according to the description above which is held by the housing.

Advantageous Effects of Invention

According to the present invention, it is possible to transmit a rotating force equivalent to that of the related art, and attachment to and detachment from the apparatus main body can be more smoothly performed.

DESCRIPTION OF EMBODIMENTS

Figure 1:
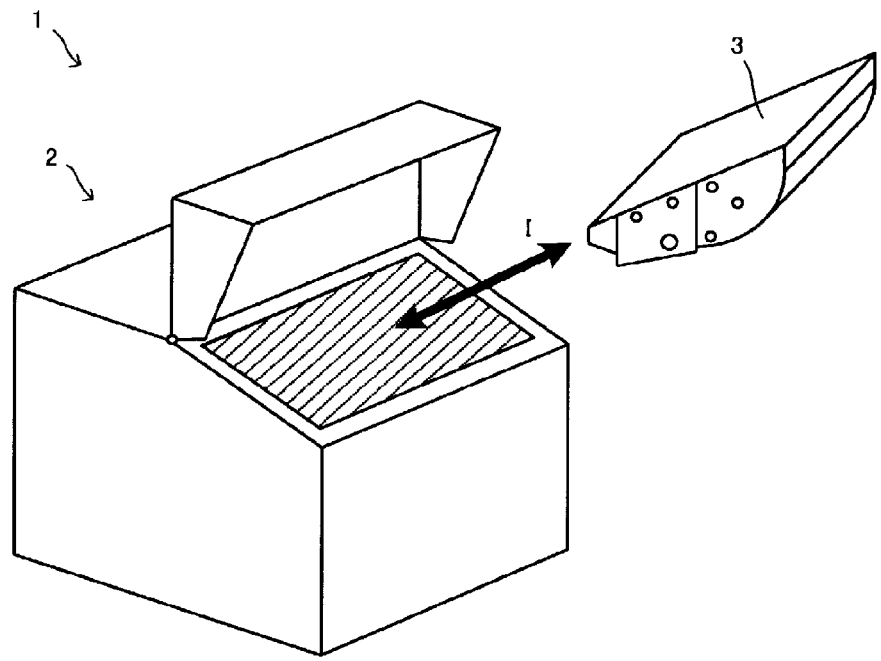
FIG. 1 is a schematic view of an image forming apparatus main body and a process cartridge.

Hereinafter, the present invention will be described based on aspects illustrated in the drawings. However, the present invention is not limited to the aspects.

FIG. 1 is a view illustrating a first aspect, and is a perspective view schematically illustrating an image forming apparatus 1 including a process cartridge 3 and an image forming apparatus main body 2 (hereinafter, there is a case of being described as "apparatus main body 2") which mounts and uses the process cartridge 3. The process cartridge 3 can be mounted on and disengaged from the apparatus main body 2 by moving in the direction illustrated by I in FIG. 1. In addition, the direction is the direction which is different from the shaft line direction of a driving shaft 70 (refer to FIGS. 15(*a*) and 15(*b*)) provided in the apparatus main body 2.

Figure 2:
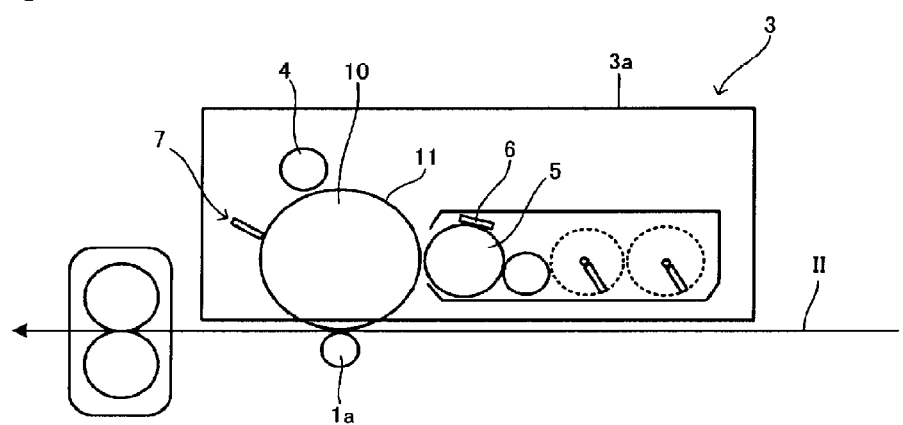
FIG. 2 is a schematic view illustrating a configuration of the process cartridge.

In FIG. 2, a structure of the process cartridge 3 is schematically illustrated. As can be ascertained from FIG. 2, the process cartridge 3 includes a photoreceptor drum unit 10 (refer to FIG. 3) on the inner side of a housing 3*a*, a charging roller unit 4, a developing roller unit 5, a regulating member 6, and a cleaning blade 7. In a posture in which the process cartridge 3 is mounted on the apparatus main body 2, as a recording medium, such as a paper sheet, moves along line illustrated by II in FIG. 2, an image is transferred to the recording medium.

In addition, the attachment and detachment of the process cartridge 3 to and from the apparatus main body 2 is generally performed as follows. As the photoreceptor drum unit 10 provided in the process cartridge 3 receives a rotation driving force from the apparatus main body 2, and rotates, a state where the driving shaft 70 (refer to FIG. 15(*a*)) of the apparatus main body 2 and an end member 30 (refer to FIG. 4) of the photoreceptor drum unit 10 are engaged with each other at least during the operation, and the rotating force can be transmitted, is achieved (refer to FIG. 16(*a*)).

Meanwhile, when attaching and detaching the process cartridge 3 to and from the apparatus main body 2, it is necessary that the driving shaft 70 and the end member 30 are promptly engaged and disengaged not to interrupt the movement each other regardless of the posture.

In this manner, the end member 30 of the photoreceptor drum unit 10 is appropriately engaged with the driving shaft 70 of the apparatus main body 2, and the rotation driving force is transmitted.

Hereinafter, each configuration will be described.

In the process cartridge 3, as can be ascertained from FIG. 2, the charging roller unit 4, the developing roller unit 5, the regulating member 6, the cleaning blade 7, and the photoreceptor drum unit 10 are provided, and these members are included inside the housing 3a. Each of these are as follows.

The charging roller unit 4 charges a photoreceptor drum 11 of the photoreceptor drum unit 10 by applying voltage from the apparatus main body 2. The charging is performed as the charging roller unit 4 rotates following the photoreceptor drum 11, and comes into contact with an outer circumferential surface of the photoreceptor drum 11.

The developing roller unit 5 is a roller which supplies a developer to the photoreceptor drum 11. In addition, an electrostatic latent image formed on the photoreceptor drum 11 is developed by the developing roller unit 5. In addition, in the developing roller unit 5, a fixed magnet is embedded.

The regulating member 6 is a member which adjusts an amount of developer adhered onto the outer circumferential surface of the above-described developing roller unit 5, and imparts a frictional electrification charge to the developer itself.

The cleaning blade 7 is a blade which comes into contact with the outer circumferential surface of the photoreceptor drum 11, and removes the developer remaining after the transfer by a tip end thereof.

Figure 3:
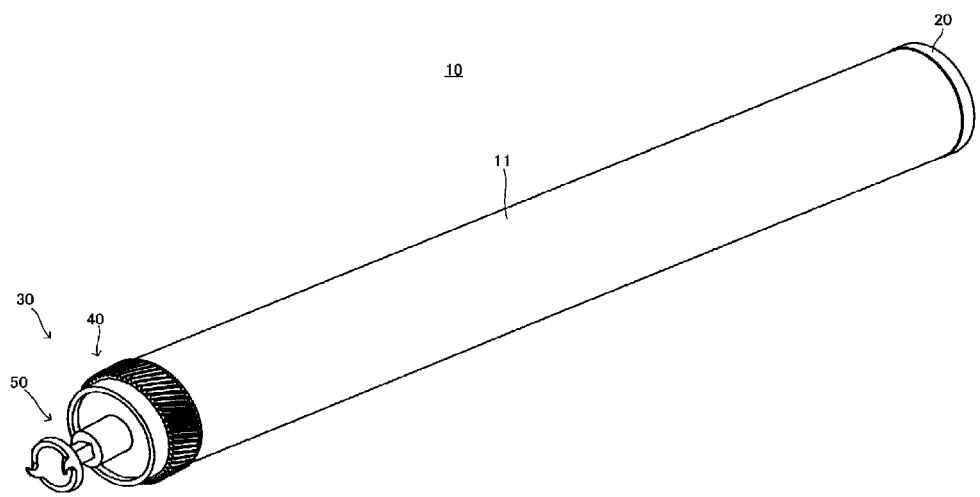
FIG. 3 is an appearance perspective view of a photoreceptor drum unit 10.

The photoreceptor drum unit 10 is provided with the photoreceptor drum 11, and here, letters or figures to be transferred to the recording medium are formed. FIG. 3 is an appearance perspective view of the photoreceptor drum unit 10. As can be ascertained from FIG. 3, the photoreceptor drum unit 10 is provided with the photoreceptor drum 11, a lid material 20, and the end member 30.

The photoreceptor drum 11 is a member which covers a photoreceptor layer on the outer circumferential surface of a drum cylinder which is a columnar rotating body. In other words, the drum cylinder is a conductive cylinder made of aluminum or the like, and here, the cylinder is coated with the photoreceptor layer. On the photoreceptor layer, characters or figures to be transferred to the recording medium, such as a paper sheet, are formed.

The base body is a member in which a conductive material made of aluminum or aluminum alloy is formed in a cylindrical shape. A type of the aluminum alloy used in the base body is not particularly limited, but 6000 series, 5000 series, and 3000 series aluminum alloys which are defined by JIS standard (JIS H 4140) which are used as the base body of the photoreceptor drum in many cases, are preferable.

In addition, the photoreceptor layer formed on the outer circumferential surface of the base body is not particularly limited, and a known material can be employed according to the purpose.

It is possible to manufacture the base body by forming the cylindrical shape by a cutting process, an extrusion processing, or a drawing processing. In addition, it is possible to manufacture the photoreceptor drum 11 by laminating by coating the outer circumferential surface of the base body with the photoreceptor layer.

In order to rotate the photoreceptor drum 11 around the shaft line as will be described later, at least two end members are attached to one end of the photoreceptor drum 11. One end member in the aspect is the lid material 20, and the other end member is the end member 30.

The lid material 20 is an end member which is disposed in an end portion on a side on which the driving shaft 70 of the apparatus main body 2 is not engaged, among the end portions in the shaft line direction of the photoreceptor drum 11. The lid material 20 is formed of a resin, and a fitting portion fitted to the cylindrical inner side of the photoreceptor drum 11, and a bearing portion disposed to cover one end surface of the photoreceptor drum 11 are coaxially formed. The bearing portion has a shape of a disk which covers the end surface of the photoreceptor drum 11, and is provided at a part which receives a shaft provided in the housing 3a. In addition, in the lid material 20, an earth plate made of a conductive material is disposed, and accordingly, the photoreceptor drum 11 and the apparatus main body 2 are electrically connected to each other.

In addition, in the aspect, an example of the lid material is illustrated, but the invention is not limited thereto, and it is possible to employ a lid material of another aspect which can be generally obtained. For example, a gear for transmitting the rotating force to the lid material may be disposed.

In addition, the above-described conductive material may be provided on the end member 30 side.

Figure 4:
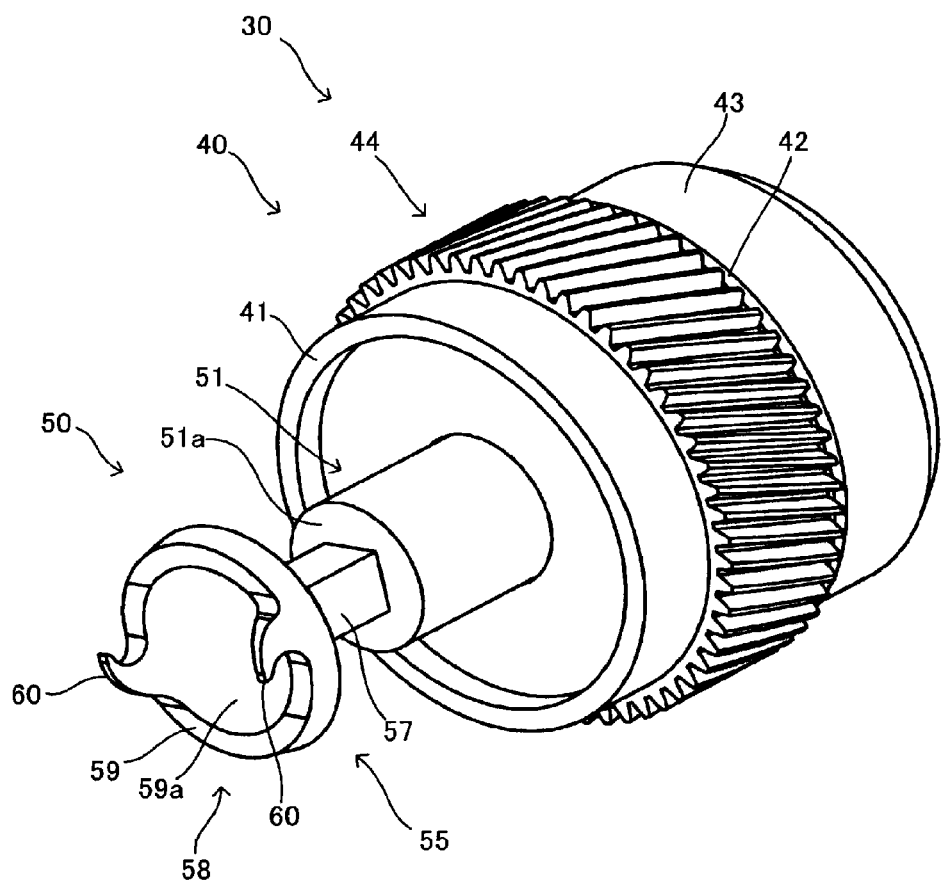
FIG. 4 is a perspective view of an end member 30.
Figure 5:
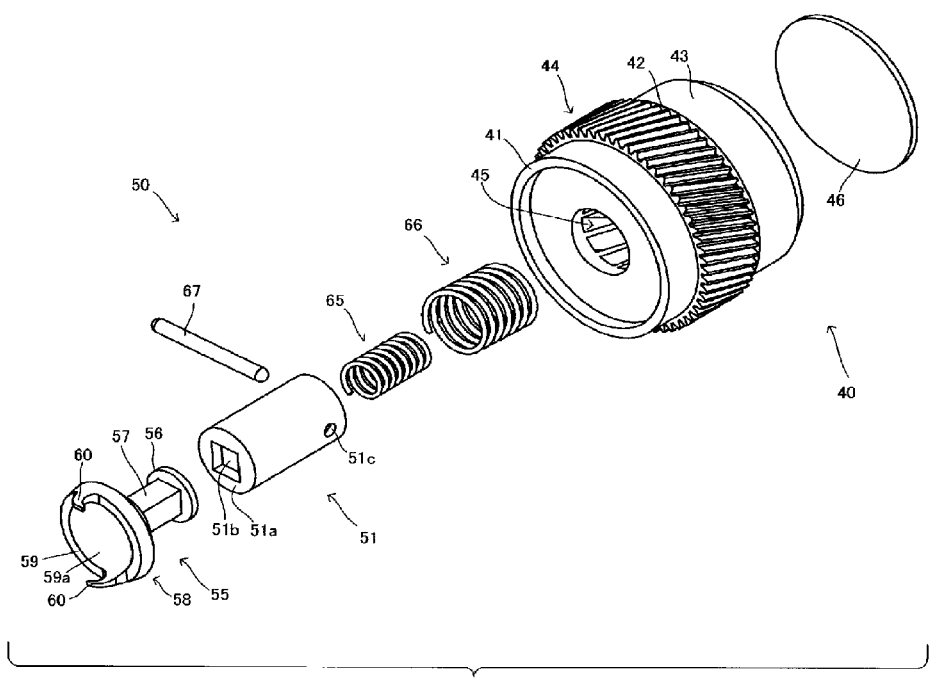
FIG. 5 is an exploded perspective view of the end member 30.

The end member 30 is a member which is attached to the end portion opposite to the lid material 20 among the end portions of the photoreceptor drum 11, and is provided with a bearing member 40 and a shaft member 50. FIG. 4 is a perspective view of the end member 30, and FIG. 5 is an exploded perspective view of the end member 30.

Figure 6A:
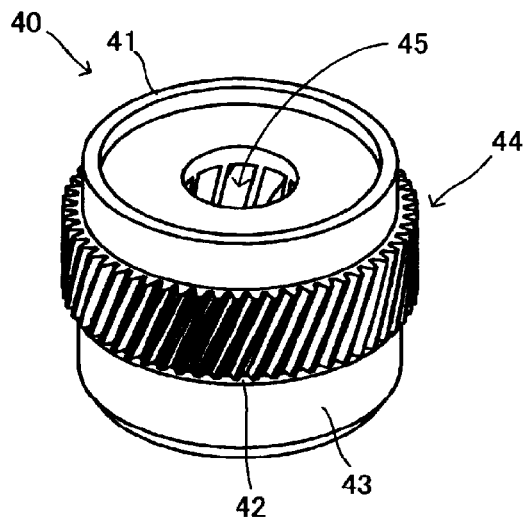
FIG. 6(a) is a perspective view of a bearing member 40.
Figure 6B:
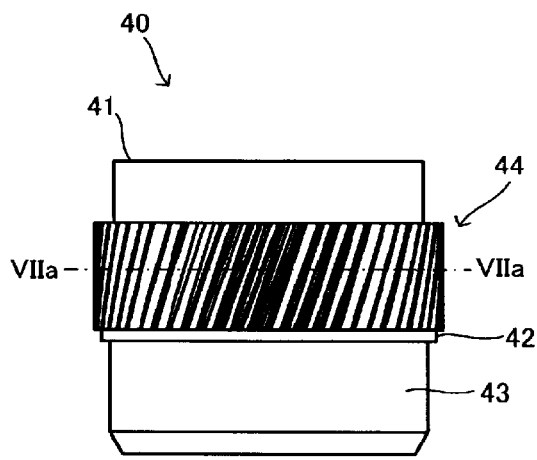
FIG. 6(b) is a front view of the bearing member 40.
Figure 6C:
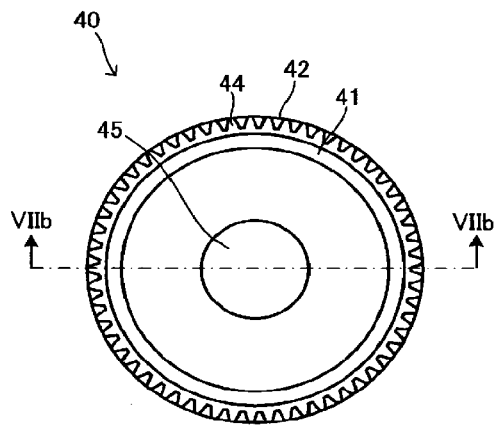
FIG. 6(c) is a plan view of the bearing member 40.
Figure 7A:
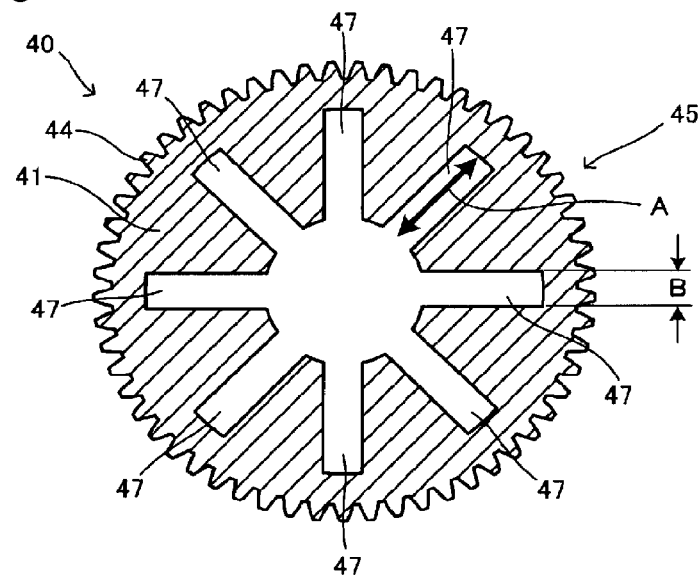
FIG. 7(a) is an end surface view orthogonal to the shaft line direction of the bearing member 40.
Figure 7B:
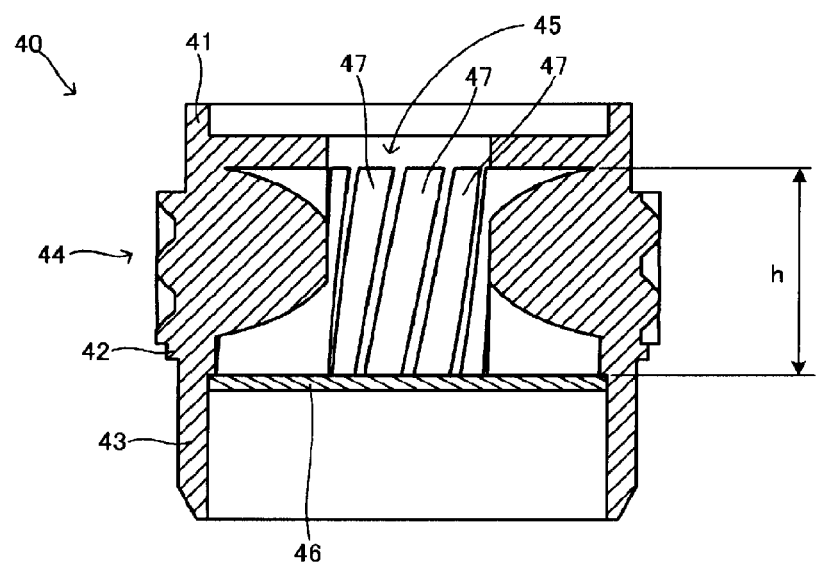
FIG. 7(b) is a sectional view along the shaft line direction of the bearing member 40.

The bearing member 40 is a member bonded to the end portion of the photoreceptor drum 11 in the end member 30. FIG. 6(a) is a perspective view of the bearing member 40, FIG. 6(b) is a front view of the bearing member 40, and FIG. 6(c) is a plan view when viewed from a side on which the shaft member 50 is disposed in the bearing member 40. Furthermore, FIG. 7(a) is an end surface view along line illustrated by VIIa-VIIa in FIG. 6(b). In other words, FIG. 7(a) is an end surface when the bearing member 40 is cut on a surface orthogonal to the shaft line of the bearing member 40. FIG. 7(b) is a sectional view along line illustrated by VIIb-VIIb in FIG. 6(c). In other words, FIG. 7(b) includes the shaft line of the bearing member 40, and is a sectional view of the bearing member 40 in the direction along the shaft line.

In addition, in each drawing illustrated below, there is a case where the end surface (cut surface) is illustrated being hatched in the sectional views.

As can be ascertained from FIGS. 4 to 7(b), the bearing member 40 is configured to include a tubular body 41, a contact wall 42, a fitting portion 43, a gear portion 44, and a shaft member holding portion 45.

The tubular body 41 is a cylindrical member as a whole, the contact wall 42 and the gear portion 44 are disposed on the outside thereof, and the shaft member holding portion 45 is formed on the inside thereof. In addition, regarding the part provided with at least the shaft member holding portion 45 on the inside of the tubular body 41, to the extent that the rotating shaft 51 (refer to FIGS. 8(a) and 8(b)) of the shaft member 50 which will be described later can smoothly move in the shaft line direction and can rotate around the shaft line, the inner diameter of the tubular body 41 and the outer diameter of the rotating shaft 51 are substantially the same as each other.

The contact wall 42 which comes into contact with and is locked to the end surface of the photoreceptor drum 11 stands from a part of the outer circumferential surface of the tubular body 41. Accordingly, in a posture in which the end member 30 is mounted on the photoreceptor drum 11, the insertion depth of the end member 30 into the photoreceptor drum 11 is regulated.

In addition, the fitting portion 43 of which one side is inserted into the photoreceptor drum 11 by nipping the contact wall 42 of the tubular body 41, is achieved. The fitting portion 43 is inserted into the photoreceptor drum 11, and is fixed to the inner surface of the photoreceptor drum 11 by an adhesive. Accordingly, the end member 30 is fixed to the end portion of the photoreceptor drum 11. Therefore, the outer diameter of the fitting portion 43 is substantially the same as the inner diameter of the photoreceptor drum 11 within a range that the photoreceptor drum 11 can be inserted into the cylindrical inside. A groove may be formed on the outer circumferential surface in the fitting portion 43. Accordingly, the groove is filled with the adhesive, and adhesiveness between the tubular body 41 (end member 30) and the photoreceptor drum 11 is improved by an anchor effect or the like.

The gear portion 44 is formed on the outer circumferential surface of the tubular body 41 opposite to the fitting portion 43 nipping the contact wall 42. The gear portion 44 is a gear which transmits the rotating force to another member, such as the developing roller unit, and in the aspect, a helical gear is disposed. However, the type of the gear is not particularly limited, and a spur gear may be disposed, and both the helical gear and the spur gear may be disposed to be aligned in the shaft line direction of the cylindrical body. In addition, it is not necessary to provide the gear.

The shaft member holding portion 45 is a part which is formed on the inside of the tubular body 41, and which has a function of ensuring a predetermined operation of the shaft member 50 and holding the shaft member 50 in the bearing member 40, and functions as one means for moving and rotating the rotating force receiving member 58 which will be described later. The shaft member holding portion 45 has a bottom plate 46 illustrated in FIGS. 5 and 7(b), and a spiral groove 47 illustrated in FIGS. 7(a) and 7(b).

The bottom plate 46 is disposed to block and partition the inside of the tubular body 41 which is a disk-like member. Accordingly, the shaft member 50 is supported. The attachment of the bottom plate 46 to the tubular body 41 can be performed by adhering or welding. In addition, the tubular body 41 and the bottom plate 46 may be integrally formed.

The spiral grooves 47 are a plurality of spiral grooves formed on the inner surface of the tubular body 41, and as illustrated by A in FIG. 7(a), the depth direction is formed in a radial shape (radial direction) around the shaft line of the tubular body 41. Meanwhile, the longitudinal direction of the spiral groove 47 is the direction along the shaft line of the tubular body 41 as illustrated in FIG. 7(b), and one end side and the other end side are twisted to be deviated in the direction along the inner circumference of the tubular body 41, and are formed in a spiral shape. In addition, as illustrated by B in FIG. 7(a), the width direction of the spiral groove 47 is formed to be substantially the same as the diameter of a pin 67 to the extent that the end portion of the pin 67 of the shaft member 50 which will be described later is inserted, and the end portion of the pin 67 can smoothly move in the groove.

In addition, one end of the spiral groove 47 in the longitudinal direction is blocked by the bottom plate 46, and the other end opposite thereto is blocked without reaching the end surface of the tubular body 41.

In addition, as a standard which illustrates the extent of twisting of the spiral groove 47, "torsion" can be defined. In other words, the "torsion" is defined from the distance (size illustrated by h in FIG. 7(b)) between the spiral grooves in the shaft line direction, and a total torsion angle which is an angle by which the spiral groove is twisted in the circumferential direction around the shaft line in the distance, and is expressed by the following equation.

Torsion (°/mm)=total torsion angle (°)/distance between the spiral grooves in the shaft line direction (mm)

Furthermore, at least one pair of plural spiral grooves 47 are provided to face each other nipping the shaft line of the tubular body 41. In the aspect, an example in which four pairs, that is, a total of eight spiral grooves 47 are formed, is employed, but one pair, that is, two spiral grooves may be formed. Meanwhile, two, three, five or more pairs of spiral grooves may be provided. When the spiral groove is injection-molded, the injection molding is performed by the releasing while rotating the mold after the injection of the material.

A material which configures the bearing member 40 is not particularly limited, but a resin, such as polyacetal, polycarbonate, or PPS, or metal can be used. Here, in order to improve the rigidity of the member in a case where the resin is used, the glass fiber or the carbon fiber may be mixed into the resin in accordance with the load torque. In addition, in order to make the attachment or the movement of the shaft member smooth, sliding properties may be improved by containing at least one type of a fluororesin, polyethylene, and silicon rubber in the resin. In addition, the resin may be coated with fluororesin or lubricant.

In a case of making the bearing member 40 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

Returning to FIGS. 4 and 5, the shaft member 50 of the end member 30 will be described. As can be ascertained from FIG. 5, the shaft member 50 is provided with the rotating shaft 51 and a tip end member 55. Furthermore, the shaft member 50 is provided with a tip end member elastic member 65, a rotating shaft elastic member 66, and the pin 67. Both of the tip end member elastic member 65 and the rotating shaft elastic member 66 in the aspect are a coiled spring.

Hereinafter, each of the members will be described.

Figure 8A:
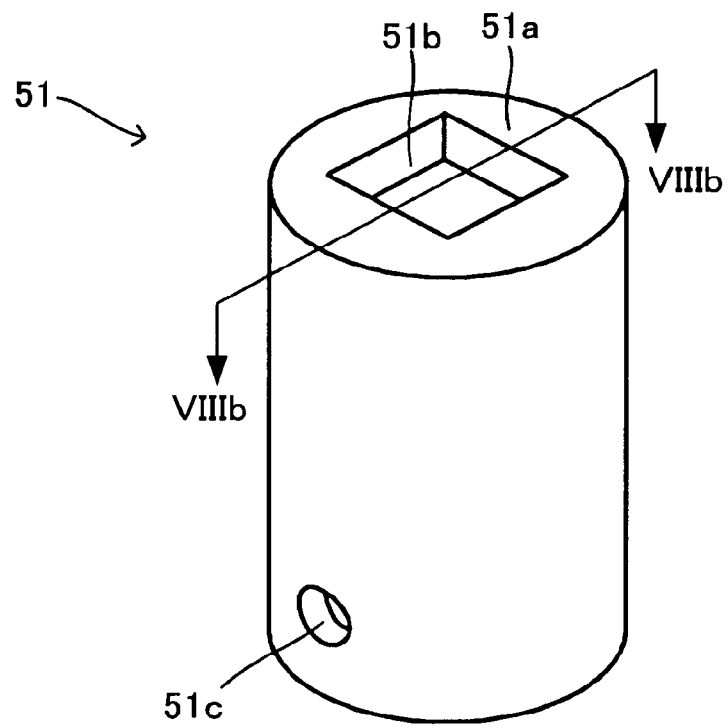
FIG. 8(a) is a perspective view of a rotating shaft 51.
Figure 8B:
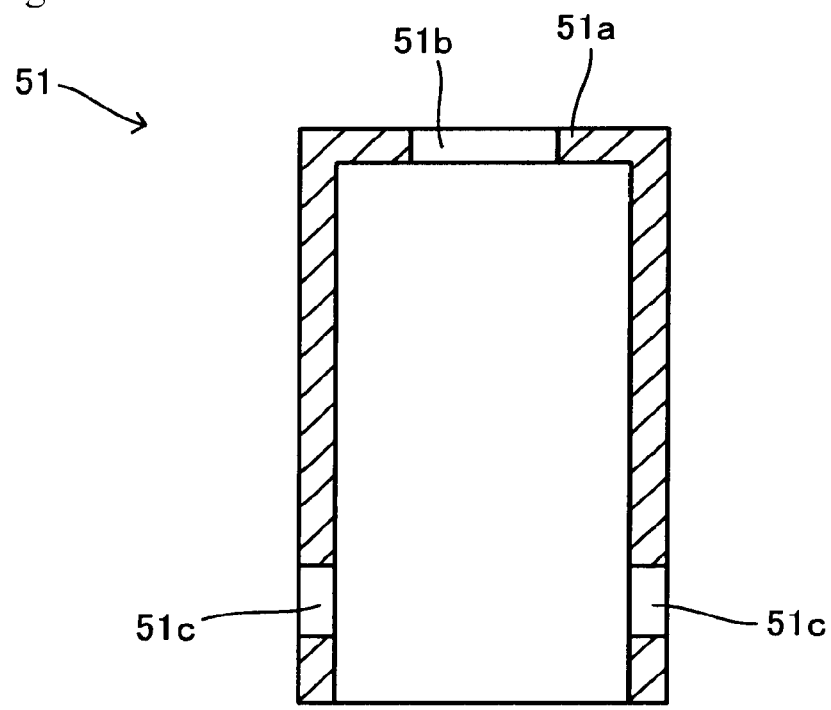
FIG. 8(b) is a sectional view of the rotating shaft 51.

The rotating shaft 51 is a rotating force transmission portion which transmits the rotating force received by the tip end member 55 to the bearing member 40, and is a shaft-like member which functions as means for moving and rotating the rotating force receiving member 58. FIG. 8(a) is a perspective view of the rotating shaft 51. FIG. 8(b) is a sectional view in the shaft line direction cut by line illustrated by VIIIb-VIIIb in FIG. 8(a).

As can be ascertained from FIGS. 8(a) and 8(b), the rotating shaft 51 is cylindrical. The cylindrical inner side has the size by which the tip end member elastic member 65 can be inserted. In the rotating shaft 51, a lid portion 51a is provided in one end portion, and an opening portion 51b narrowed with respect to the inner diameter of the cylinder is provided in the lid portion 51a. In addition, in the aspect, the opening portion 51b is rectangular. However, the shape of the opening portion is not limited to the rectangular shape, and a shape in which a shaft 57 (refer to FIG. 5) of the tip end member 55 inserted thereto does not idle, and is hooked to the opening portion 51b of the rotating shaft 51, and the rotating force can be transmitted, may be employed. Therefore, a shape other than a circular shape can be employed. Means thereof is not particularly limited if the rotating shaft 51 is interlocked to the rotation of the tip end member 55 while the movement of the tip end member 55 in the shaft line direction is possible, and for example, an additional portion, such as a pin, may be used.

In addition, in the rotating shaft 51, two pin through holes 51c, which are orthogonal to the shaft line of the cylinder, are provided in one diameter direction of the cylinder, and penetrate the inside and the outside of the cylinder, are formed in the end portion opposite to the end portion in which the lid portion 51a is disposed. The pin 67 (refer to FIG. 5) passes through the pin through hole 51c, as will be described later.

Figure 9A:
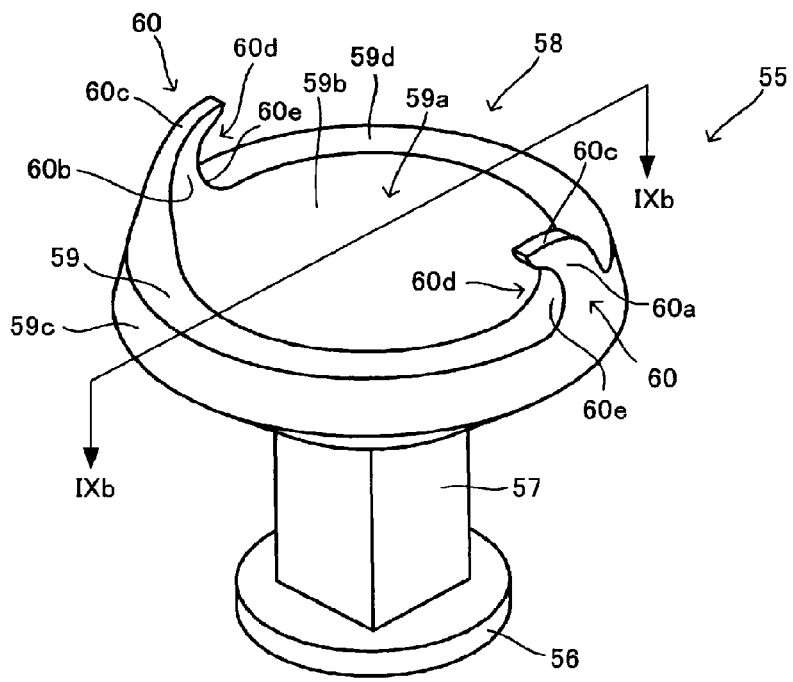
FIG. 9(a) is a perspective view of a tip end member 55.
Figure 9B:
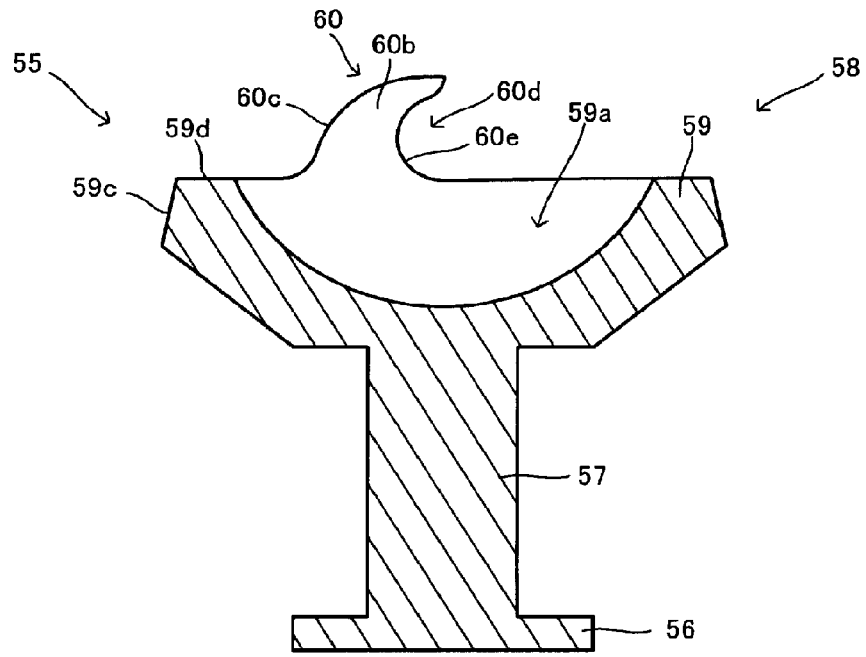
FIG. 9(b) is a sectional view of the tip end member 55.
Figure 10A:
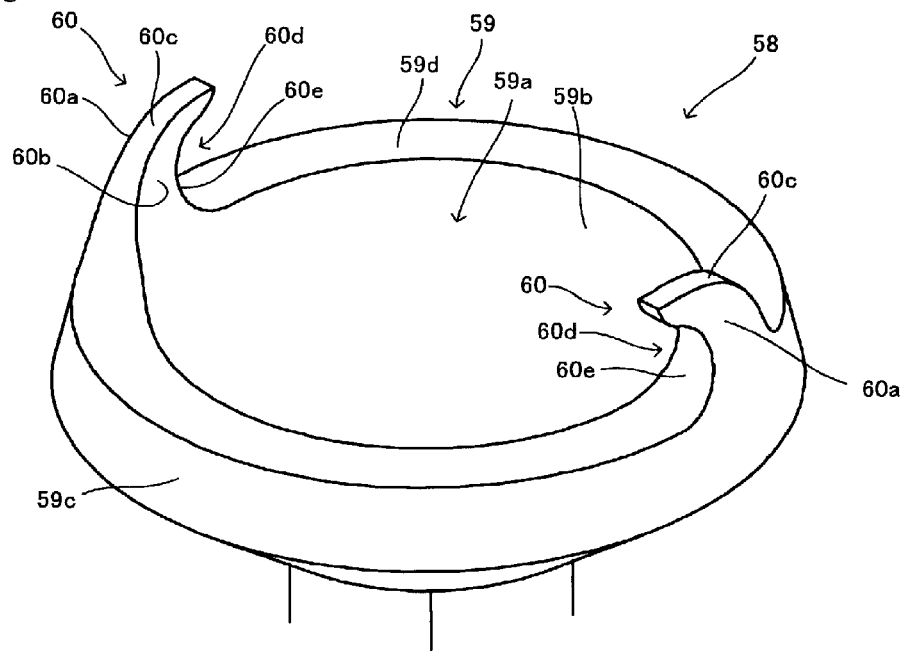
FIG. 10(a) is a perspective view of a rotating force receiving member 58.
Figure 10B:
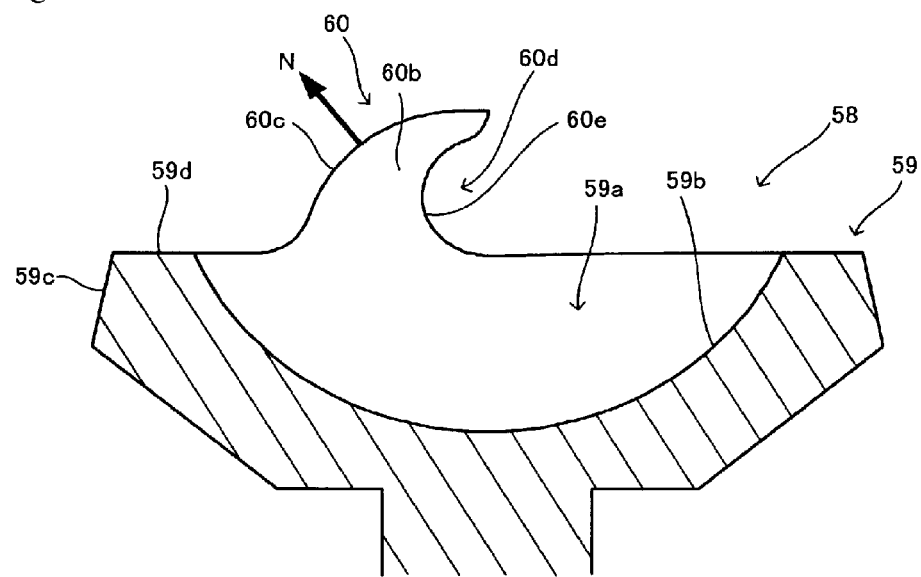
FIG. 10(b) is a sectional view of the rotating force receiving member 58.

The tip end member 55 is a member which receives the rotation driving force from the apparatus main body 2 (refer to FIG. 1) and transmits the driving force to the rotating shaft 51. FIG. 9(a) is a perspective view of the tip end member 55. FIG. 9(b) is a sectional view in the shaft line direction of the tip end member 55 cut by line illustrated by IXb-IXb in FIG. 9(a). FIG. 10(a) is a view which is enlarged focusing on the part of the rotating force receiving member 58 in FIG. 9(a), and FIG. 10(b) is a view which is enlarged focusing on the part of the rotating force receiving member 58 in FIG. 9(b).

As can be ascertained from FIGS. 9(a) and 9(b), the tip end member 55 is configured to include the shaft 57, a holding member 56, and the rotating force receiving member 58.

The shaft 57 is a pillar-like member, and is a quadrangular prism having a rectangular section in the aspect. A sectional shape of the shaft 57 is formed to be substantially the same as or slightly smaller than the opening portion 51b of the above-described rotating shaft 51.

The holding member 56 is a plate-like member which is disposed in one end portion of the shaft 57. The holding member 56 and the shaft 57 are disposed in an aspect in which one surface of the holding member 56 overlaps one end surface of the holding member 56. Both the holding member 56 and the shaft 57 may be formed separately and be adhered and welded to each other, or may be integrally formed.

As illustrated in FIGS. 9(a) and 9(b), the holding member 56 is formed to be greater than the shaft 57 in the direction orthogonal to the shaft line direction. The size and the shape are configured to be stored on the inner side of the above-described rotating shaft 51, and not to pass through the opening portion 51b. Accordingly, it is possible to hold the tip end member 55 in the rotating shaft 51. In the aspect, an outer shape of the holding member 56 is substantially the same aspect (that is, a circular shape) as the sectional shape of the inner side of the rotating shaft 51.

The rotating force receiving member 58 is disposed in the end portion opposite to the holding member 56 of the shaft 57, and is configured to include two engaging members 60 which stand from a columnar receiving member 59 and one end surface of the receiving member 59. The shaft 57 and the rotating force receiving member 58 may be formed separately and be adhered and welded to each other, or may be integrally formed.

The receiving member 59 is disposed coaxially to the shaft 57 by a member which considers a column provided in the end portion opposite to the holding member 56 of the end portion of the shaft 57, as a base body.

The receiving member 59 has an inclined surface 59c which is inclined in the direction along the shaft line direction in the outer circumferential portion thereof. As illustrated in FIGS. 9(b) and 10(b), the inclined surface 59c is an inclination of which the diameter becomes smaller when approaching the engaging member 60 side, and an end portion thereof is connected to an end surface (edge portion 59d) provided with the engaging member 60 in the receiving member 59.

Furthermore, in the receiving member 59, a recessed portion 59a is formed on a surface on a side on which the engaging member 60 is formed. The recessed portion 59a is formed so that the tip end portion of the driving shaft 70 (refer to FIG. 15(a)) which will be described later enters here, and accordingly, the shaft line of the shaft member 50 (end member 30) and the shaft line of the driving shaft 70 match each other. In addition, it is preferable that a bottom surface 59b of the recessed portion 59a is a smoothly inclined surface or a bent surface from the viewpoint of smooth engagement to and disengagement from the driving shaft 70. From the related viewpoint, it is preferable that the recessed portion 59a becomes a part of a spherical surface in which the shaft line portion is considered as the deepest portion.

Two engaging members 60 are projection-like member, are disposed in the outer circumferential end portion on the surface opposite to the side which is connected to the shaft 57 in the receiving member 59, and are separated from the shaft line of the receiving member 59 at the same distance. Both engaging members 60 are disposed at symmetrical positions nipping the shaft line. The interval between two engaging members 60 is formed to be substantially the same as or slightly greater than the diameter of a shaft portion 71 of the driving shaft 70 (refer to FIG. 15(a)). In addition, as can be ascertained with reference to FIG. 16(a), the interval between two engaging members 60 is configured so that an engaging projection 72 is hooked to the engaging member 60, in a posture in which the shaft portion 71 of the driving shaft 70 is disposed between two engaging members 60.

How the rotating force can be received from the driving shaft 70 will be described later.

Here, the engaging members 60 are configured as a pair of two engaging members 60. In the aspect, an example in which one pair of engaging members 60 is disposed is described, but two pairs (four members), three pairs (six members), or more pairs of engaging members may be provided.

The engaging member 60 has a shape illustrated in FIGS. 9(a) to 10(b), but the shape of the surface which forms the engaging member 60 is as follows. A surface 60a which becomes an outer circumferential side of the receiving member 59 on the surface of the engaging member 60, is the surface 60a which is continuous to the inclined surface 59c formed on the outer circumference of the receiving member 59. Therefore, the surface 60a is inclined or bent to be close to the shaft line according to the separation from the recessed portion 59a.

A surface 60b which faces the recessed portion 59a side on the surface of the engaging member 60, is the surface 60b which is continuous to the bottom surface 59b of the recessed portion 59a. Therefore, the surface 60b is inclined or bent to be separated from the shaft line according to the separation from the recessed portion 59a.

A surface 60c which is one surface which faces the receiving member 59 in the circumferential direction on the surface of the engaging member 60 is inclined or bent in the direction in which a normal line (for example, line illustrated by N in FIG. 10(b)) is separated from the receiving member 59 at any part.

A surface 60e which is the other one surface that is a surface opposite to the surface 60c on the surface of the engaging member 60, and faces the receiving member 59 in the circumferential direction, has an inclined or curved surface to form a recessed portion 60d. Therefore, the recessed portion 60d is a recessed portion which is recessed in the circumferential direction of the receiving member 59. A part of the engaging projection 72 of the driving shaft 70 on the inner side of the recessed portion 60d enters the recessed portion 60d, and the recessed portion 60d is forming to have the size by which the engaging projection 72 is engaged with the engaging member 60.

Here, in two engaging members 60, in the circumferential direction of the receiving member 59, the surfaces 60e of one engaging member 60 are aligned to face the surfaces 60c of the other engaging member 60. In addition, the recessed portion 60d is formed to be recessed in the rotational direction in which the driving force is transmitted, in the engaging member 60. Accordingly, as will be described later, it is possible to appropriately engage the engaging projection 72 of the driving shaft 70.

Returning to FIG. 5, other configuration elements provided in the shaft member 50 will be described. The tip end member elastic member 65 and the rotating shaft elastic member 66 are so-called elastic members, and both of the tip end member elastic member 65 and the rotating shaft elastic member 66 function as means for moving and rotating the rotating force receiving member 58. In the aspect, both are the coiled springs. In addition, the pin 67 is the means for moving and rotating the rotating force receiving member 58, and is a rod-like member which functions as a projection that moves on the inner side of the spiral groove 47. The dispositions and the actions of each member will be described later.

A material which configures each member of the shaft member 50 is not particularly limited, but various types of resin or metal can be used.

In a case of making the shaft member 50 by the resin, for example, polyacetal, polycarbonate, polyphenylene sulfide (PPS), polyamide imide (PAI), polyetherether ketone (PEEK), polyether imide (PEI), 4F-perfluoro alkyl vinyl ether (PFA), polyether sulfone (PES), liquid crystal polymer (LCP) resin, or polyamide MXD6 (PA-MXD6), can be appropriately used. However, in order to improve the rigidity of the member, the glass fiber or the carbon fiber may be mixed into the resin in accordance with the load torque. In addition, by inserting metal into the resin, the rigidity may further be improved.

Meanwhile, in a case of making the shaft member 50 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the shaft member 50 and any of member included in the shaft member 50, may be made by bending a metal plate, or may be made by making the metal, glass, or carbon fiber infiltrate into the resin.

Figure 11:
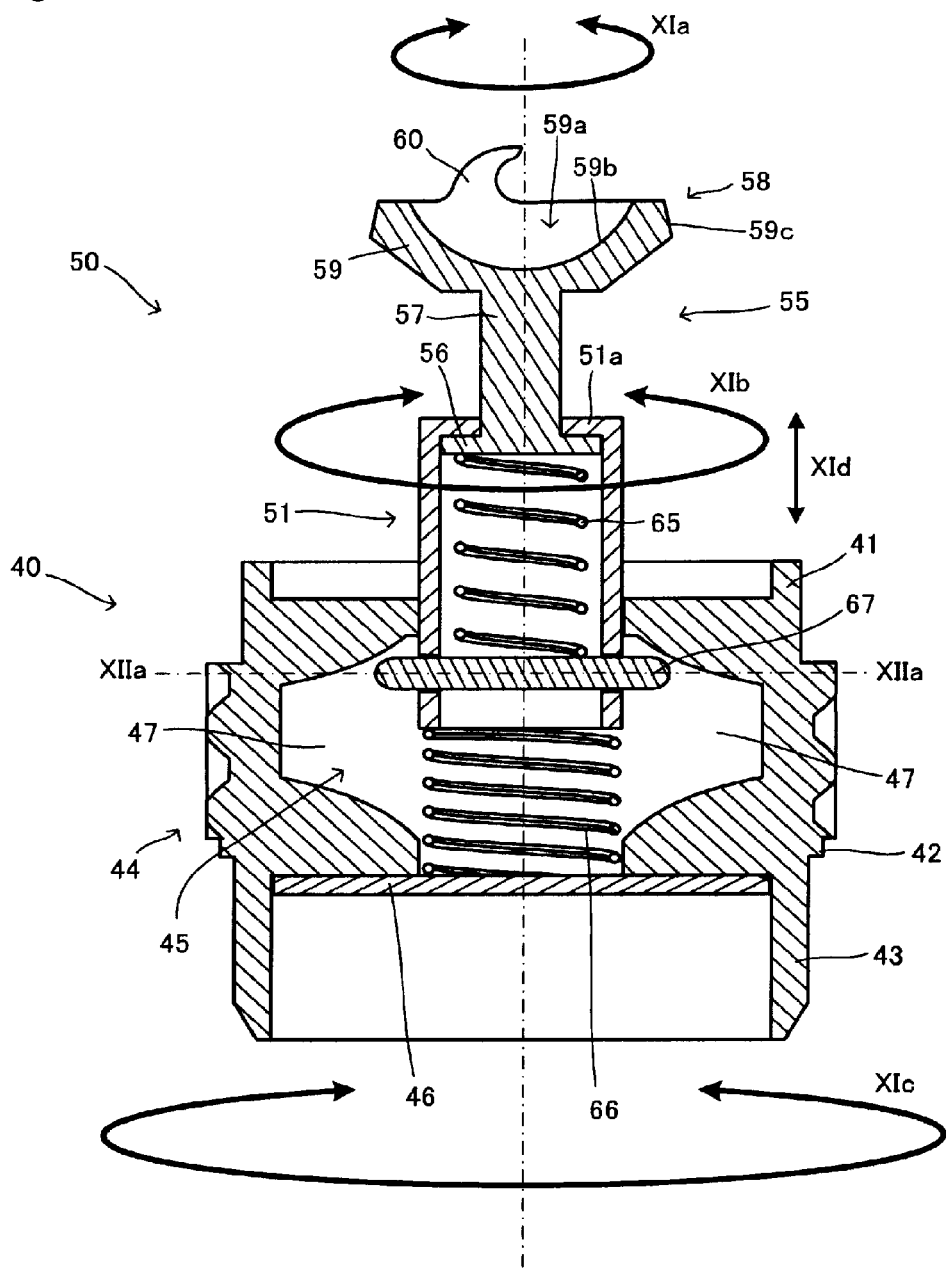
FIG. 11 is a sectional view of the end member 30.
Figure 12A:
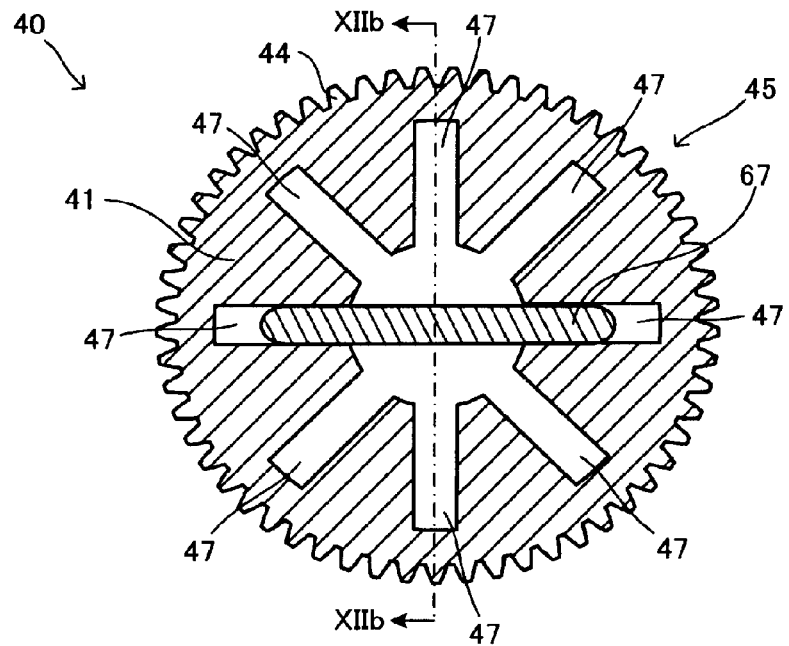
FIG. 12(a) is an end surface view orthogonal to the shaft line direction of the end member 30.
Figure 12B:
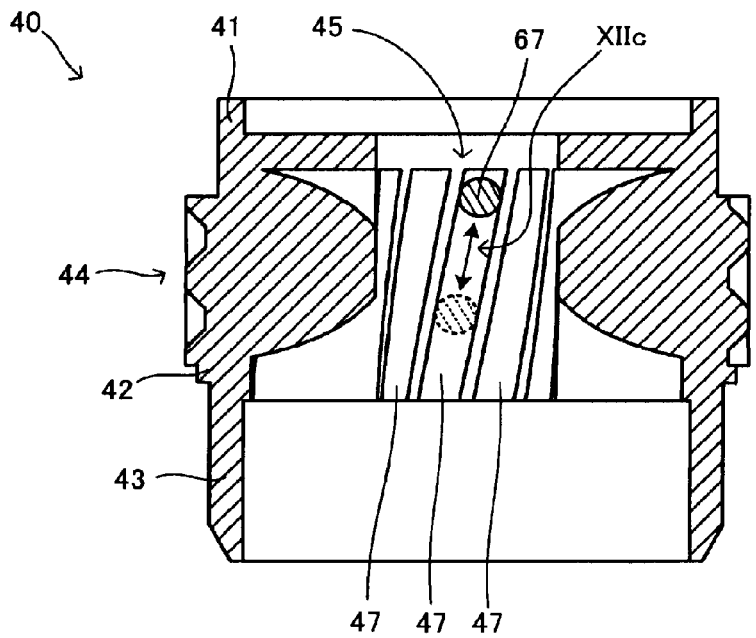
FIG. 12(b) is a sectional view along the shaft line direction of the end member 30.

By combining the bearing member 40 and the shaft member 50 with each other as follows, the end member 30 is made. In addition, by describing the combination, the size of each member and part, the structure, or the relationship of the sizes of the members and parts, are further understood. FIG. 11 is a sectional view in the shaft line direction of the end member 30. FIG. 12(a) is an end surface view of the end member 30 along line illustrated by XIIa-XIIa in FIG. 11. FIG. 12(b) is a sectional view of the end member 30 by line illustrated by XIIb-XIIb in FIG. 12(a). However, in FIGS. 12(a) and 12(b), for making it easy to understand, regarding the shaft member 50, only the pin 67 is illustrated.

As can be ascertained from FIG. 11, the shaft 57 of the tip end member 55 passes through the opening portion 51b of the rotating shaft 51. At this time, the holding member 56 of the tip end member 55 is included on the inner side of the rotating shaft 51, and the rotating force receiving member 58 of the tip end member 55 is disposed to protrude from the rotating shaft 51.

Meanwhile, the pin 67 passes to cross over the two pin through holes 51c of the rotating shaft 51. At this time, both ends of the pin 67 respectively protrude from the side surface of the rotating shaft 51, and function as projections.

In addition, the tip end member elastic member 65 is disposed between the holding member 56 of the tip end member 55 and the pin 67 on the inner side of the rotating shaft 51. Therefore, one side of the tip end member elastic member 65 comes into contact with the holding member 56, and the other side thereof comes into contact with the pin 67. Accordingly, the tip end member 55 is biased in the direction in which the tip end member elastic member 65 biases the tip end member 55 and makes the tip end member 55 protrude from the rotating shaft 51. However, since the holding member 56 cannot pass through the opening portion 51b of the rotating shaft 51, the tip end member 55 is held in a state of being biased without falling out of the rotating shaft 51.

In this manner, in the rotating shaft 51 combined by the tip end member 55, the tip end member elastic member 65, and the pin 67, the side on which the tip end member 55 is not disposed is inserted toward the bottom plate 46 side of the shaft member holding portion 45 formed on the inner side of the bearing member 40. At this time, as illustrated in FIGS. 12(a) and 12(b), the end portion of the pin 67 protruded from the side surface of the rotating shaft 51 is inserted into the spiral groove 47 formed in the shaft member holding portion 45 of the bearing member 40.

In addition, as can be ascertained from FIG. 11, on the inner side of the bearing member 40, the rotating shaft elastic member 66 is disposed between the rotating shaft 51 and the bottom plate 46. Therefore, one side of the rotating shaft elastic member 66 comes into contact with the rotating shaft 51, and the other side of the rotating shaft elastic member 66 comes into contact with the bottom plate 46. Accordingly, the rotating shaft 51 is biased in the direction in which the rotating shaft elastic member 66 biases the rotating shaft 51 and makes the rotating shaft 51 including the tip end member 55 protrude from the bearing member 40. However, since the tip end of the pin 67 is inserted into the spiral groove 47 of the bearing member 40, and both ends of the spiral groove 47 are blocked as described above, the rotating shaft 51 is held in a state of being biased without falling out of the bearing member 40.

Above, in the posture in which each member is combined, the shaft lines of the bearing member 40, the rotating shaft 51, and the tip end member 55 match each other.

Figure 13:
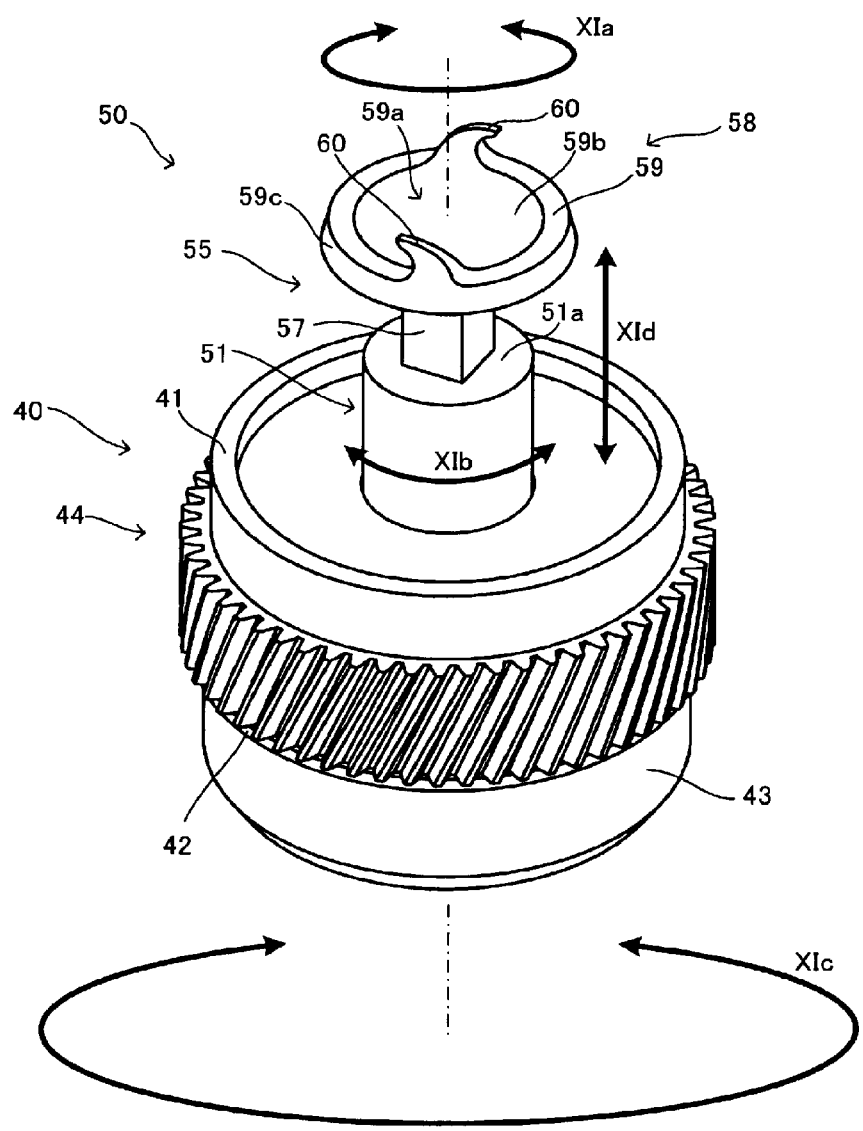
FIG. 13 is a perspective view of the end member 30.

Next, how the end member 30 can be deformed, move, and rotate, will be described. FIG. 13 is a perspective view in one posture of the end member 30.

In the postures illustrated in FIGS. 11 to 13, the entire shaft member 50 is in a posture of being protruded the most from the bearing member 40 within a possible range, by the tip end member elastic member 65 and the rotating shaft elastic member 66. When external force is not applied to the shaft member 50, the end member 30 is in this posture.

From this posture, as illustrated by an arrow XIa in FIGS. 11 and 13, when the rotating force around the shaft line is applied to the rotating force receiving member 58 of the tip end member 55, following this, the shaft 57 rotates. Since the shaft 57 and the opening portion 51b of the rotating shaft 51 do not idle, the rotating force is transmitted to the rotating shaft 51, and as illustrated by an arrow XIb in FIGS. 11 and 13, the rotating shaft 51 also rotates.

When the rotating shaft 51 rotates in this manner, the pin 67 also rotates. Then, firstly, the pin 67 presses the side wall of the spiral groove 47, transmits the rotation to the bearing member 40, and as illustrated by an arrow XIc in FIGS. 11 and 13, the bearing member 40 rotates. Accordingly, the photoreceptor drum 11 attached to the bearing member 40 also rotates around the shaft line.

Secondly, since the tip end of the pin 67 is inserted into the spiral groove 47, when the rotating shaft 51 rotates, as illustrated by an arrow XIIc in FIG. 12(b), the pin 67 also moves in the shaft line direction. Accordingly, the rotating shaft 51 to which the pin 67 is attached, and the tip end member 55 attached thereto, also moves against the biasing force of the rotating shaft elastic member 66 as illustrated by an arrow XId in FIGS. 11 and 13, or in the biasing direction.

Therefore, in the end member 30, according to the rotation of the rotating force receiving member 58, the rotation around the shaft line of the end member 30 and the movement of the rotating shaft 51 and the tip end member 55 in the direction along the shaft line, are also performed.

Figure 14:
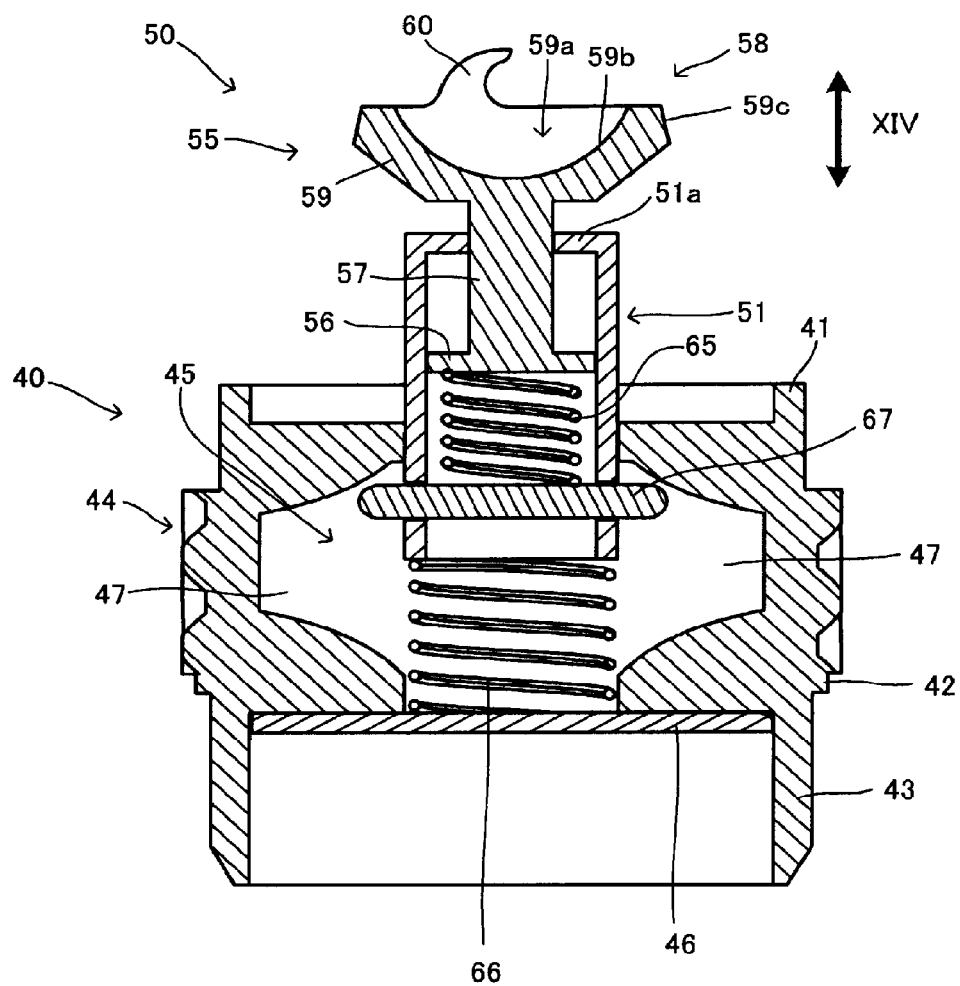
FIG. 14 is a sectional view of the end member 30.

In addition to the description above, the end member 30 can be deformed as follows. FIG. 14 is a view illustrating this. FIG. 14 is a view from the same viewpoint as that of FIG. 11. In other words, in the end member 30, when the force is applied to the rotating force receiving member 58 of the tip end member 55 in the shaft line direction, other members are not deformed as illustrated by an arrow XIV in FIG. 14, and only the tip end member 55 moves in the shaft line direction.

Figure 16A:
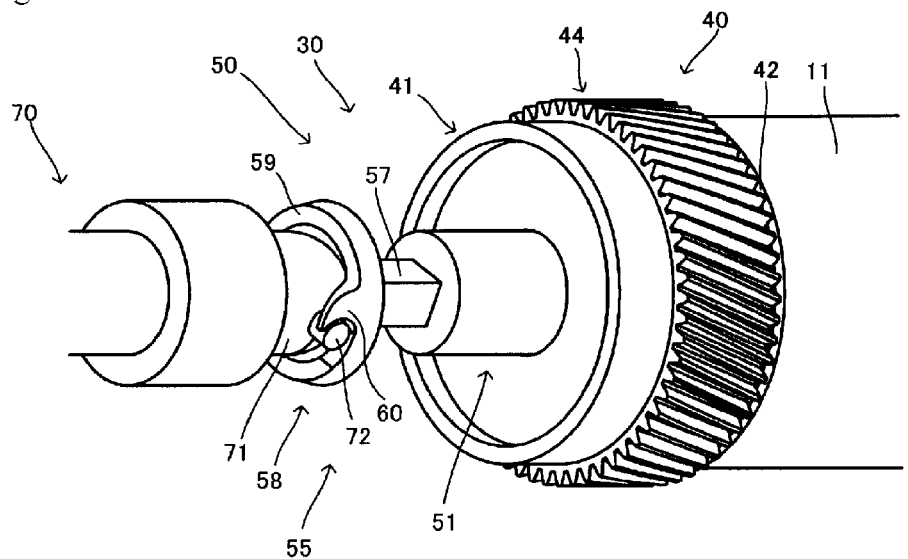
FIG. 16(a) is a perspective view of a situation in which the driving shaft 70 and the end member 30 are engaged with each other.
Figure 17:
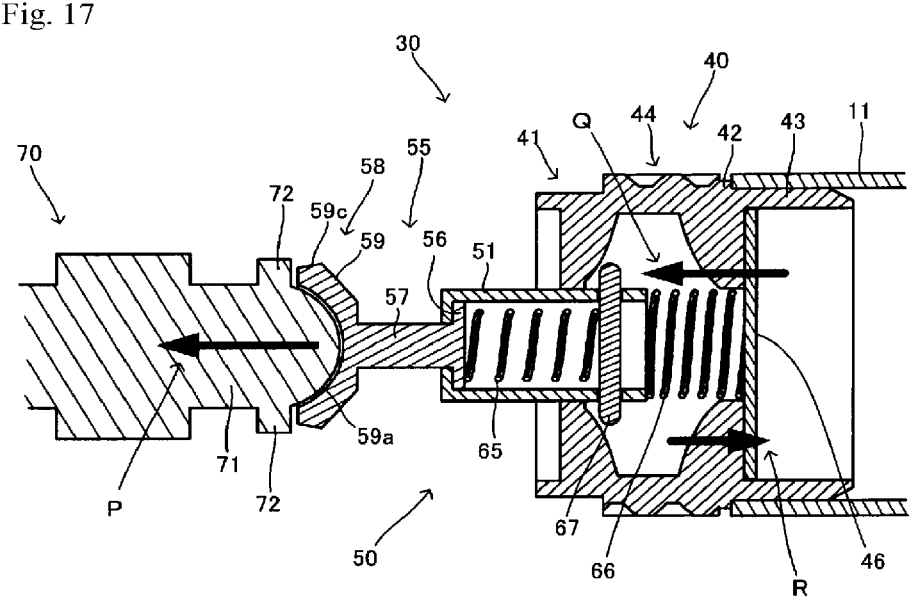
FIG. 17 is a sectional view along the shaft line direction of a situation in which the driving shaft 70 and the end member 30 are engaged with each other.

As illustrated in FIG. 3, in the above-described end member 30, the fitting portion 43 of the end member 30 is inserted and adhered to one end portion of the photoreceptor drum 11 (refer to FIGS. 16(a) and 17). In addition, the lid material 20 is disposed in the other end portion of the photoreceptor drum 11, and the photoreceptor drum unit 10 can be made. In the photoreceptor drum unit 10, the shaft lines of the end member 30, the photoreceptor drum 11, and the lid material 20 match each other.

Next, the apparatus main body 2 will be described. The apparatus main body 2 in the aspect is a main body of a laser printer. In the laser printer, the above-described process cartridge 3 operates in a mounted posture, and when the image is formed, the photoreceptor drum 11 is rotated, and charging is performed by the charging roller. In this state, the photoreceptor drum 11 is irradiated with the laser light which corresponds to image information by using various optical members provided here, and the electrostatic latent image which is based on the image information is obtained. The latent image is developed by the developing roller unit.

Meanwhile, the recording medium, such as a paper sheet, is set in the apparatus main body 2, and is conveyed to a transfer position by a sending roller or a conveying roller, which is provided in the apparatus main body 2. A transfer roller 1a (refer to FIG. 2) is disposed at the transfer position, voltage is applied to the transfer roller following the passage of the recording medium, and the image is transferred to the recording medium from the photoreceptor drum 11. After this, the image is fixed to the recording medium as heat and voltage are applied to the recording medium. In addition, the recording medium on which the image from the apparatus main body 2 is formed is discharged by a discharge roller.

In this manner, in a posture in which the process cartridge 3 is mounted, the apparatus main body 2 applies the rotation driving force to the photoreceptor drum unit 10. Here, how the rotation driving force is applied to the photoreceptor drum unit 10 from the apparatus main body 2 in a posture in which the process cartridge 3 is mounted, will be described.

Figure 15A:
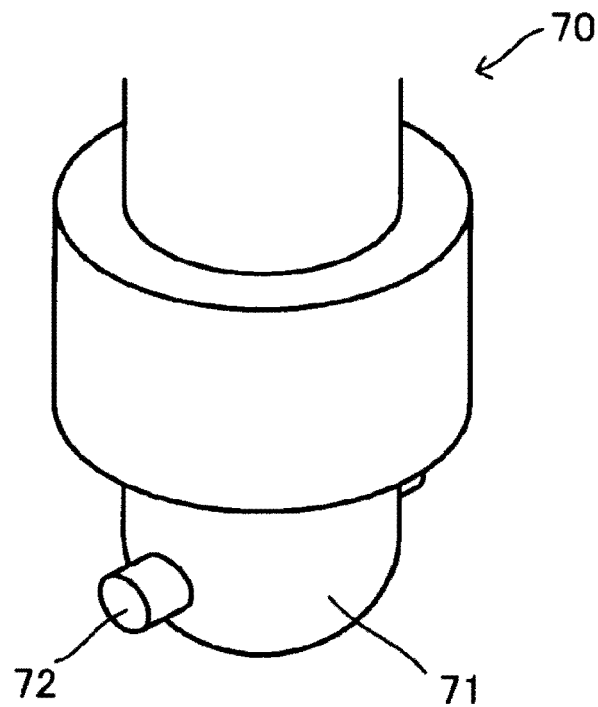
FIG. 15(a) is a perspective view of a driving shaft 70.
Figure 15B:
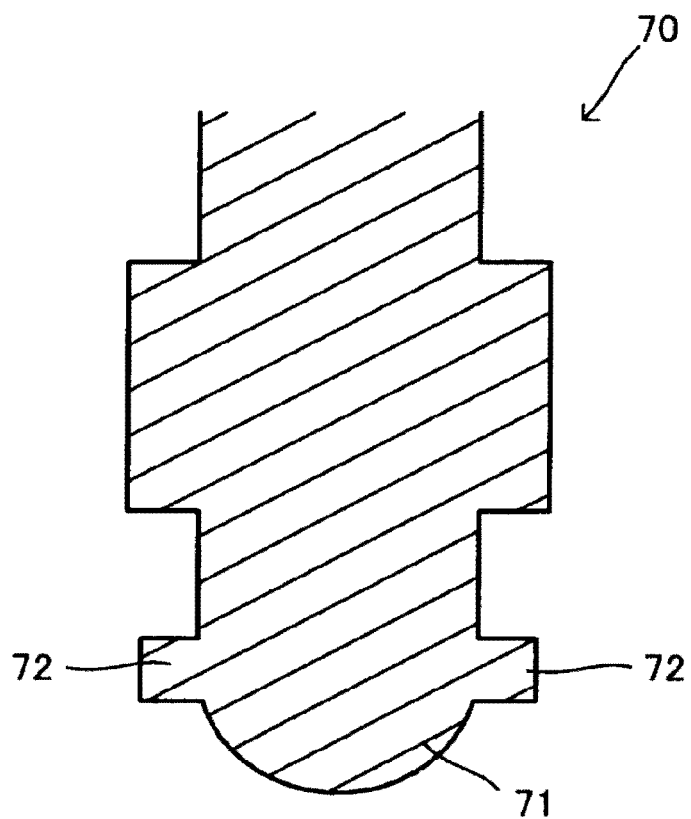
FIG. 15(b) is a sectional view of the driving shaft 70.

The rotation driving force to the process cartridge 3 is applied by the driving shaft 70 which serves as a rotating force imparting portion of the apparatus main body 2. FIG. 15(a) is a perspective view of the shape of the tip end portion of the driving shaft 70. In addition, FIG. 15(b) is a sectional view along the shaft line direction of the driving shaft 70. As can be ascertained from the drawings, the driving shaft 70 is configured to include the shaft portion 71 and the engaging projection 72.

The shaft portion 71 is a shaft member which rotates around the shaft line. In the aspect, as can be ascertained from FIGS. 15(a) and 15(b), the tip end thereof is formed in a hemispherical shape. In addition, the tip end portion of the shaft portion 71 has a size to be capable of being disposed between two engaging members 60 (for example, refer to FIG. 4) of the rotating force receiving member 58 of the above-described shaft member 50. In this manner, as a smooth shape in which angle portions are removed in the tip end portion, the driving shaft 70 and the shaft member 50 are smoothly engaged with each other corresponding to the shape of the receiving member 59 of the rotating force receiving member 58.

On the side opposite to the tip end side illustrated in FIG. 15(a) of the shaft portion 71, a gear train is formed to be capable of rotating the shaft portion 71 around the shaft line, and is connected to a motor which is a driving source via the gear train.

The engaging projections 72 are two pillar-like members which are provided to be close to the tip end of the shaft portion 71, and extend in the direction orthogonal to the shaft line of the shaft portion 71. In addition, the two engaging projections 72 are disposed in one same diameter direction on the section of the shaft portion 71.

Here, the shaft portion 71 of the driving shaft 70 is disposed to protrude substantially perpendicularly to the moving direction for attaching and detaching the process cartridge 3 to and from the apparatus main body 2 illustrated by I in FIG. 1. In addition to this, the shaft portion 71 only rotates without moving in the shaft line direction. Therefore, in attaching and detaching the process cartridge 3, it is necessary to mount and disengage the shaft member 50 to and from the driving shaft 70. In addition, according to the above-described end member 30, it becomes easy to mount and disengage the shaft member 50 to and from the driving shaft 70. A specific aspect of the attachment and detachment will be described later.

Figure 16B:
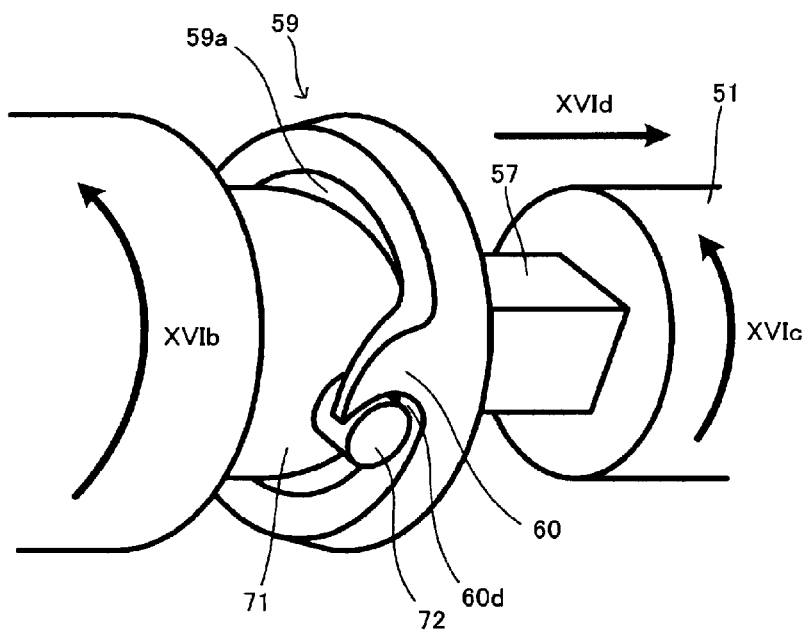
FIG. 16(b) is an enlarged perspective view of the engaged part.

In a posture in which the process cartridge 3 is mounted on the apparatus main body 2, the driving shaft 70 and the rotating force receiving member 58 provided in the shaft member 50 of the end member 30 are engaged with each other, and the rotating force is transmitted. FIG. 16(*a*) is a perspective view illustrating a situation in which the rotating force receiving member 58 of the end member 30 is engaged with the driving shaft 70. In addition, FIG. 16(*b*) is an enlarged view illustrating the engaged situation. Furthermore, FIG. 17 is a sectional view along the shaft line direction.

As can be ascertained from FIGS. 16(*a*), 16(*b*), and 17, in the posture in which the driving shaft 70 and the rotating force receiving member 58 are engaged with each other, the shaft line of the driving shaft 70 and the shaft line of the shaft member 50 are disposed to abut against each other to match each other. At this time, the tip end of the shaft portion 71 of the driving shaft 70 gets into between two engaging members 60 of the rotating force receiving member 58, and is disposed on the inner side of the recessed portion 59*a* of the receiving member 59.

In addition, the engaging projection 72 of the driving shaft 70 is engaged to be hooked to the engaging member 60 of the rotating force receiving member 58 from the side surface. At this time, the engaging projection 72 gets into the inner side of the recessed portion 60*d* of the engaging member 60.

In this posture, as illustrated in by an arrow XVIb in FIG. 16(*b*), when the driving shaft 70 rotates in the rotating force transmitting direction, the engaging projection 72 enters the recessed portion 60*d* of the engaging member 60, and is hooked to the engaging member 60, and the rotating force is transmitted as illustrated by an arrow XVIc in FIG. 16(*b*). At this time, the rotating shaft 51 moves in the direction illustrated by XVId in FIG. 16(*b*) by the actions of the spiral groove 47 of the bearing member 40 and the pin 67. However, since the engaging projection 72 of the driving shaft 70 gets into and is engaged with the recessed portion 60*d* of the engaging member 60 of the rotating force receiving member 58, the engagement of the engaging projection 72 and the recessed portion 60*d* is not released, and stable linking is maintained. A force which moves in the direction illustrated by an arrow XVId is a force which pulls the driving shaft 70, and the force acts to further stabilize the rotation.

However, at this time, the pulling force by the spiral groove 47 is weaker than the force by which the engaging member 60 is engaged with the driving shaft 70. More specifically, it is preferable to configure as follows.

As schematically illustrated in FIG. 17, it is preferable that the following established expression in a pulling force by the engaging member illustrated by P, a biasing force of the rotating shaft elastic member illustrated by Q, and a force in the shaft line direction by the spiral groove illustrated by R, is the condition of the rotation driving.

$$R \leq P + Q$$

Here, P is a force which moves in the direction of approaching the driving shaft of the apparatus main body during the driving rotation by the shape of the engaging member of the tip end member, Q is a force which is generated by the rotating shaft elastic member, and moves in the direction of approaching the driving shaft of the apparatus main body, and R is a force which is generated by the spiral groove of the main body during the rotation driving, and is moved in the direction of separating the rotating shaft from the driving shaft of the apparatus main body.

Figure 20A:
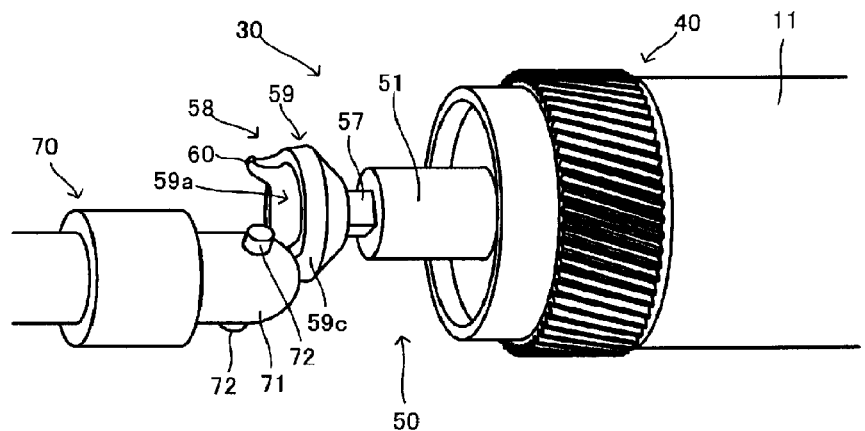
FIG. 20(*a*) is a perspective view illustrating a situation in which the driving shaft 70 and the photoreceptor drum unit 10 are engaged with each other, FIG. 20(*b*) is a perspective view illustrating another situation in which the driving shaft 70 and the photoreceptor drum unit 10 are engaged with each other, and FIG. 20(*c*) is a perspective view illustrating still another situation in which the driving shaft 70 and the photoreceptor drum unit 10 are engaged with each other.

Next, an example of operations of the driving shaft 70 and the photoreceptor drum unit 10 will be described when the process cartridge 3 is mounted on the apparatus main body 2, and is in a posture illustrated in FIGS. 16(*a*), 16(*b*), and 17. The description of the first example is illustrated in FIGS. 18(*a*) to 18(*c*) and 19, and the description of the second example is illustrated in FIGS. 20(*a*) to 20(*c*) and 21.

Figure 18A:
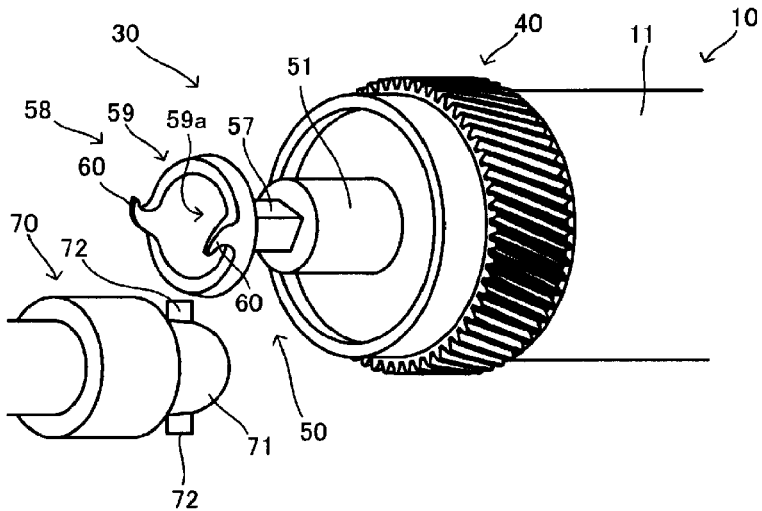
FIG. 18(a) is a perspective view illustrating a situation in which the driving shaft 70 and the photoreceptor drum unit 10 are engaged with each other.
Figure 18B:
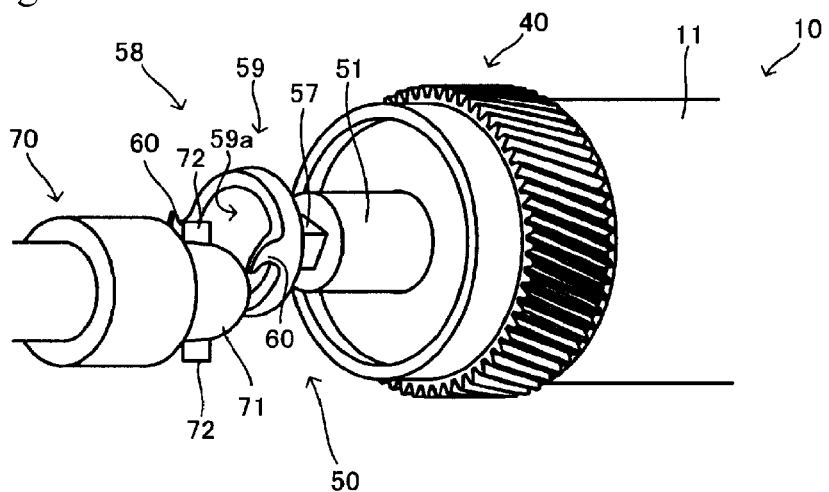
FIG. 18(b) is a perspective view illustrating another situation in which the driving shaft 70 and the photoreceptor drum unit 10 are engaged with each other.
Figure 18C:
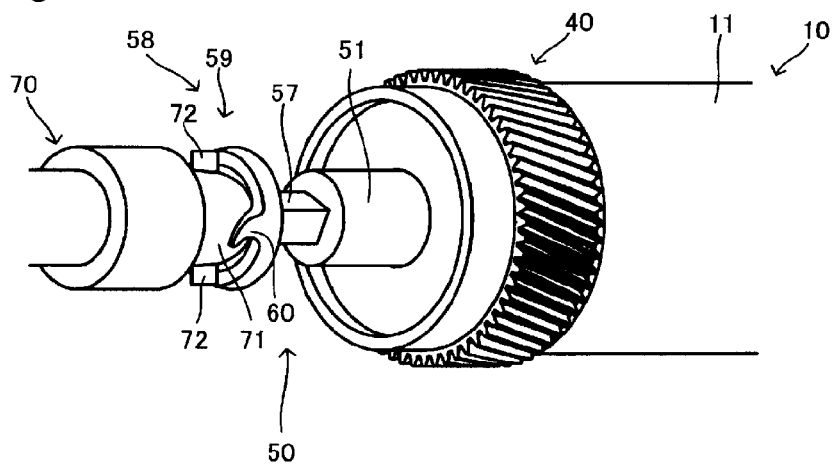
FIG. 18(c) is a perspective view illustrating still another situation in which the driving shaft 70 and the photoreceptor drum unit 10 are engaged with each other.
Figure 19:
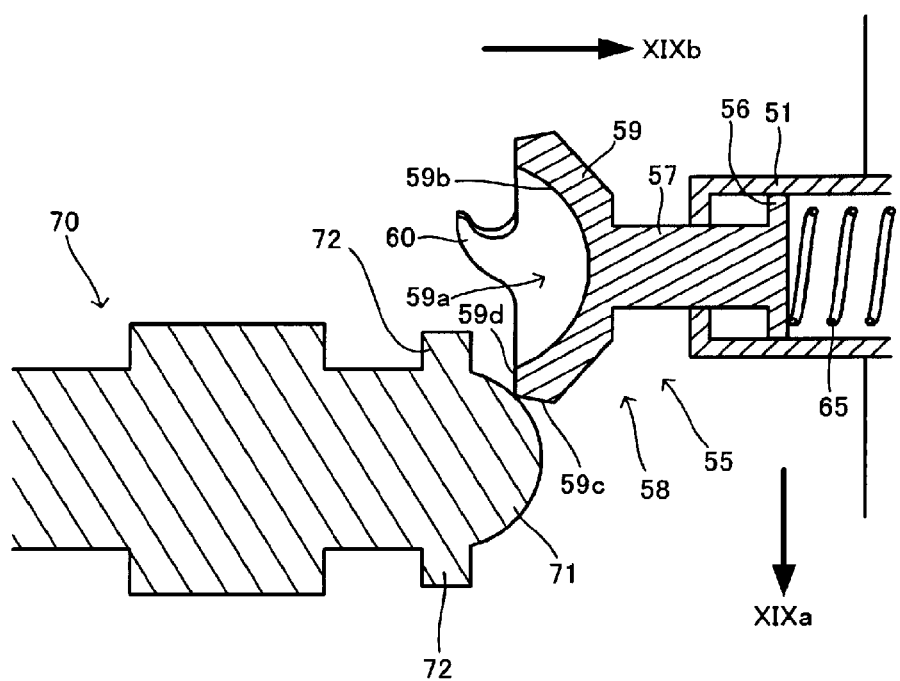
FIG. 19 is a sectional view along the shaft line direction in the situation of FIG. 18(*b*).

Regarding the first example, FIGS. 18(*a*) to 18(*c*) are perspective views following the order of a process in which the driving shaft 70 is engaged with the rotating force receiving member 58. FIG. 19 is a sectional view of the posture of FIG. 18(*b*) along the shaft line direction.

First, from the direction orthogonal to the shaft line direction of the driving shaft 70 as illustrated in FIG. 18(*b*) from the state illustrated in FIG. 18(*a*), the photoreceptor drum unit 10 approaches. At this time, the end member 30 is oriented toward the driving shaft 70 side, the shaft line has an orientation parallel to the shaft line of the driving shaft 70, and the photoreceptor drum unit 10 approaches the driving shaft 70 while moving in the direction orthogonal to the shaft line. At this time, the shaft member 50 is in a posture illustrated in FIG. 11.

In a situation illustrated in FIGS. 18(*b*) and 19, the driving shaft 70 comes into contact with the outer circumferential surface of the receiving member 59 of the rotating force receiving member 58. At this time, as illustrated in FIG. 19, the tip end member 55 moves in the direction illustrated by an arrow XIXb, with respect to the movement in the direction illustrated by an arrow XIXa of the photoreceptor drum unit 10 (modification described in FIG. 14). Therefore, the tip end of the driving shaft 70 climbs over the edge portion 59*d* of the rotating force receiving member 58, and a posture illustrated in FIG. 18(*c*) is achieved. After this, as the driving shaft 70 is rotated, a posture illustrated in FIG. 16(*a*) is achieved.

Here, as illustrated in FIGS. 18(*b*) and 19, as the inclined surface 59*c* is provided in the outer circumferential portion of the receiving member 59, the tip end member 55 more smoothly moves (movement in the direction of the arrow XIXb).

Figure 20B:
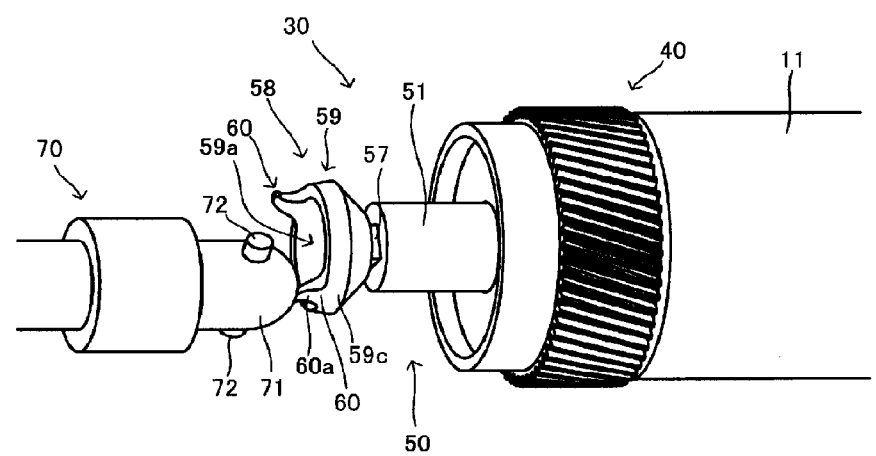

Regarding the second example, FIGS. 20(*a*) to 20(*c*) are perspective views of an order of a process in which the driving shaft 70 is engaged with the rotating force receiving member 58. FIG. 21 is a sectional view of the posture of FIG. 20(*b*) along the shaft line direction.

First, from the direction orthogonal to the shaft line direction of the driving shaft 70 as illustrated in FIG. 20(*b*) from the state illustrated in FIG. 20(*a*), the photoreceptor drum unit 10 approaches. At this time, the end member 30 is oriented toward the driving shaft 70 side, the shaft line has an orientation parallel to the shaft line of the driving shaft 70, and the photoreceptor drum unit 10 approaches the driving shaft 70 while moving in the direction orthogonal to the shaft line. At this time, the shaft member 50 is in a posture illustrated in FIG. 11.

Figure 20C:
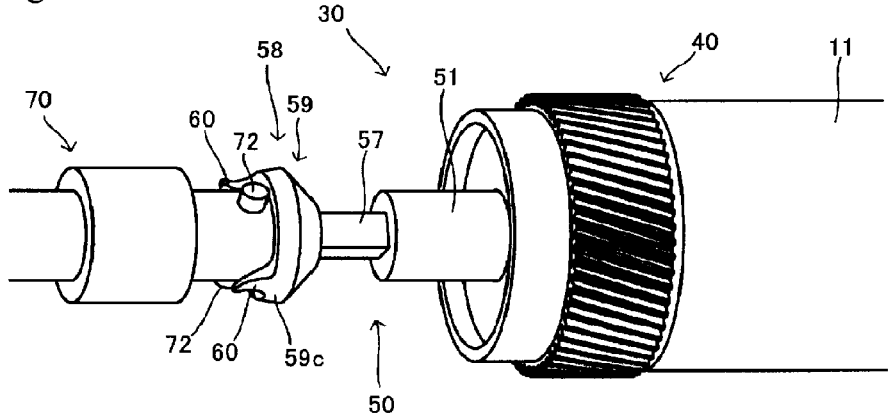
Figure 21:
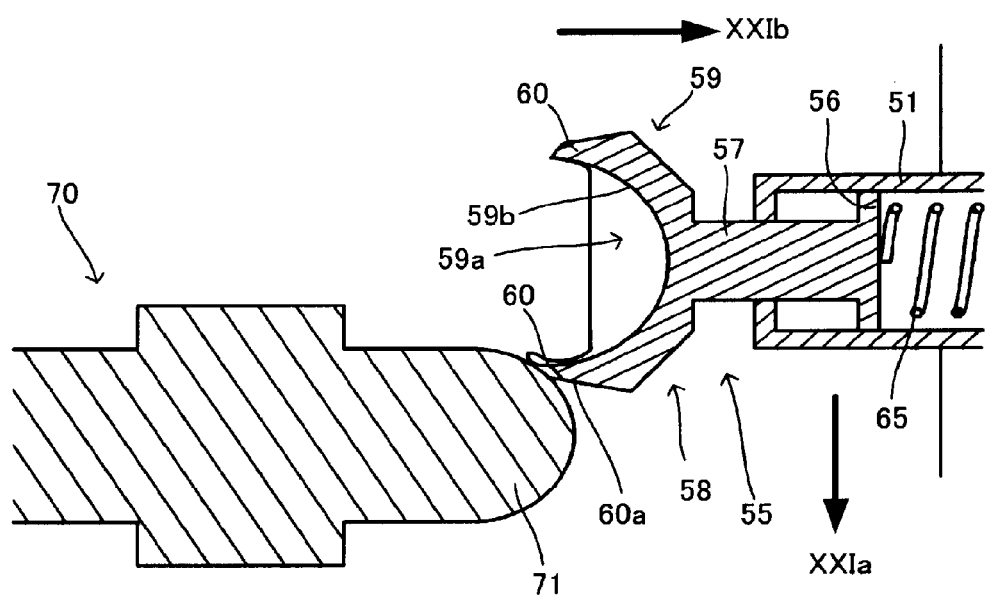
FIG. 21 is a sectional view along the shaft line direction in the situation of FIG. 20(*b*).

In a situation illustrated in FIGS. 20(*b*) and 21, the driving shaft 70 comes into contact with surface 60*a* which is the outer circumferential surface of the engaging member 60 of the rotating force receiving member 58. At this time, as illustrated in FIG. 21, the tip end member 55 moves in the direction illustrated by an arrow XXIb, with respect to the movement in the direction illustrated by an arrow XXIa of the photoreceptor drum unit 10 (modification described in FIG. 14). Therefore, the tip end of the driving shaft 70 climbs over the engaging member 60 of the rotating force receiving member 58, and a posture illustrated in FIG. 20(c) is achieved. After this, as the driving shaft 70 is rotated, a posture illustrated in FIG. 16(a) is achieved.

Here, as illustrated in FIGS. 20(b) and 21, as the surfaces 60a and 60c which are the inclined surfaces are provided in the engaging member 60, the tip end member 55 more smoothly moves (movement in the direction of the arrow XXIb).

Figure 22A:
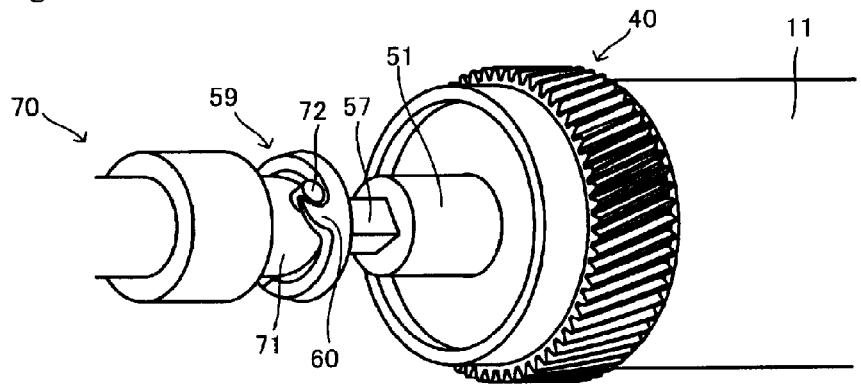
FIG. 22(*a*) is a perspective view illustrating a situation in which the photoreceptor drum unit 10 is disengaged from the driving shaft 70, FIG. 22(*b*) is a perspective view illustrating another situation in which the photoreceptor drum unit 10 is disengaged from the driving shaft 70, and FIG. 22(*c*) is a perspective view illustrating still another situation in which the photoreceptor drum unit 10 is disengaged from the driving shaft 70.
Figure 22B:
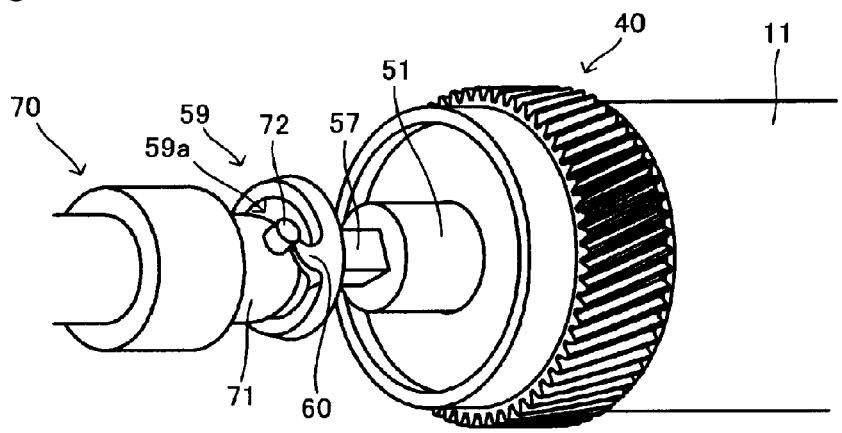
Figure 22C:
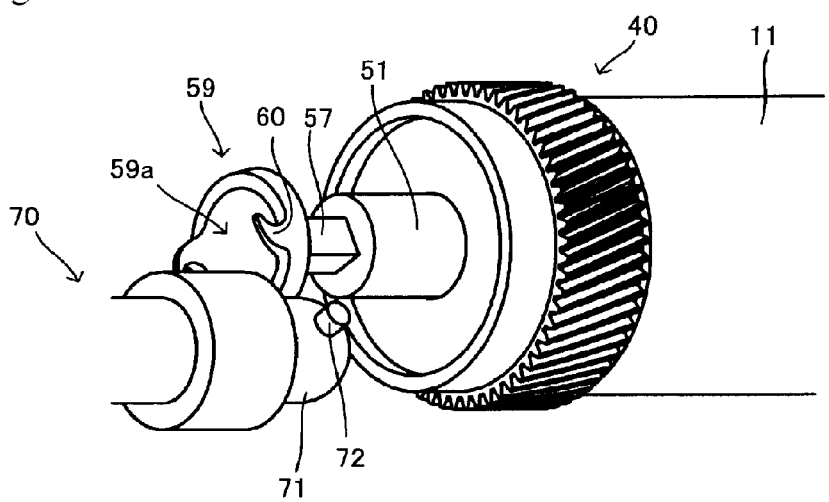
Figure 23:
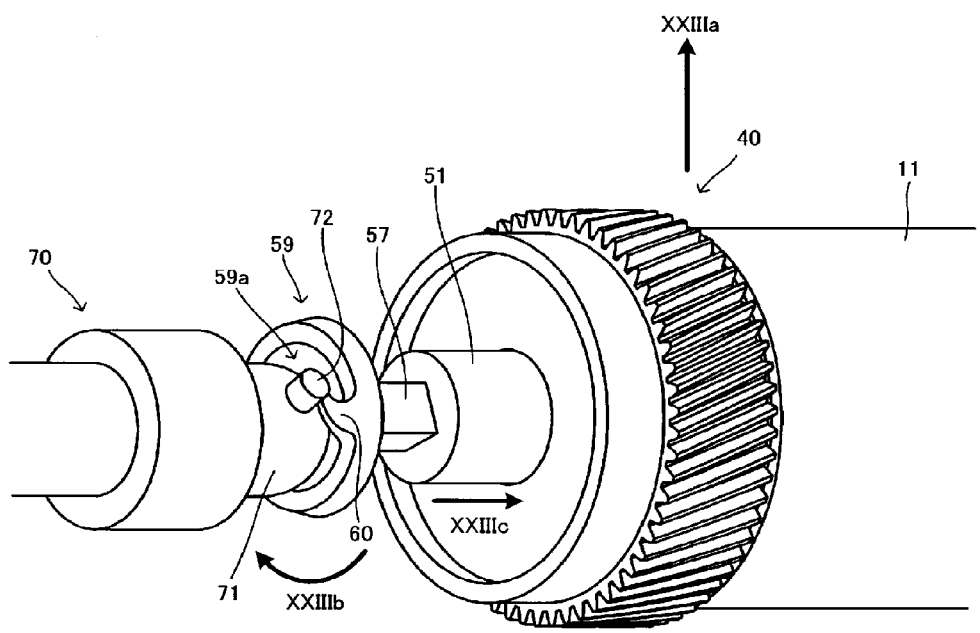
FIG. 23 is a view enlarging FIG. 22(*b*).

Next, an example of operations of the driving shaft 70 and the photoreceptor drum unit 10 when the process cartridge 3 is disengaged from a posture in which the process cartridge 3 is mounted on the apparatus main body 2, will be described. Views for the description are illustrated in FIGS. 22(a) to 22(c) and 23. FIGS. 22(a) to 22(c) are perspective views following the order of a process in which the rotating force receiving member 58 is disengaged from the driving shaft 70. FIG. 23 is an enlarged view of FIG. 22(b).

First, in the direction orthogonal to the shaft line direction of the driving shaft 70 as illustrated in FIG. 22(b) from the state illustrated in FIG. 22(a), the photoreceptor drum unit 10 is moved in the pulling direction. When pulling the photoreceptor drum unit 10 in this manner, one of two engaging members 60 is engaged in the direction of interrupting the pulling. Therefore, in this state, smooth disengagement is not possible. However, in the aspect, when the photoreceptor drum unit 10 is moved in the direction illustrated by an arrow XXIIIa in FIG. 23, the rotating force receiving member 58 moves in the direction illustrated by an arrow XXIIIb in FIG. 23 due to the relationship between one engaging member 60 and the engaging projection 72 of the driving shaft 70. Then, the tip end member 55 rotates, and while being interlocked to the rotation, the rotating shaft 51 also rotates. Therefore, by the above-described action of the spiral groove 47, the rotating shaft 51 and the tip end member 55 move in the direction illustrated by an arrow XXIIIc in FIG. 23. The engaging member 60 is disengaged from the engaging projection 72 due to the rotation and the movement of the rotating force receiving member 58, and as illustrated in FIG. 22(c), the disengagement is completed.

Here, since the bottom surface 59b of the recessed portion 59a of the receiving member 59 and the surface 60b of the engaging member 60 are formed to be inclined, more smooth disengagement becomes possible.

As described above, the process cartridge 3 is mounted on the apparatus main body 2 to be pushed from the direction which is different from the shaft line direction of the driving shaft 70 of the apparatus main body 2, and the disengagement is also smoothly performed.

In addition, according to the end member 30, due to the rotation in the shaft line direction and the movement in the direction orthogonal to the shaft line direction without a necessity to oscillate the shaft member 50, smoother attachment to and detachment from the driving shaft 70 become possible with respect to the shaft member 50. In addition, productivity is also improved from the viewpoint that it is possible to set a large tolerance to the dimension with respect to the shaft member which requires oscillation.

In addition, as described above, interruption of the attachment and detachment by the members is unlikely to occur in the middle of the attachment and detachment of the process cartridge, and smoother attachment and detachment are performed.

Figure 24A:
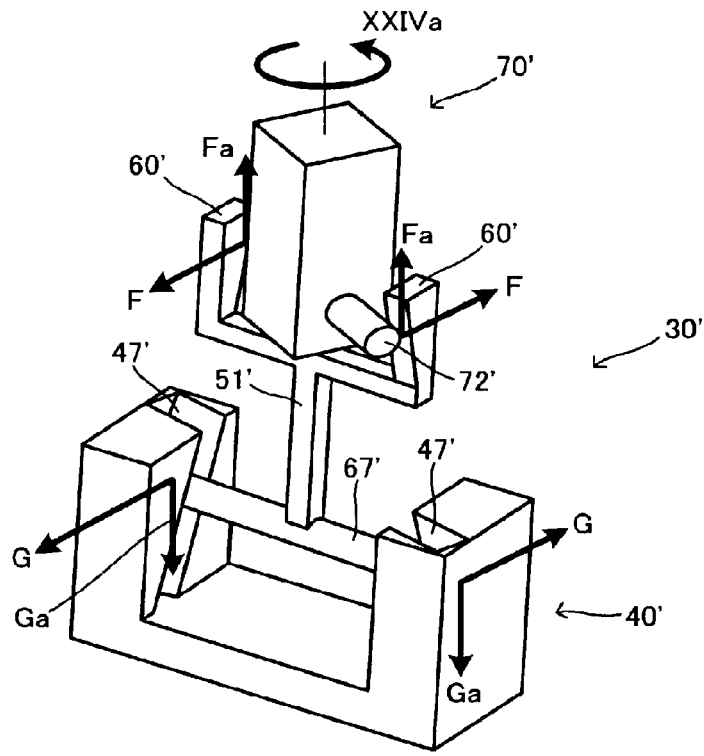
FIG. 24(*a*) is a schematic view illustrating a force generated in a posture in which a rotating force is transmitted, and FIG. 24(*b*) is a schematic view illustrating a force generated in a situation in which the process cartridge is disengaged.
Figure 24B:
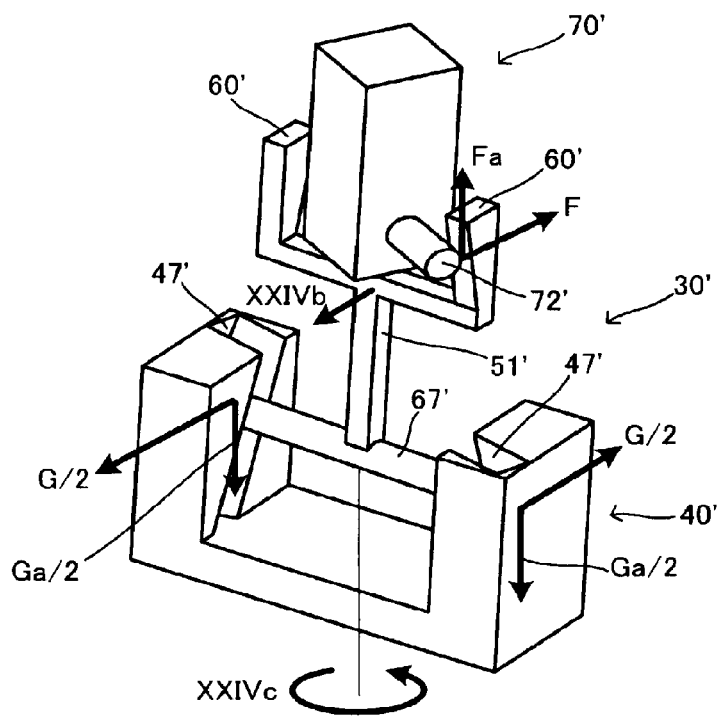

Next, a modification example will be described. As described above, the process cartridge 3 can be smoothly attached to and detached from the apparatus main body 2. Meanwhile, furthermore, the following configuration is possible for making more smooth attachment and detachment possible. FIGS. 24(a) and 24(b) are schematic views illustrating an idea. FIG. 24(a) is a schematic view of the posture which corresponds to FIG. 16(a) in a view of a state where the rotating force is transmitted to an end member 30' of the process cartridge from a driving shaft 70' of the apparatus main body, and FIG. 24(b) is a schematic view of a posture which corresponds to FIG. 23 in a view of a situation in which the end member 30' of the process cartridge is disengaged from the driving shaft 70' of the apparatus main body.

In FIG. 24(a), in a posture in which an engaging projection 72' of the driving shaft 70' is engaged with two engaging members 60' of the end member 30', the engaging projection 72' rotates as illustrated by an arrow XXIVa around the shaft line of the driving shaft 70'. In addition, the rotating force transmitted to the engaging member 60' rotates a shaft 51', and further, rotates a pin 67' around the shaft line of a shaft 51'. Both ends of the pin 67' are inserted into a spiral groove 47' of a bearing member 40'. Here, in the description, in the engaging member 60', an inclined surface which is inclined in the direction in which the engaging member 60' is unlikely to be disengaged from the driving shaft 70', the engaging projection 72' comes into contact with the inclined surface, and the rotating force is transmitted.

In the posture illustrated in FIG. 24(a), a force which is illustrated by F in FIG. 24(a) acts on the engaging member 60' from the engaging projection 72' by the rotation of the driving shaft 70', and at this time, as described above, since the engaging member 60' is in contact with the engaging projection 72' on the inclined surface, a component of force acts upward on the paper surface as illustrated by Fa. Since the same components of force Fa are generated in each of two engaging members 60', when the components of force are combined, 2·Fa is obtained.

Meanwhile, the pin 67' presses a side wall of the spiral groove 47' by the transmitted rotating force, by a force illustrated by G in FIG. 24(a). However, since the side wall of the spiral groove 47' is an inclined surface which is inclined with respect to the direction along the shaft line of the end member 30', a component of force acts downward on the paper surface as illustrated by Ga. The component of force Ga is a force in the orientation opposite to the above-described component of force Fa. Since the same components of force Ga are generated at each of both ends of the pin 67', when the components of force are combined, 2·Ga is obtained.

In a situation of FIG. 24(a), from the viewpoint that the rotating force is stably transmitted, since it is necessary that the engaging member 60' and the driving shaft 70' are not disengaged from each other, 2·Fa>2·Ga, that is, the following is preferable.

$$Fa > Ga \quad (1)$$

Meanwhile, in FIG. 24(b), in a posture in which the engaging projection 72' of the driving shaft 70' is engaged with two engaging members 60' of the end member 30', the end member 30' is moved in the direction of the arrow XXIVb. Then, it is possible to assume that the force F is applied to one of two engaging members 60'. In addition, accordingly, the pin 67' is considered to rotate in the direction of the arrow XXIVc around the shaft line of the shaft 51'.

Then, in the posture illustrated in FIG. 24(b), the force acts as illustrated by F in FIG. 24(b) with respect to the engaging member 60' from the engaging projection 72', and at this time, as described above, since the engaging member 60' is in contact with the engaging projection 72' on the inclined surface, the component of force acts upward on the paper surface as illustrated by Fa. Since the component of force Fa is generated in one engaging member 60', the total force is also Fa.

Meanwhile, the pin 67' presses the side wall of the spiral groove 47' of the bearing member 40' by the transmitted rotating force, but since the force at this time is a half of that in a case of FIG. 24(a), the pin 67' presses the side wall by a force of G/2. In addition, since the side wall of the spiral groove 47' is an inclined surface, the component of force acts downward on the paper surface as illustrated by Ga/2. In other words, the component of force Ga/2 is a force in the orientation opposite to the above-described Fa. Since the components of force Ga/2 are generated at each of both ends of the pin 67', when the components of force are combined, Ga is obtained.

In the situation of FIG. 24(b), from the viewpoint that the end member 30' and the driving shaft 70' are easily disengaged from each other, the following is preferable.

$$Fa < Ga \quad (2)$$

Here, when comparing the expression (1) and the expression (2), preferable force relationships are opposite to each other. Accordingly, there is a concern that it is difficult to achieve both ensuring the smooth rotating force transmission and more simple attachment and detachment of the process cartridge. Meanwhile, for example, it is possible to solve the problem by the following configuration.

Figure 25A:
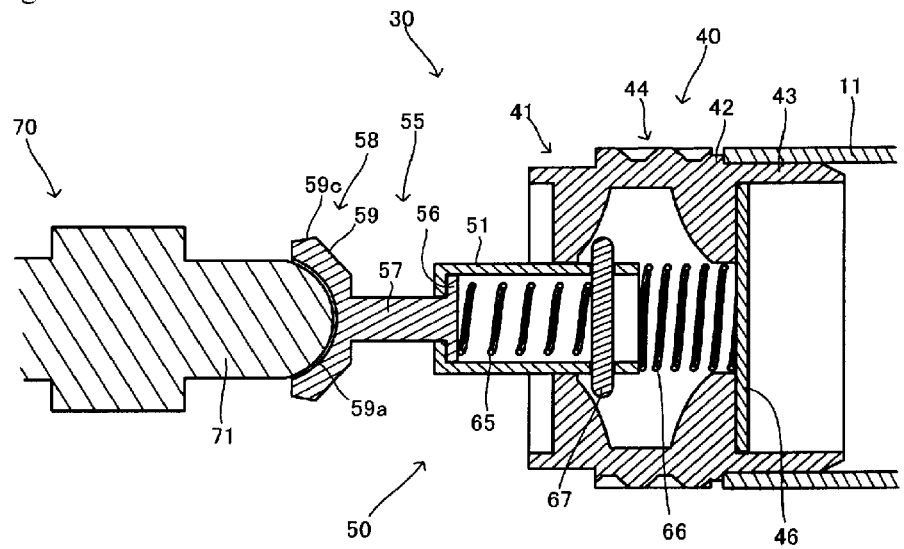
FIG. 25(*a*) is a sectional view illustrating a posture in which the driving shaft 70 and the end member 30 are engaged with each other, and FIG. 25(*b*) is a sectional view illustrating one preferable example of a situation in which the end member 30 is disengaged from the driving shaft 70.
Figure 25B:
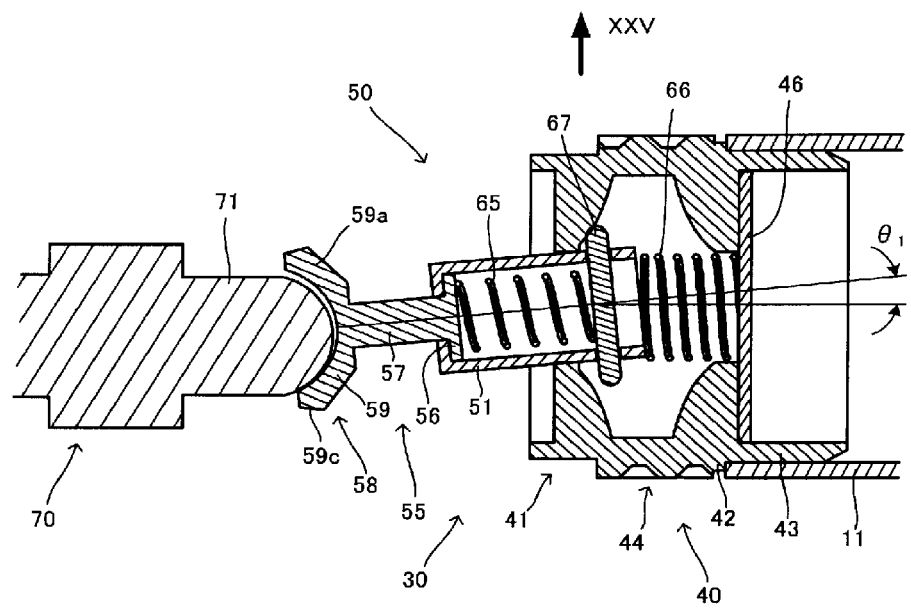
Figure 26A:
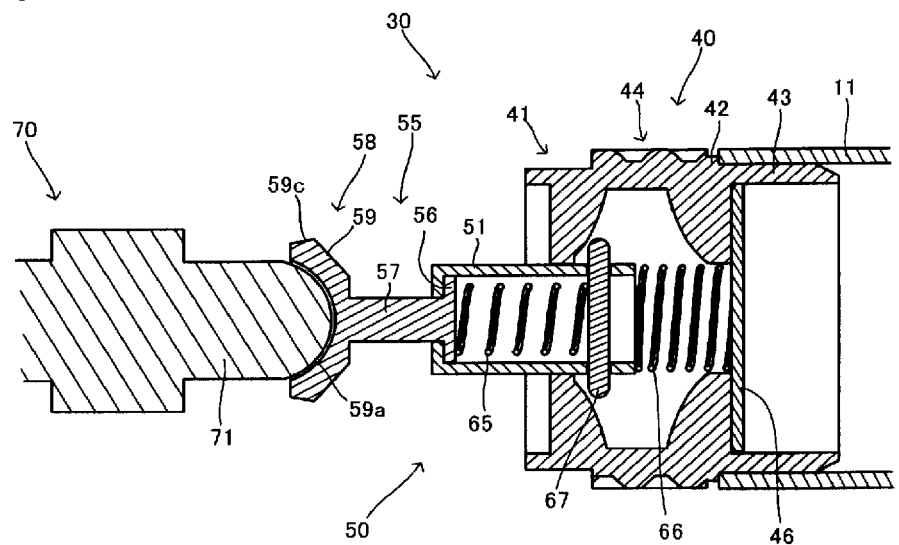
FIG. 26(*a*) is a sectional view illustrating a posture in which the driving shaft 70 and the end member 30 are engaged with each other, and FIG. 26(*b*) is a sectional view illustrating another preferable example of a situation in which the end member 30 is disengaged from the driving shaft 70.
Figure 26B:
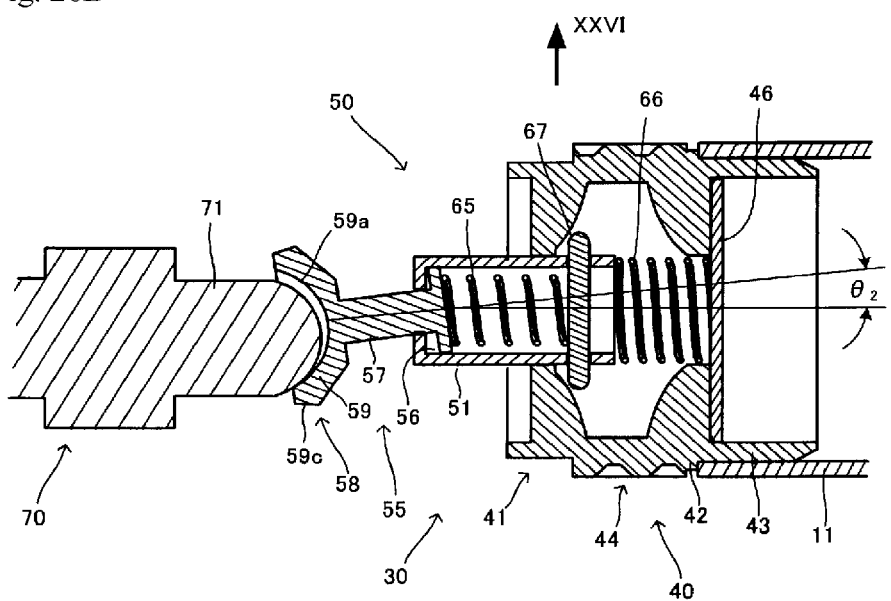

That is, in the process of disengagement described above, based on elastic deformation of the rotating shaft 51 and/or the tip end member 55 or a clearance between the members, the rotating force receiving member 58 is slightly inclined, the engaging member 60 is further easily disengaged from the driving shaft 70, and thus more smooth disengagement becomes possible. Specifically, views for the description are illustrated in FIGS. 25(a), 25(b), 26(a), and 26(b). FIGS. 25(a) and 26(a) are sectional views illustrating a posture in which the driving shaft 70 is engaged with the end member 30 and transmits the rotating force. FIG. 25(b) is a view illustrating an example of the inclination of the rotating shaft 51 and the tip end member 55, and FIG. 26(b) is a view illustrating an example of the inclination of the tip end member 55.

According to the example of FIG. 25(b), when the process cartridge 3 is moved as illustrated by an arrow XXV in FIG. 25(b) from a posture illustrated in FIG. 25(a), the tip end member 55 is hooked to the driving shaft 70, and the rotating shaft 51, the tip end member 55, and the pin 67, as a whole, are inclined at an angle of $\theta_1$ with respect to the shaft line. As described above, examples for making the rotating shaft 51, the tip end member 55, and the pin 67 possible to be inclined, include a method in which a predetermined void is provided between the outer circumference of the rotating shaft 51 and a part into which the rotating shaft 51 of the bearing member 40 is inserted.

According to the example of FIG. 26(b), when the process cartridge 3 is moved as illustrated by an arrow XXVI in FIG. 26(b) from a posture illustrated in FIG. 26(a), the tip end member 55 is hooked to the driving shaft 70, and the tip end member 55 is inclined at an angle of $\theta_2$ with respect to the shaft line. As described above, examples for making the tip end member 55 possible to be inclined, include a method in which a predetermined void is provided between the outer circumference of the shaft 57 of the tip end member 55, and the opening portion 51b which is a portion into which the shaft 57 of the rotating shaft 51 is inserted.

According to the end member in the aspect, in a situation in which the rotating force is transmitted, the receiving member 59 and the driving shaft 70 are engaged with each other as usual, and the rotating force is transmitted by the inclination $\theta_1$, the inclination $\theta_2$, and the sum of inclinations $\theta_1+\theta_2$, as illustrated in FIGS. 25(a) and 26(a). At this time, it is possible to configure to satisfy the above-described expression (1).

Meanwhile, in a situation where the end member 30 (that is, the process cartridge) is disengaged from the driving shaft 70, as illustrated in FIGS. 25(b) and 26(b), when the process cartridge is moved, the receiving member 59 is inclined as described above. Then, force Fa illustrated in FIG. 24(b) becomes small by the inclination angle. Specifically, if a coefficient determined by the inclination angle is 0<X<1, the force which becomes small by the inclination, can be illustrated by X·Fa. Therefore, in this case, instead of the expression (2), an expression (3) can be employed.

$$X \cdot Fa < Ga \quad (3)$$

According to this, it is possible to establish both the expression (1) and the expression (3), and to more reliably ensure the stabilized transmission of the rotation driving force and smooth disengagement of the process cartridge from the driving shaft 70.

A specific angle of the inclination is preferably larger than 0° and equal to or smaller than 18°, and more preferably larger than 0° and equal to or smaller than 10° (as illustrated by θ in FIGS. 25(b) and 26(b)), with respect to the shaft line of the end member 30. An angle of 0° means there is no inclination. If an angle is larger than 18°, an allowable angle of the inclination is too large, and there is a concern that rattling or the like occurs, and a possibility of stable rotation being interrupted increases, even in a posture of transmitting the rotating force as usual as illustrated in FIGS. 25(a) and 26(a). An angle of the inclination is further preferably larger than 0° and equal to or smaller than 5°.

In addition, with respect to the shaft line, the inclination may be allowed to be at the same angle in all directions, or may be allowed to be in only a specific direction. A specific aspect for allowing the inclination to be in a specific direction, is not particularly limited, and for example, as an end member 330' to be described later, the inclination can be made by forming a hole regulating the inclination of the shaft member 350, to be long in a direction where the inclination is allowed.

Figure 27:
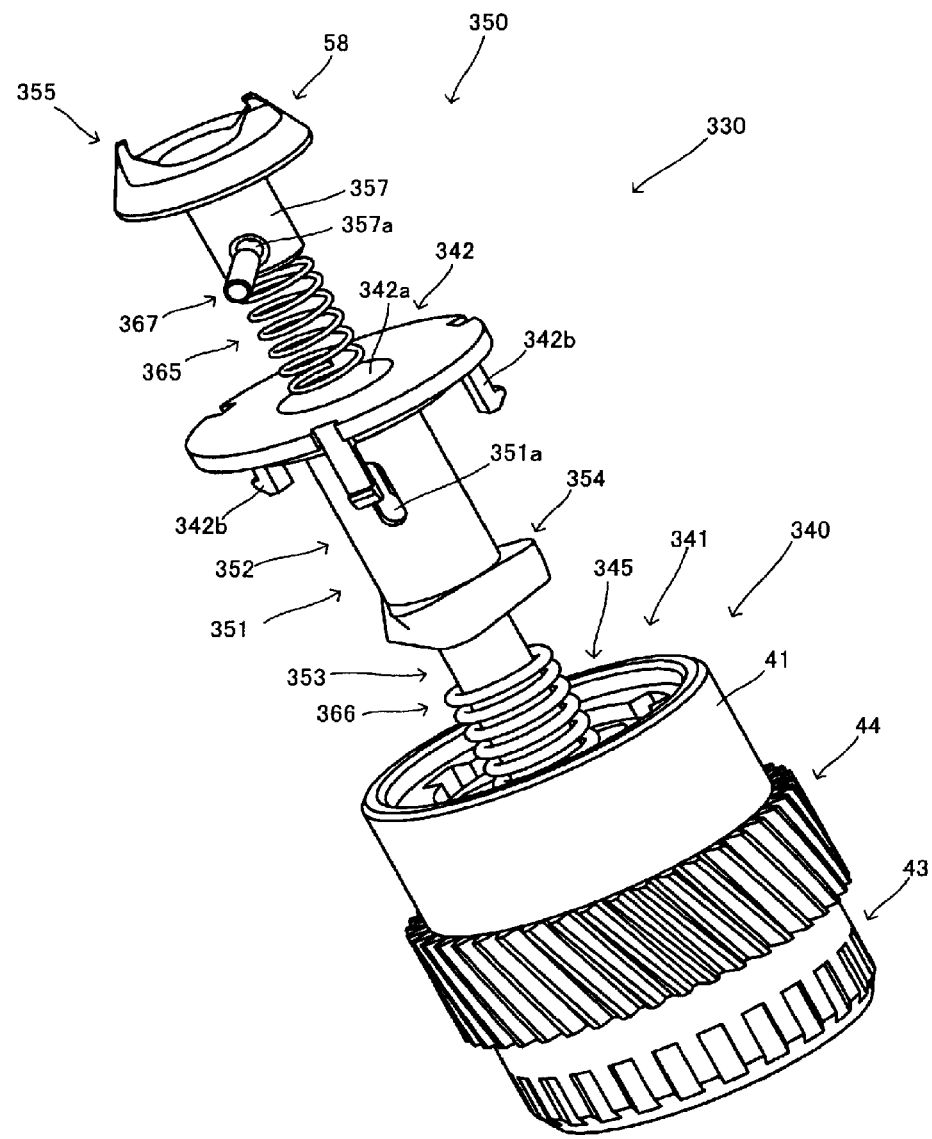
FIG. 27 is an exploded perspective view of an end member 330.
Figure 28:
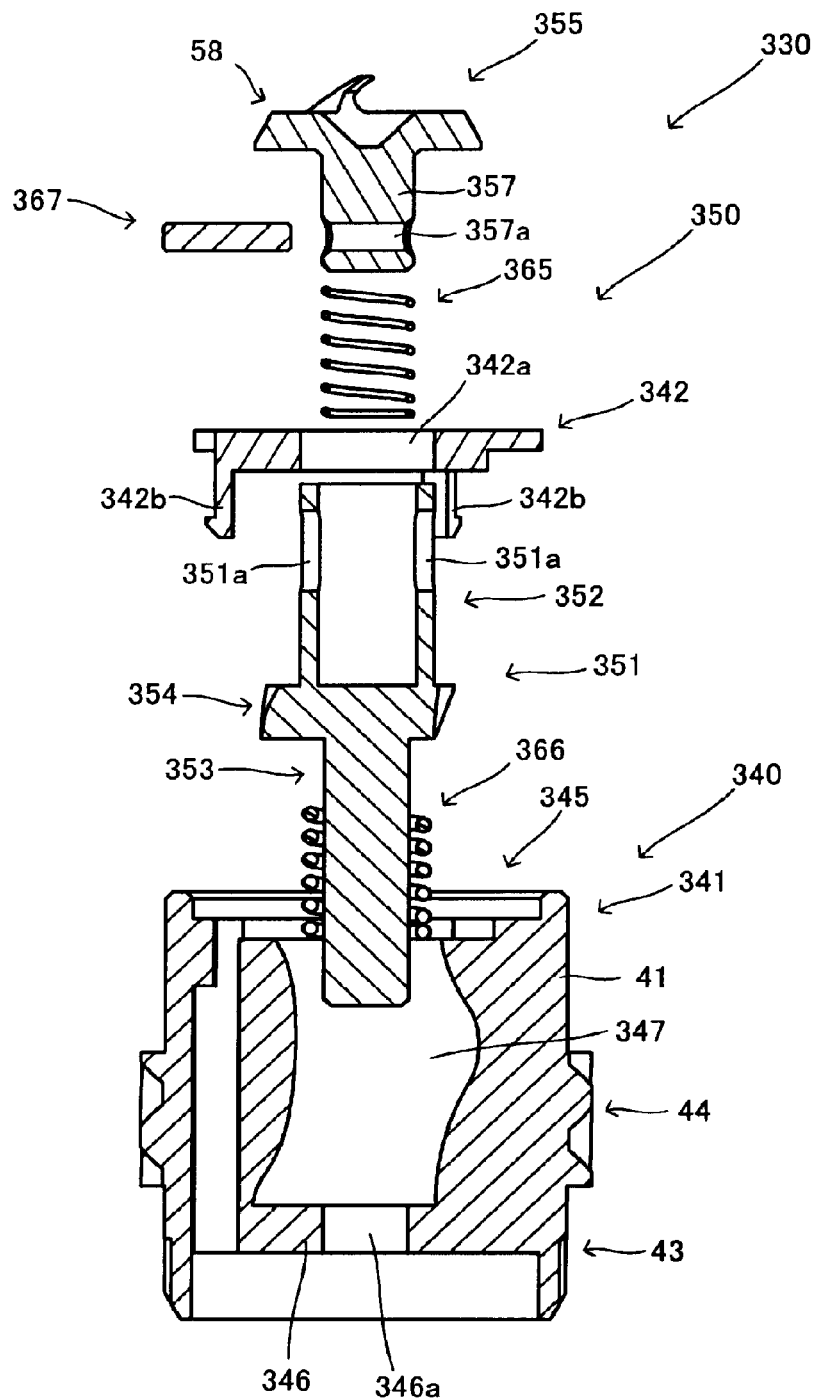
FIG. 28 is an exploded sectional view along the shaft line direction of the end member 330.

Next, the second aspect will be described. FIG. 27 is an exploded perspective view of an end member 330 included in the second aspect. FIG. 28 is an exploded sectional view of the end member 330 along the shaft line direction. The end member 330 is similar to the end member 30, is a member attached to the end portion opposite to the lid material 20 in the end portion of the photoreceptor drum 11, and is provided with a bearing member 340 and a shaft member 350.

Figure 29A:
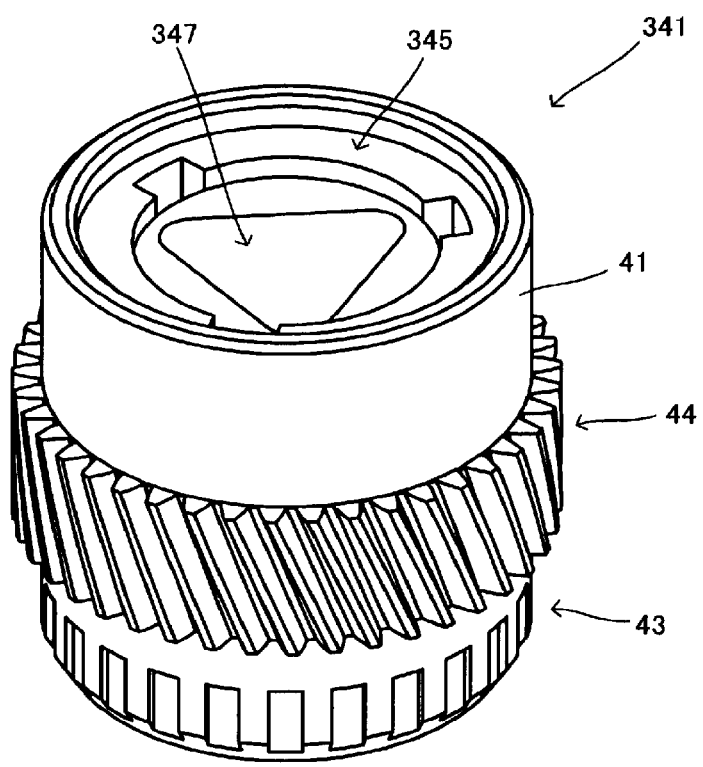
FIG. 29(*a*) is a perspective view of a main body 341 of a bearing member 340, and FIG. 29(*b*) is a plan view of the main body 341 of the bearing member 340.
Figure 29B:
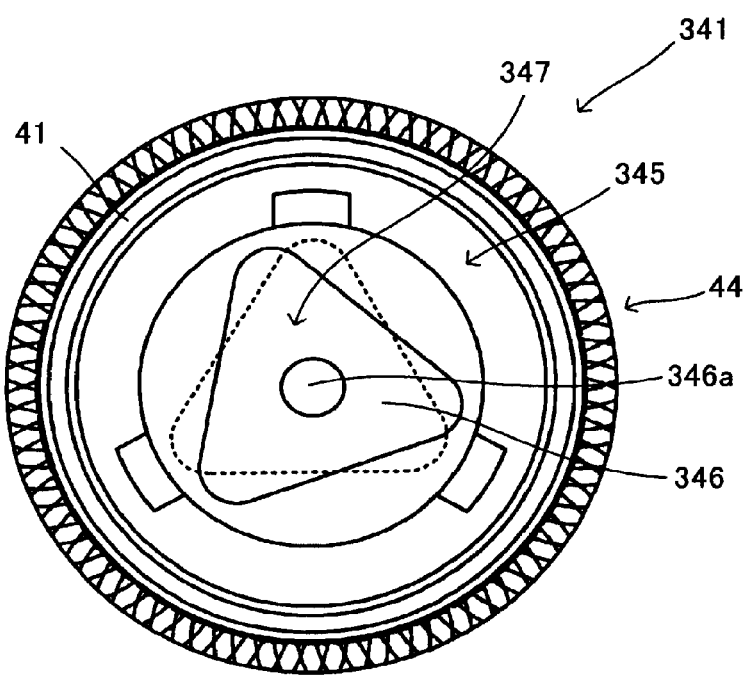

The bearing member 340 is a member which is bonded to the end portion of the photoreceptor drum 11 in the end member 330. FIG. 29(a) is a perspective view of a main body 341 of the bearing member 340, and FIG. 29(b) is a plan view of the main body 341.

The bearing member 340 includes the main body 341 and a lid member 342, and as illustrated in FIGS. 27 to 29(b), the main body 341 includes the tubular body 41, the fitting portion 43, the gear portion 44, and a shaft member holding portion 345.

Since the tubular body 41, the fitting portion 43, and the gear portion 44 are similar to those of the above-described end member 30, the same reference numerals will be given, and the description thereof will be omitted.

The shaft member holding portion 345 is a part which is formed on the inner side of the tubular body 41, and which has a function of ensuring a predetermined operation of the shaft member 350 and holding the shaft member 350 in the bearing member 340, and functions as one means for moving and rotating the rotating force receiving member 58. The shaft member holding portion 345 includes a bottom plate 346 and a spiral portion 347 which is a space in which a section is twisted in the shaft line direction.

The bottom plate 346 is a disk-like member, and is disposed to block and partition at least a part of the inner side of the tubular body 41. Accordingly, the shaft member 350 is supported. In the aspect, a hole 346a is formed in the center portion thereof. The attachment of the bottom plate 346 to the tubular body 41 can be performed by adhering or welding. In addition, the tubular body 41 and the bottom plate 346 may be integrally formed.

The spiral groove 347 is a space formed on the inner surface of the tubular body 41, and as can be ascertained from FIGS. 28 and 29(b), in the aspect, a section which is orthogonal to the shaft line direction is substantially triangular, and the section is formed to gradually rotate around the shaft line along the shaft line direction, and becomes a shape of a so-called twisted triangular prism (in FIG. 29(b), an opening edge of the spiral portion is illustrated by a solid line, and an example of a section in the depth in the shaft line direction is illustrated by a dotted line).

In addition, a part of one end of the spiral portion 347 in the longitudinal direction is blocked by the bottom plate 346, and a part of the other end opposite thereto is blocked by a lid member 342.

The lid member 342 is a disk-like member which is disposed on the side opposite to the bottom plate 346 nipping the shaft member holding portion 345, and is provided with a hole 342a at the center thereof. In the aspect, a claw 342b is provided, is engaged with the main body 341, and is fixed in a so-called snap-fit manner. However, means of fixing the lid is not limited thereto, and the adhesive or welding by heat or ultrasound wave can be used as another means.

A material which configures each member of the bearing member 340 is not particularly limited, but various types of resin or metal can be used.

In a case of making the bearing member 340 by the resin, for example, polyacetal, polycarbonate, polyphenylene sulfide (PPS), polyamide imide (PAD, polyetherether ketone (PEEK), polyether imide (PEI), 4F-perfluoro alkyl vinyl ether (PFA), polyether sulfone (PES), liquid crystal polymer (LCP) resin, or polyamide MXD6 (PA-MXD6), can be appropriately used. However, in order to improve the rigidity of the member, the glass fiber, the carbon fiber, or the inorganic filler may be mixed into the resin in accordance with the load torque. In addition, by inserting metal into the resin, the rigidity may further be improved.

In addition, in order to make the attachment or the movement of the shaft member smooth, sliding properties may be improved by containing at least one type of a fluororesin, polyethylene, and silicon rubber in the resin. In addition, the resin may be coated with fluororesin or lubricant.

Meanwhile, in a case of making the bearing member 340 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the bearing member 340 and any of member included in the bearing member 340, may be made by bending a metal plate, or may be made by making the metal, glass, or carbon fiber infiltrate into the resin.

As can be ascertained from FIGS. 27 and 28, the shaft member 350 is provided with a rotating shaft 351 and a tip end member 355. Furthermore, the shaft member 350 is provided with a tip end member elastic member 365, a rotating shaft elastic member 366, and a pin 367. Both of the tip end member elastic member 365 and the rotating shaft elastic member 366 in the aspect are a coiled spring.

Hereinafter, each of the members will be described.

Figure 30:
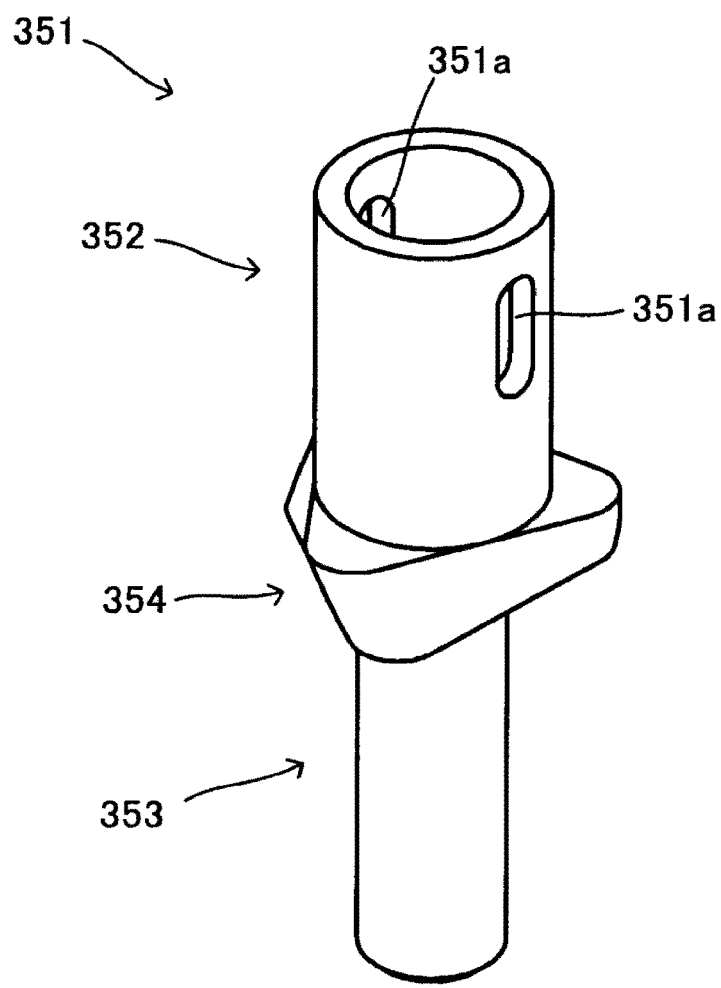
FIG. 30 is a perspective view of a shaft member 350.

The rotating shaft 351 is a rotating force transmission portion which transmits the rotating force received by the tip end member 355 to the bearing member 340, and is a shaft-like member which functions as means for moving and rotating the rotating force receiving member 58. FIG. 30 is a perspective view of the rotating shaft 351.

As can be ascertained from FIGS. 27, 28, and 30, in the rotating shaft 351, a cylindrical member 352 and a columnar member 353 are coaxially linked to each other. The inner side of the cylinder has the size by which the tip end member elastic member 365 can be inserted. In the rotating shaft 351, two long holes 351a which penetrate in the direction orthogonal to the shaft line direction are formed at the cylindrical parts. Two long holes 351a are disposed on one diameter of the cylindrical member 352. In addition, the long hole 351a considers the shaft line direction as the longitudinal direction.

In addition, in the outer circumferential portion of the rotating shaft 351, at a boundary part between the cylindrical member 352 and the columnar member 353, a spiral pillar-like portion 354 which is twisted corresponding to the shape of the above-described spiral portion 347, is provided.

The tip end member 355 is a member which receives the rotation driving force from the apparatus main body 2 (refer to FIG. 1) and transmits the driving force to the rotating shaft 351. As can be ascertained from FIGS. 27 and 28, the tip end member 355 is configured to include a shaft 357 and the rotating force receiving member 58.

The shaft 357 is a pillar-like member, and is a column in the aspect. In addition, in the shaft 357, a hole 357a which penetrates in the direction orthogonal to the shaft line is formed.

Since the rotating force receiving member 58 is similar to the above-described end member 30, the description thereof will be omitted.

Returning to FIG. 27, another configuration provided in the shaft member 350 will be described. The tip end member elastic member 365 and the rotating shaft elastic member 366 are so-called elastic members, and both of the tip end member elastic member 365 and the rotating shaft elastic member 366 function as means for moving and rotating the rotating force receiving member 58. In the aspect, both are the coiled springs. In addition, the pin 367 is the means for holding the tip end member 355 to be movable in the rotating shaft 351.

A material which configures each member of the shaft member 350 is not particularly limited, but various types of resin or metal can be used.

In a case of making the shaft member 350 by the resin, for example, polyacetal, polycarbonate, polyphenylene sulfide (PPS), polyamide imide (PAI), polyetherether ketone (PEEK), polyether imide (PEI), 4F-perfluoro alkyl vinyl ether (PFA), polyether sulfone (PES), liquid crystal polymer (LCP) resin, or polyamide MXD6 (PA-MXD6), can be appropriately used. However, in order to improve the rigidity of the member, the glass fiber, the carbon fiber, or the inorganic filler may be mixed into the resin in accordance with the load torque. In addition, by inserting metal into the resin, the rigidity may further be improved.

Meanwhile, in a case of making the shaft member 350 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the shaft member 350 and any of member included in the shaft member 350, may be made by bending a metal plate, or may be made by making the metal, glass, or carbon fiber infiltrate into the resin.

By combining the bearing member 340 and the shaft member 350 with each other as follows, the end member 330 is made. In addition, by describing the combination, the size of each member and part, the structure, or the relationship of the sizes of the members and parts, are further understood.

As can be ascertained from FIG. 28, the shaft 357 of the tip end member 355 is disposed on the inner side of the cylindrical member 352 of the rotating shaft 351, and the pin 367 passes through the long hole 351a of the rotating shaft 351 and the hole 357a of the tip end member 355. Accordingly, the tip end member 355 is held in the rotating shaft 351. At this time, the tip end member elastic member 365 is disposed on the inner side of the cylindrical member 352, and accordingly, the tip end member 355 is biased in the projecting direction from the rotating shaft 351.

In this manner, in the rotating shaft 351 combined by the tip end member 355, the tip end member elastic member 365, and the pin 367, the columnar member 353 which is on the side on which the tip end member 355 is not disposed is inserted toward the bottom plate 346 side of the shaft member holding portion 345 formed on the inner side of the main body 341 of the bearing member 340. At this time, the spiral pillar-like portion 354 of the rotating shaft 351 is disposed on the inner side of the spiral portion 347 of the shaft member holding portion 345. In addition, the columnar member 353 passes through the hole 346a of the bottom plate 346. In addition, the rotating shaft elastic member 366 is disposed between the bottom plate 346 and the spiral pillar-like portion 354, and biases the rotating shaft 351 toward the tip end member 355 side.

In addition, the lid member 342 is disposed, and the shaft member 350 is held in the bearing member 340. At this time, since the cylindrical member 352 in the shaft member 350 is disposed in the hole 342a of the lid member 342, and the spiral pillar-like portion 354 cannot pass through the hole 342a, the spiral pillar-like portion 354 is held on the inner side of the bearing member 340, and the shaft member 350 is held in a state of being biased without falling out of the bearing member 340.

Above, in the posture in which each member is combined, the shaft lines of the bearing member 340, the rotating shaft 351, and the tip end member 355 match each other.

According to the above-described end member 330, the relationship between the spiral portion 347 and the spiral pillar-like portion 354 acts in accordance with the example of the relationship between the spiral groove 47 and the pin 67 in the end member 30, and the end member 330 can also operate similar to the end member 30. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

Figure 31:
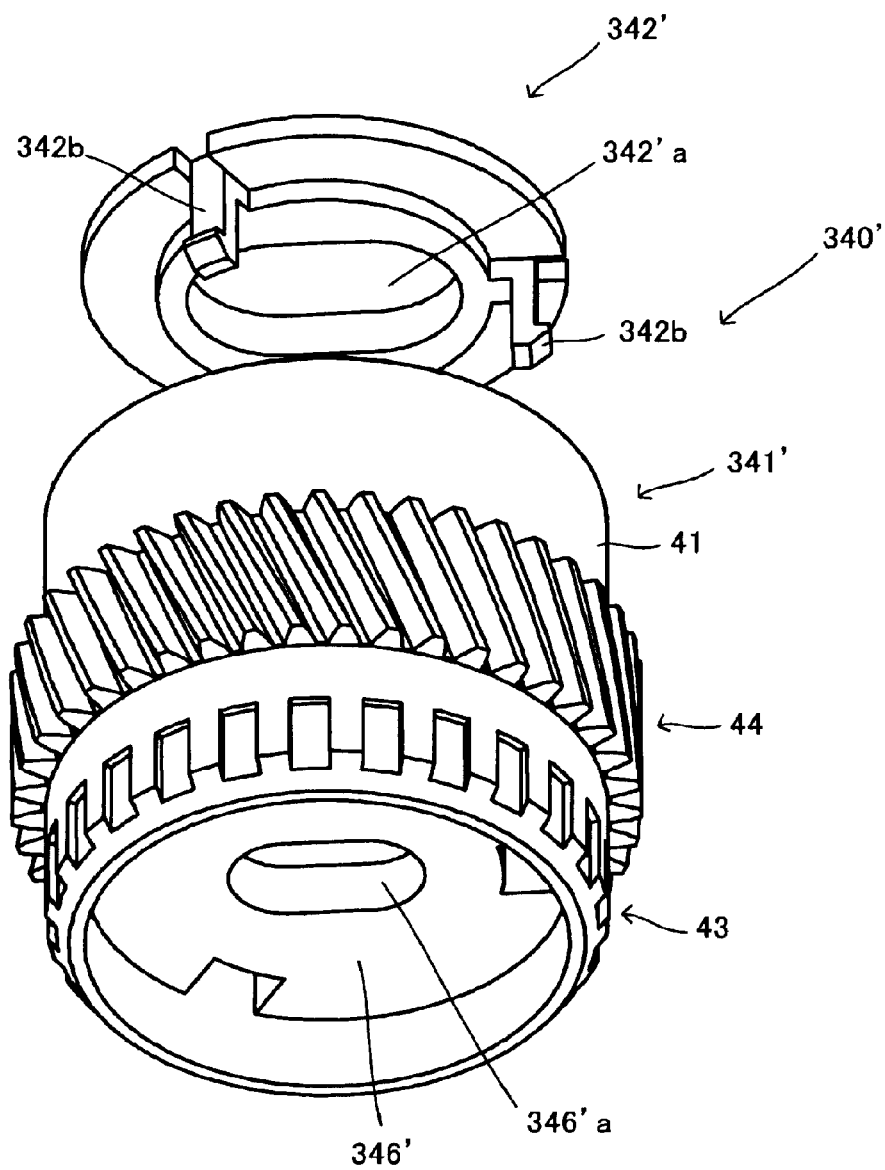
FIG. 31 is an exploded perspective view illustrating a modification example.
Figure 32A:
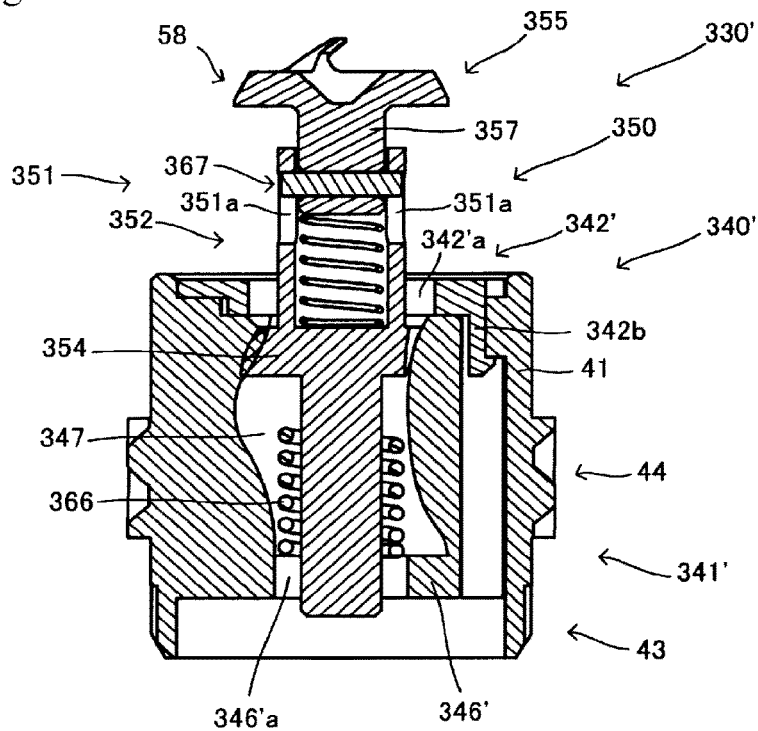
FIG. 32(*a*) is a sectional view in the shaft line direction of an end member 330', and FIG. 32(*b*) is a sectional view in the shaft line direction of the end member 330' in another posture.
Figure 32B:
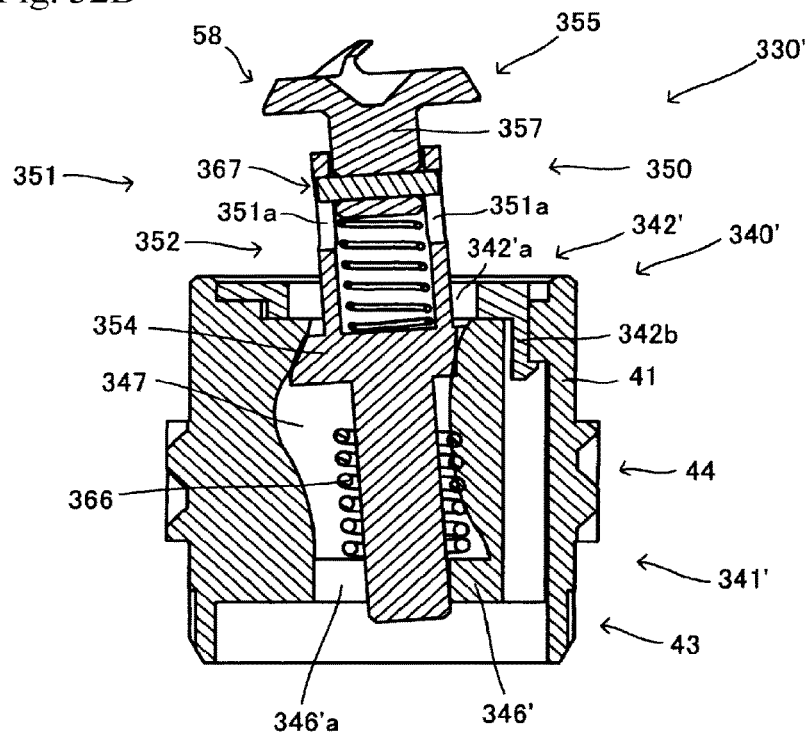

FIGS. 31, 32(a), and 32(b) are views illustrating the end member 330' according to the modification example. FIG. 31 is an exploded perspective view illustrating a bearing member 340' included in the end member 330', FIG. 32(a) is a sectional view in the shaft line direction of the end member 330', and FIG. 32(b) is a perspective view in the shaft line direction illustrating a situation in which the shaft member 350 is inclined.

In the modification example, the bearing member 340' is employed instead of the bearing member 340. As can be ascertained from FIG. 31, a hole 346'a of a bottom plate 346' provided in a main body 341' is a long hole. A hole 342'a of a lid member 342' is also a long hole. The longitudinal directions of the two holes 346'a and 342'a are the same directions.

According to this, as can be ascertained from FIGS. 32(a) and 32(b), in the shaft member 350 (rotating shaft 351) inserted into the holes 346'a and 342'a, the inclination of the holes 346'a and 342'a in the longitudinal direction is allowed, and the inclination in the transverse direction is regulated.

At this time, the hole 342'a is a main hole which regulates the inclination of the shaft member 350 (rotating shaft 351), and thus the hole 346'a may not be the long hole, and may be a hole of a large circle, except that the sizes of the hole 342a' and the hole 346'a in the longitudinal direction are the same as each other.

As described above, it is possible to control the inclination direction as necessary, and to perform further appropriate inclination.

Figure 33:
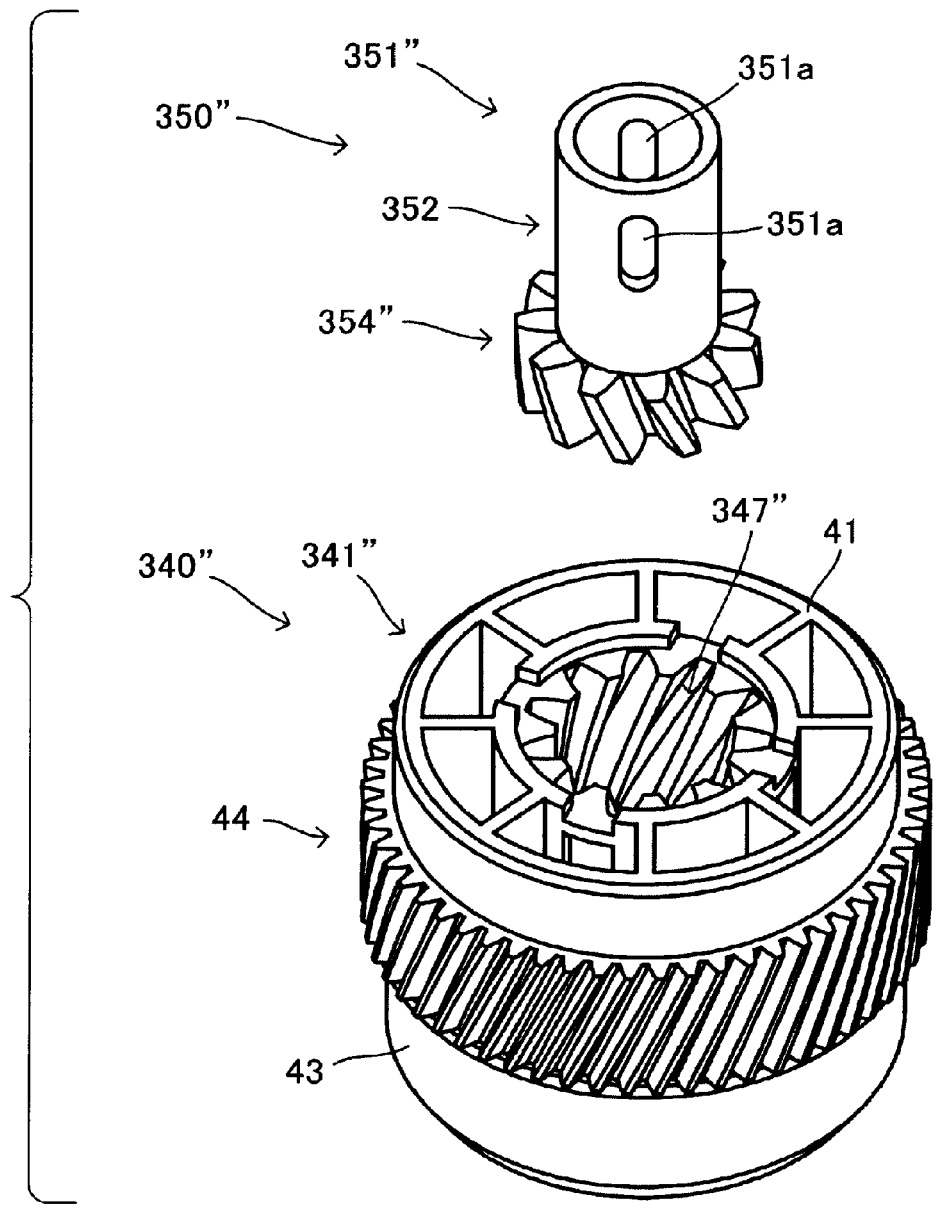
FIG. 33 is an exploded perspective view illustrating the modification example.

FIG. 33 is an exploded perspective view of a part of an end member 330" according to another modification example. For making it easy to understand, FIG. 33 illustrates only a main body 341" of a bearing member 340" and a rotating shaft 351" of a shaft member 350". Since other members are similar to the members described above, the description thereof will be omitted.

In the modification example, a spiral pillar-like portion 354" is formed of a helical gear, and a spiral portion 347" is formed of an internal gear. Even in this aspect, the member acts in accordance with an example of a relationship between the spiral portion 347 and the spiral pillar-like portion 354 in the end member 330, and the same operation as that of the end member 30 is possible. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

In the helical gear and the internal gear, the number of teeth is not particularly limited, and can be appropriately adjusted.

In addition to the example, a so-called gear shape, such as a spur gear or the like of which the thickness is thin is employed instead of the helical gear in the pillar-like portion 354", and a spiral portion in which a gear-like teeth can move in the groove can be configured instead of the spiral portion 347". At this time, regarding the aspect of the spiral portion, the rotation and the movement in the shaft line direction of the shaft member can be regulated depending on the degree of twist per 1 mm along the shaft line direction. In addition, in addition to the gear-like teeth or the like, a projection-like part, such as a pin, can be formed and employed.

Figure 34:
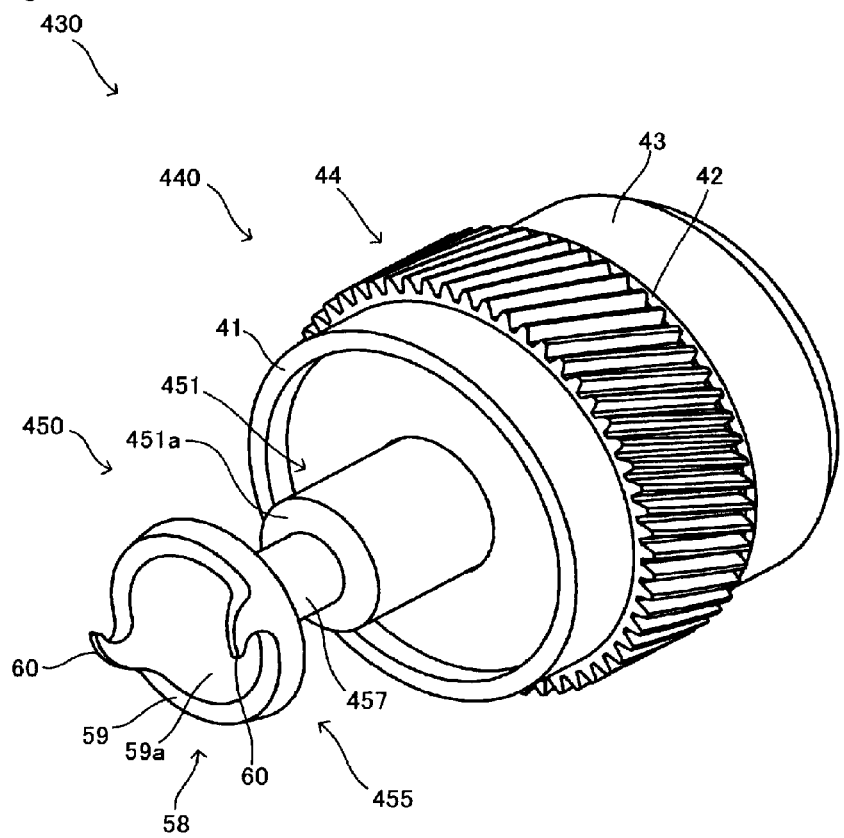
FIG. 34 is a perspective view of an end member 430.
Figure 35:
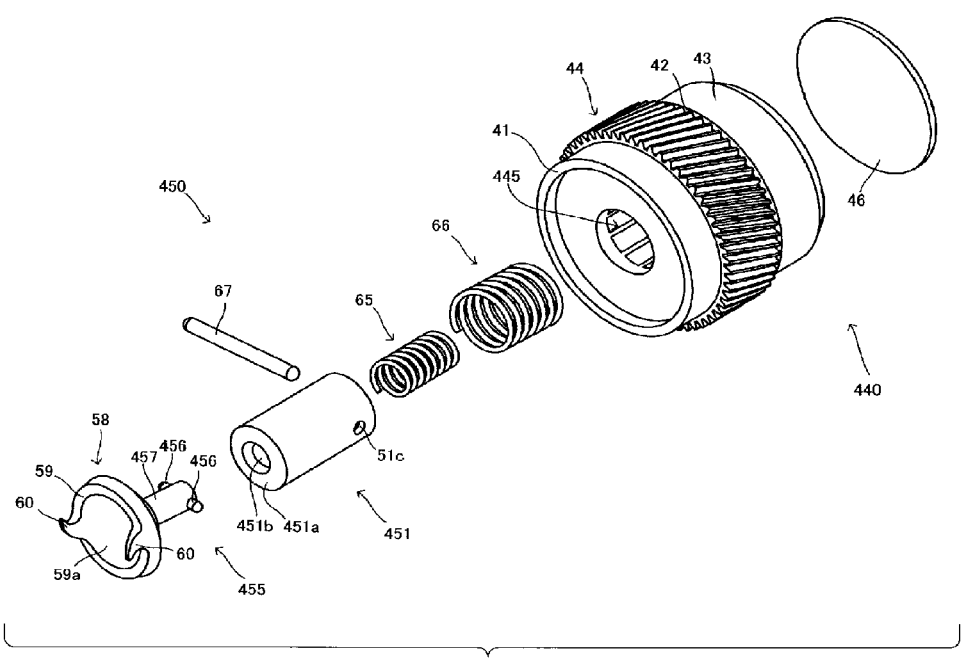
FIG. 35 is an exploded perspective view of the end member 430.

FIG. 34 is a view illustrating the third aspect, and is a perspective view of an end member 430. In the end member 430, the same configuration elements as those of the end member 30 will be given the same reference numerals as those of the end member 30, and the description thereof will be omitted. The end member 430 is a member attached to the end portion opposite to the lid material 20 in the end portion of the photoreceptor drum 11, and is provided with a bearing member 440 and a shaft member 450. FIG. 35 is an exploded perspective view of the end member 430.

Figure 36:
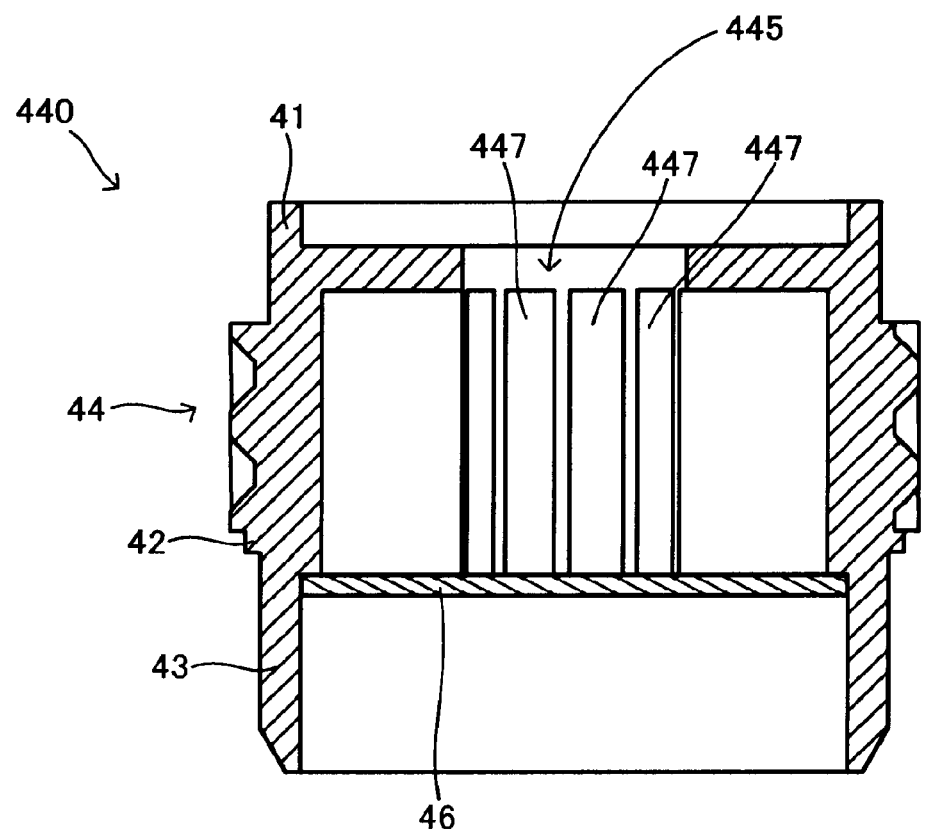
FIG. 36 is a sectional view in the shaft line direction of a bearing member 440.

The bearing member 440 is a member which is bonded to the end portion of the photoreceptor drum 11 in the end member 430. FIG. 36 is a sectional view along the shaft line direction of the bearing member 440.

As can be ascertained from FIGS. 34 to 36, the bearing member 440 is configured to include the tubular body 41, the contact wall 42, the fitting portion 43, the gear portion 44, and a shaft member holding portion 445.

The shaft member holding portion 445 is a part which is formed on the inner side of the tubular body 41, and which has a function of ensuring a predetermined operation of the shaft member 450, and holding the shaft member 450 in the bearing member 440, and functions as one of means for moving and rotating the rotating force receiving member 58. The shaft member holding portion 445 includes the bottom plate 46 and a straight line groove 447.

The straight line grooves 447 are a plurality of straight line-like grooves formed on the inner surface of the tubular body 41, and the depth direction thereof is formed in a radial shape (radial direction) around the shaft line of the tubular body 41, similar to that of the above-described spiral groove 47, for example, as illustrated by A in FIG. 7(a). Meanwhile, the longitudinal direction of the straight line groove 447 is parallel to the shaft line of the tubular body 41. In addition, the width direction of the straight line groove 447 is formed to be substantially the same as the diameter of the pin 67 to the extent that the end portion of the pin 67 is inserted, and the end portion of the pin 67 can smoothly move in the groove, similar to the above-described spiral groove 47, for example, as illustrated by B in FIG. 7(a).

In addition, one end of the straight line groove 447 in the longitudinal direction is blocked by the bottom plate 46, and the other end opposite thereto is blocked without reaching the end surface of the tubular body 41.

Furthermore, a plurality of straight line grooves 447 are provided as at least one opposing pair nipping the shaft line of the tubular body 41. Therefore, two or more pairs may be provided.

Next, the shaft member 450 of the end member 430 will be described. As can be ascertained from FIG. 35, the shaft member 450 is provided with a rotating shaft 451 and a tip end member 455. Furthermore, the shaft member 450 is provided with the tip end member elastic member 65, the rotating shaft elastic member 66, and the pin 67. Both of the tip end member elastic member 65 and the rotating shaft elastic member 66 in the aspect are a coiled spring.

Figure 37A:
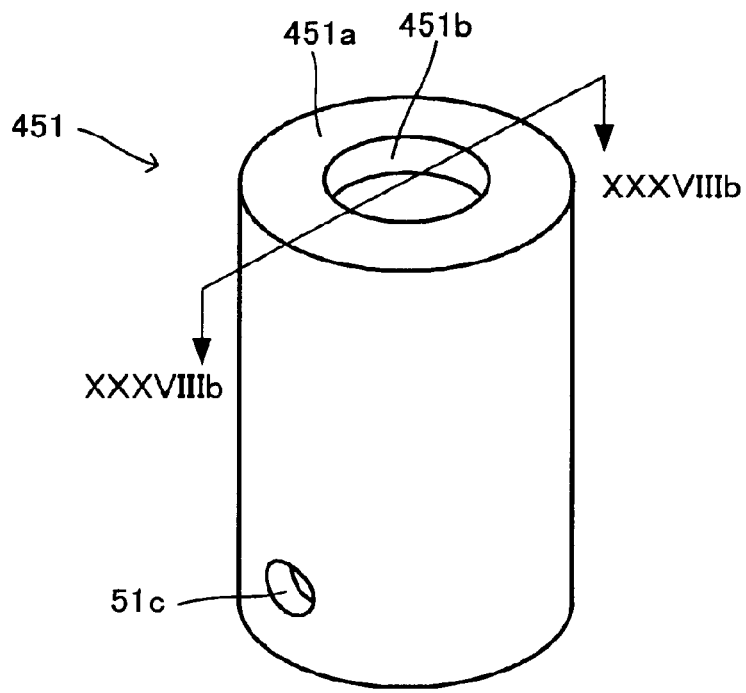
FIG. 37(*a*) is a perspective view of a rotating shaft 451, and FIG. 37(*b*) is a sectional view in the shaft line direction of the rotating shaft 451.

The rotating shaft 451 is a rotating force transmission portion which transmits the rotating force received by the tip end member 455 to the bearing member 440, and is a shaft-like member which functions as means for moving and rotating the rotating force receiving member 58. FIG. 37(a) is a perspective view of the rotating shaft 451, and FIG. 37(b) is a sectional view cut in the shaft line direction by a line illustrated by XXXVIIIb-XXXVIIIb in FIG. 37(a).

Figure 37B:
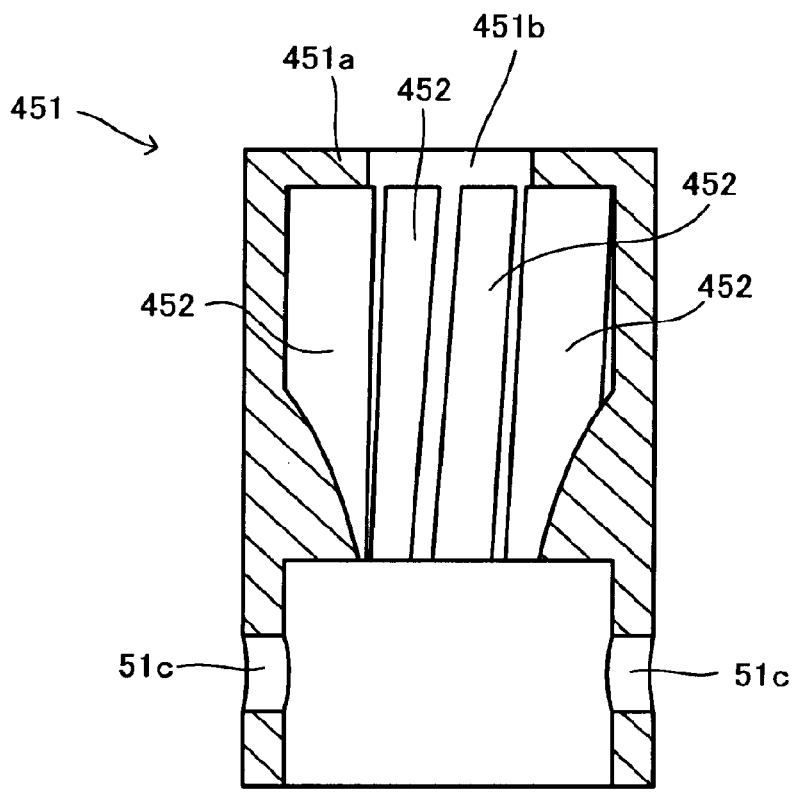

As can be ascertained from FIGS. 37(a) and 37(b), the rotating shaft 451 is cylindrical. The inner side of the cylinder has the size by which the tip end member elastic member 65 can be inserted. In the rotating shaft 451, a lid portion 451a is provided in one end portion, and a narrowed opening portion 451b is formed in the lid portion 451a. In addition, in the aspect, the opening portion 451b is circular.

In addition, in the rotating shaft 451, two pin through holes 51c, which are orthogonal to the shaft line of the cylinder, are provided in one diameter direction of the cylinder, and penetrate the inside and the outside of the cylinder, are formed in the end portion opposite to the end portion in which the lid portion 451a is disposed. The pin 67 (refer to FIG. 35) passes through the pin through hole 51c.

Furthermore, in the aspect, a plurality of spiral grooves 452 are formed on the inner surface of the cylinder of the rotating shaft 451. The spiral groove 452 is a spiral groove, the depth direction thereof is formed in a radial shape (radial direction) around the shaft line of the rotating shaft 451, similar to that of the above-described spiral groove 47, for example, as illustrated by A in FIG. 7(a). Meanwhile, the longitudinal direction of the spiral groove 452 is the direction along the shaft line of the rotating shaft 451, and one end side and the other end side are twisted to be deviated in the direction along the inner circumference of the rotating shaft 451, and are formed in a spiral shape. In addition, the width direction of the spiral groove 452 is formed to be substantially the same as the diameter of the projection 456 to the extent that the end portion of the projection 456 of the tip end member 455 which will be described later is inserted, and the end portion of the projection 456 can smoothly move in the groove, similar to the above-described spiral groove 47, for example, as illustrated by B in FIG. 7(a).

In addition, one end of the spiral groove 452 in the longitudinal direction is blocked by the lid portion 451a.

Furthermore, the plurality of spiral grooves 452 are provided as at least one opposing pair nipping the shaft line of the rotating shaft 451. In the aspect, an example in which three pairs, that is, a total of six spiral grooves 452 are formed, is employed, but one pair, that is, a total of two spiral grooves may be formed. Meanwhile, two pairs or four or more pairs of spiral grooves may be provided. When the spiral groove is injection-molded, the injection molding is performed by the releasing while rotating the mold after the injection of the material.

Figure 38:
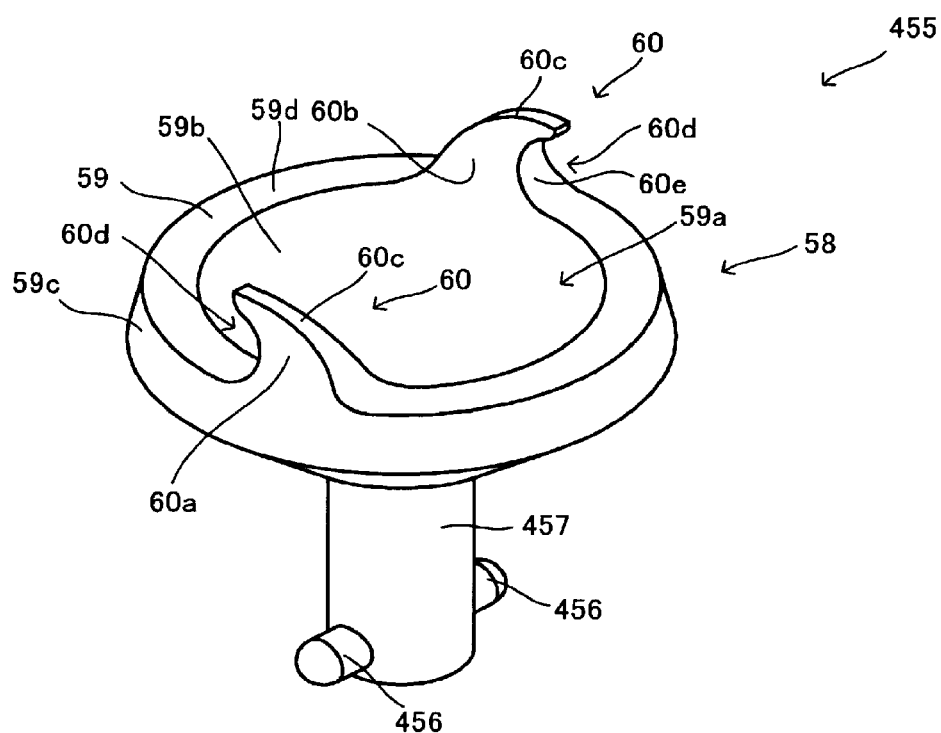
FIG. 38 is a perspective view of a tip end member 455.

The tip end member 455 is a member which receives the rotation driving force from the apparatus main body 2 (refer to FIG. 1) and transmits the driving force to the rotating shaft 451. FIG. 38 is a perspective view of the tip end member 455.

As can be ascertained from FIG. 38, the tip end member 455 is configured to include a shaft 457, the projection 456, and the rotating force receiving member 58.

The shaft 457 is a pillar-like member, and is a column in the aspect. The sectional shape thereof is substantially the same as or slightly smaller than the opening portion 451b of the above-described rotating shaft 451.

The projections 456 are two projections which are provided on the side opposite to the side on which the rotating force receiving member 58 is disposed in the shaft 457, and protrude from the side surface of the shaft 457. Two projections 456 are disposed at symmetrical positions nipping the shaft line of the shaft 457.

Figure 39:
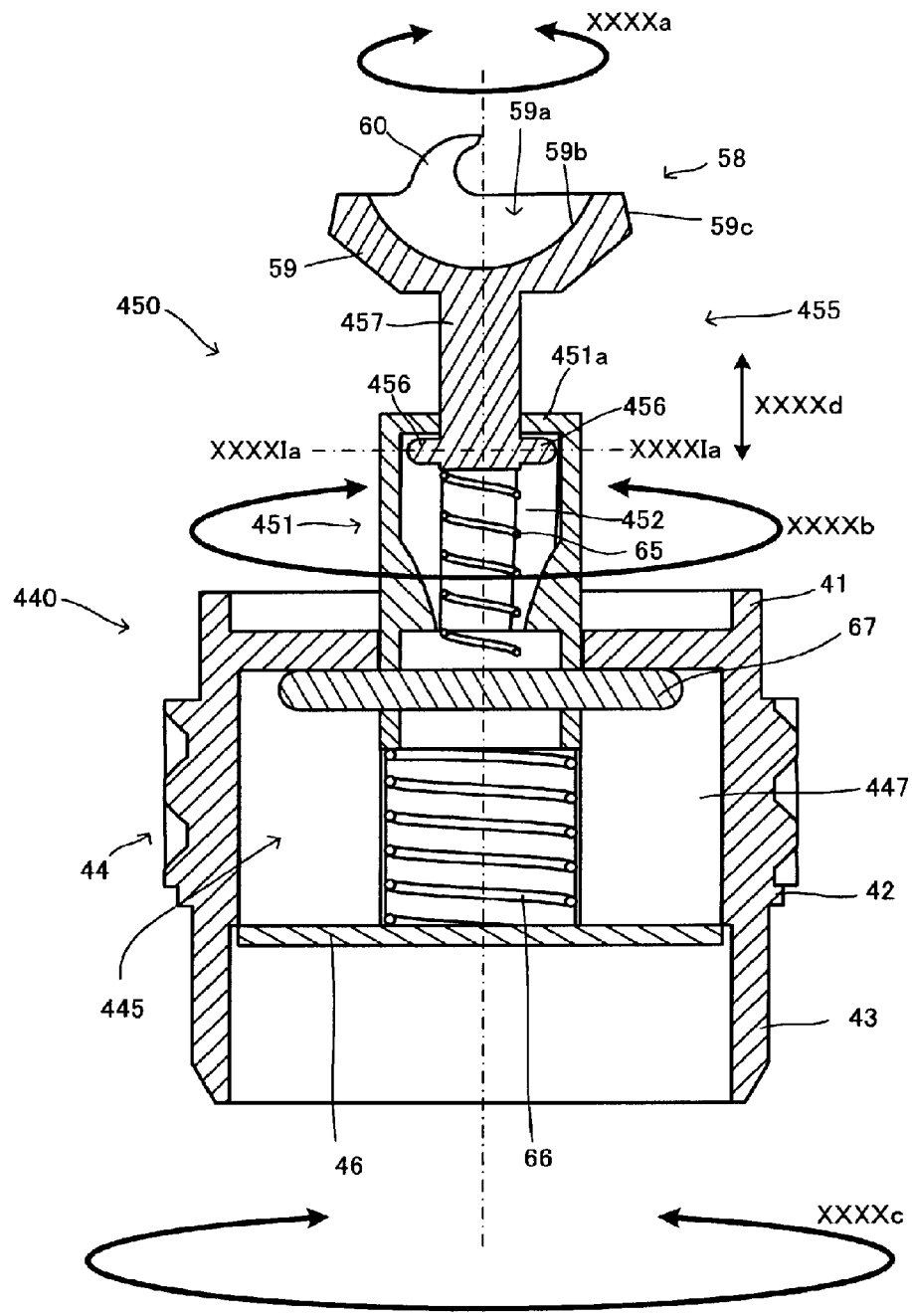
FIG. 39 is a sectional view in the shaft line direction of the end member 430.
Figure 40A:
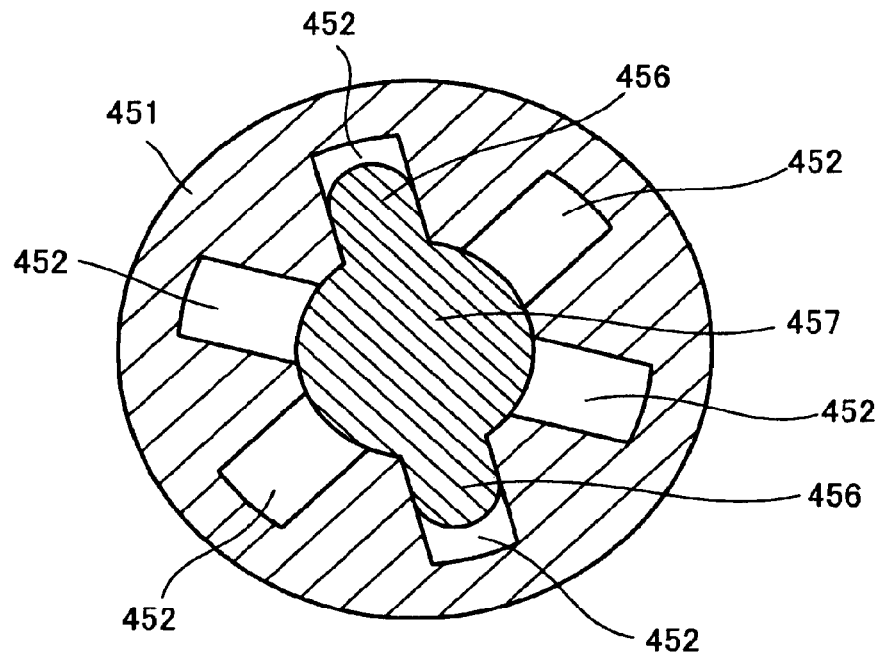
FIG. 40(*a*) an end surface view orthogonal to the shaft line direction of the end member 430, and FIG. 40(*b*) is a view illustrating a relationship between the rotating shaft 451 and a projection 456.
Figure 40B:
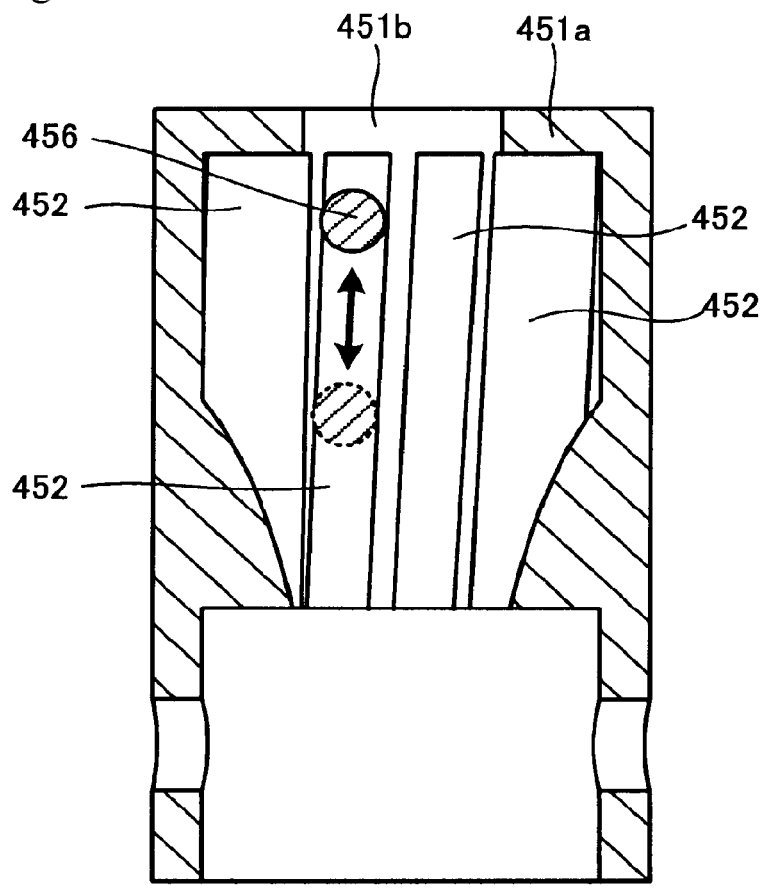

By combining the bearing member 440 and the shaft member 450 with each other as follows, the end member 430 is made. In addition, by describing the combination, the size of each member and part, the structure, or the relationship of the sizes of the members and parts, are further understood. FIG. 39 is a sectional view in the shaft line direction of the end member 430. FIG. 40(*a*) is an end surface view of the end member 430 along line illustrated by XXXXIa-XXXXIa in FIG. 39, and FIG. 40(*b*) is a sectional view in the shaft line direction of the rotating shaft 451, and is a view illustrating the relationship between the rotating shaft 451 and the projection 456.

As can be ascertained from FIG. 39, the shaft 457 of the tip end member 455 passes through the opening portion 451*b* of the rotating shaft 451. At this time, the projection 456 of the tip end member 455 is included on the inner side of the rotating shaft 451, and the rotating force receiving member 58 of the tip end member 455 is disposed to protrude from the rotating shaft 451. In addition, as can be ascertained from FIGS. 40(*a*) and 40(*b*), the projection 456 of the tip end member 455 is disposed in the spiral groove 452 of the rotating shaft 451.

Meanwhile, the pin 67 passes to cross over the two pin through holes 51*c* of the rotating shaft 451. At this time, both ends of the pin 67 respectively protrude from the side surface of the rotating shaft 451, and function as projections.

In addition, the tip end member elastic member 65 is disposed between the shaft 457 of the tip end member 455 and the pin 67 on the inner side of the rotating shaft 451. Therefore, one side of the tip end member elastic member 65 comes into contact with the shaft 457, and the other side thereof comes into contact with the pin 67. Accordingly, the tip end member 455 is biased in the direction in which the tip end member elastic member 65 biases the tip end member 455 and makes the tip end member 455 protrude from the rotating shaft 451. However, since the projection 456 cannot pass through the opening portion 451*b* of the rotating shaft 451, the tip end member 455 is held in a state of being biased without falling out of the rotating shaft 451.

In this manner, in the rotating shaft 451 combined by the tip end member 455, the tip end member elastic member 65, and the pin 67, the side on which the tip end member 455 is not disposed is inserted toward the bottom plate 46 side of the shaft member holding portion 445 formed on the inner side of the bearing member 440. At this time, as illustrated in FIG. 39, the end portion of the pin 67 protruded from the side surface of the rotating shaft 451 is inserted into the straight line groove 447 formed in the shaft member holding portion 445 of the bearing member 440.

In addition, as can be ascertained from FIG. 39, on the inner side of the bearing member 440, the rotating shaft elastic member 66 is disposed between the rotating shaft 451 and the bottom plate 46. Therefore, one side of the rotating shaft elastic member 66 comes into contact with the rotating shaft 451, and the other side of the rotating shaft elastic member 66 comes into contact with the bottom plate 46. Accordingly, the rotating shaft 451 is biased in the direction in which the rotating shaft elastic member 66 biases the rotating shaft 451 and makes the rotating shaft 451 including the tip end member 455 protrude from the bearing member 440. However, since the tip end of the pin 67 is inserted into the straight line groove 447 of the bearing member 440, and both ends of the straight line groove 447 are blocked as described above, the rotating shaft 451 is held in a state of being biased without falling out of the bearing member 440.

Above, in the posture in which each member is combined, the shaft lines of the bearing member 440, the rotating shaft 451, and the tip end member 455 match each other.

Next, how the end member 430 can be deformed, move, and rotate, will be described.

In the postures illustrated in FIG. 39, the entire shaft member 450 is in a posture of being protruded the most from the bearing member 440 within a possible range, by the tip end member elastic member 65 and the rotating shaft elastic member 66. When external force is not applied to the shaft member 450, the end member 430 is in this posture.

From this posture, as illustrated by an arrow XXXXa in FIG. 39, when the rotating force around the shaft line is applied to the rotating force receiving member 58 of the tip end member 455, following this, the shaft 457 rotates, and further, the projection 456 also rotates around the shaft line. Accordingly, since the projection 456 is engaged with the side surface of the spiral groove 452, the side surface is pressed, and as illustrated by an arrow XXXXb in FIG. 39, the rotating shaft 451 also rotates. Furthermore, in the rotating shaft 451, since the pin 67 is engaged with the straight line groove 447 of the bearing member 440, as illustrated by an arrow XXXXc in FIG. 39, the bearing member 440 also rotates. Therefore, the end member 430 rotates around the shaft line.

Meanwhile, when the tip end member 455 rotates as illustrated by an arrow XXXXa in FIG. 39, since the projection 456 moves in the spiral groove 452 as illustrated by a straight line arrow in FIG. 40(*b*), a force which moves the tip end member 455 in the shaft line direction is also generated, and the tip end member 455 also moves in the shaft line direction as illustrated by an arrow XXXXd in FIG. 39.

Figure 41:
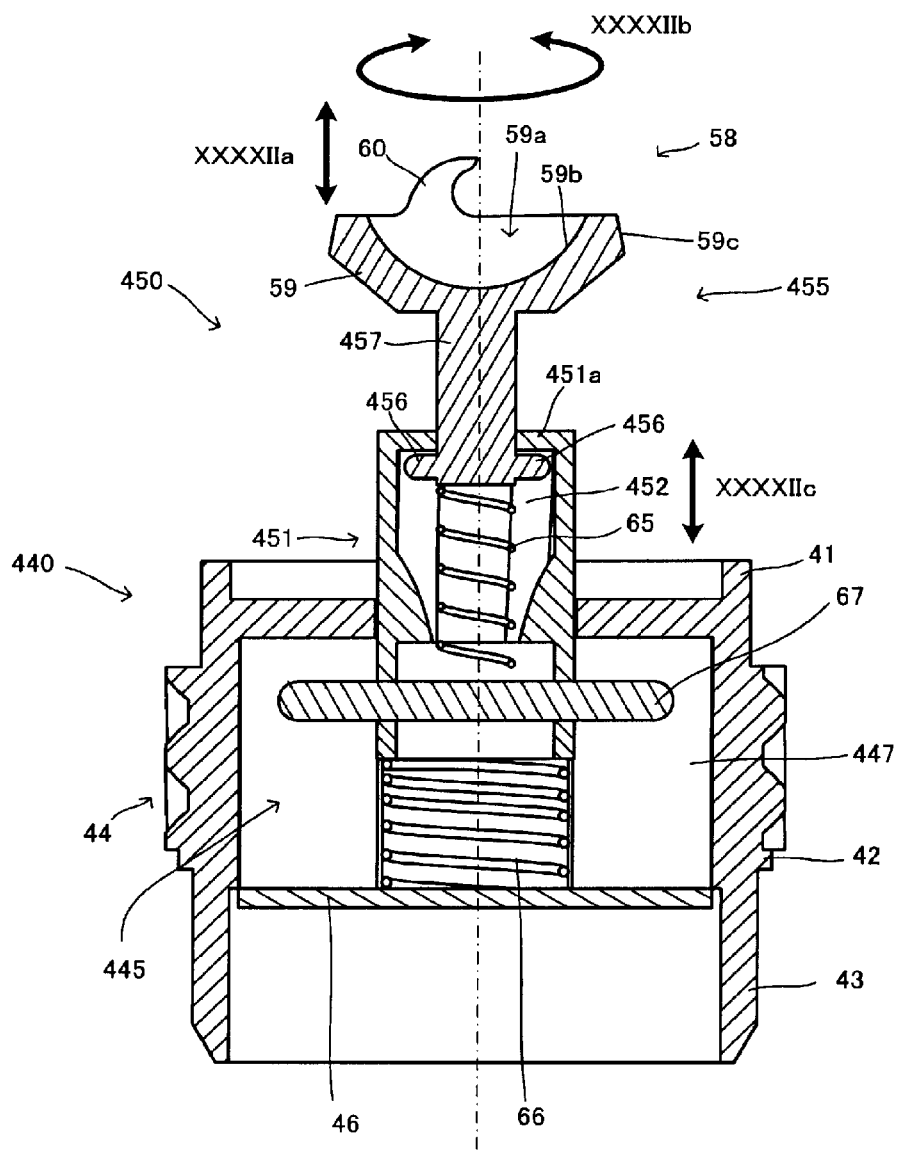
FIG. 41 is a sectional view in the shaft line direction of the end member 430.

In addition to the description above, the end member 430 can also be deformed as follows. FIG. 41 is a view illustrating this. In other words, in the end member 430, when the force is applied in the shaft line direction to the rotating force receiving member 58 of the tip end member 455 as illustrated by an arrow XXXXIIa in FIG. 41, and when the projection 456 of the tip end member 455 moves in the spiral groove 452, the tip end member 455 rotates around the shaft line as illustrated by an arrow XXXXIIb in FIG. 41, and the rotating shaft 451 moves in the shaft line direction as illustrated by an arrow XXXXIIc in FIG. 41.

According to the movement and the rotation by the end member 430, similar effects to those of the end member 30 are achieved. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

Figure 42:
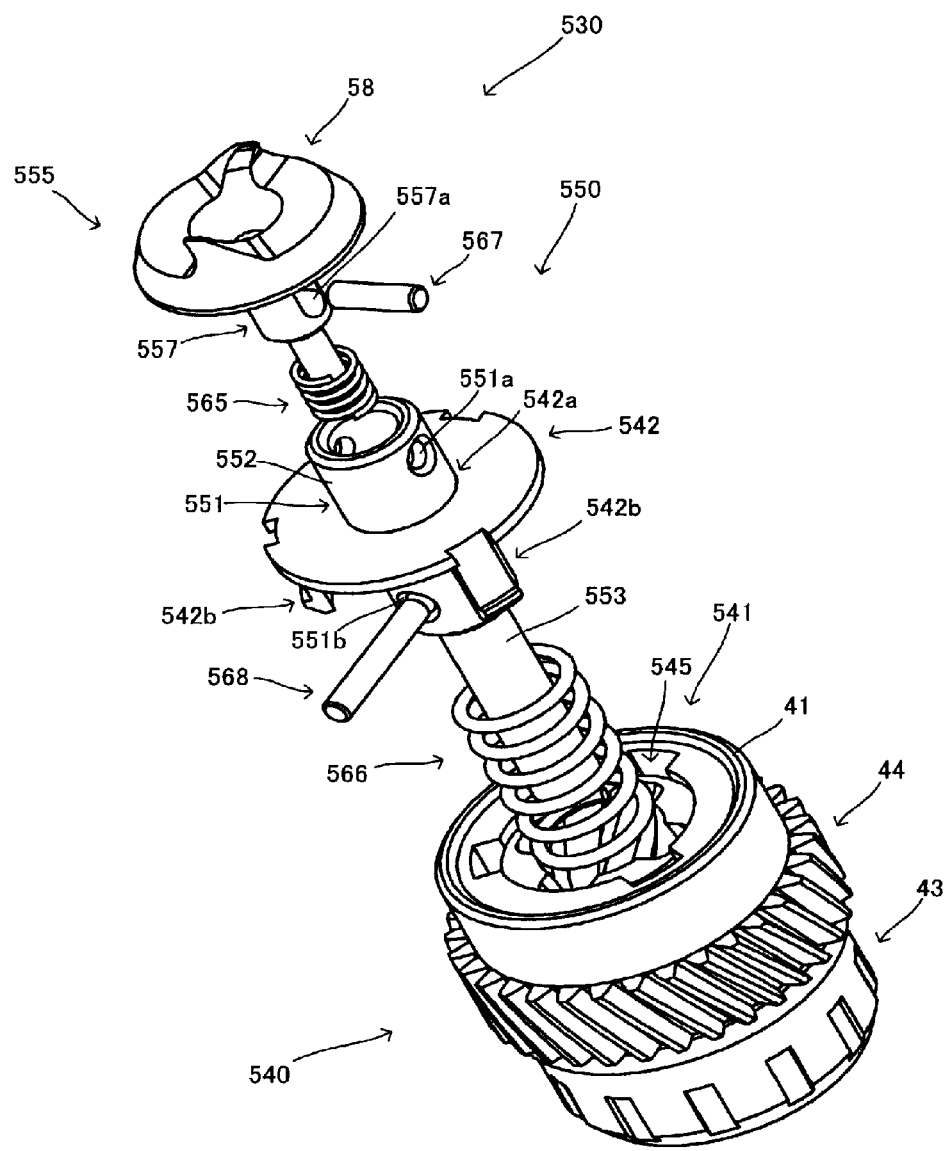
FIG. 42 is an exploded perspective view of an end member 530.
Figure 43:
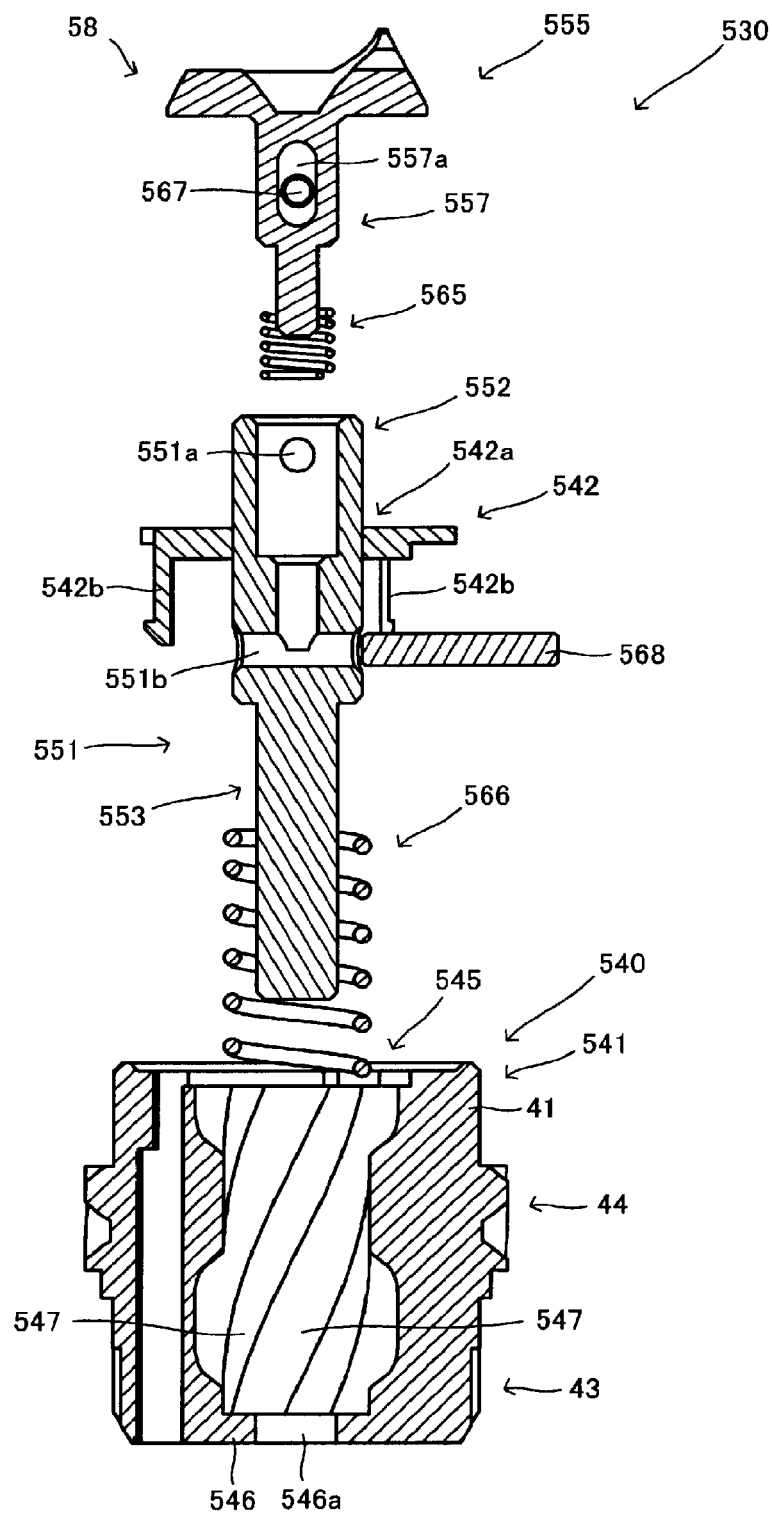
FIG. 43 is an exploded sectional view of the end member 530.
Figure 44:
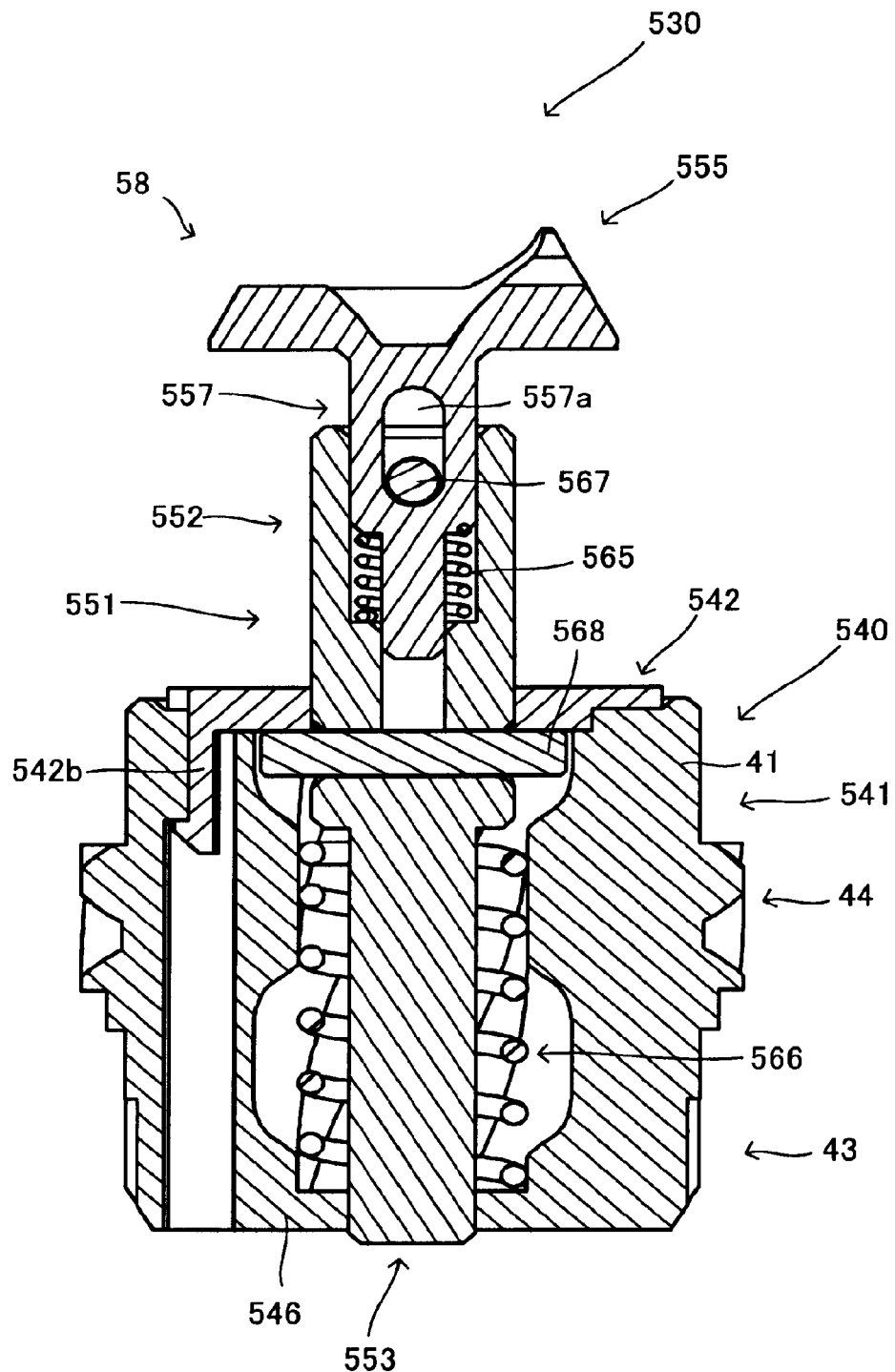
FIG. 44 is a sectional view of the end member 530.

Next, the fourth aspect will be described. FIG. 42 is an exploded perspective view of an end member 530 included in the fourth aspect, and FIG. 43 is an exploded sectional view along the shaft line direction of the end member 530. FIG. 44 is a sectional view along the shaft line direction of the end member 530 in which each member is combined. Similar to the end member 30, the end member 530 is a member attached to the end portion opposite to the above-described lid material 20 in the end portion of the photoreceptor drum 11, and is provided with a bearing member 540 and a shaft member 550.

The bearing member 540 is a member which is bonded to the end portion of the photoreceptor drum 11 in the end member 530. The bearing member 540 includes a main body 541 and a lid member 542, and the main body 541 includes the tubular body 41, the fitting portion 43, the gear portion 44, and a shaft member holding portion 545.

Since the tubular body 41, the fitting portion 43, and the gear portion 44 are similar to those in the above-described end member 30, the same reference numerals will be given, and the description thereof will be omitted.

The shaft member holding portion 545 is a part which is formed on the inner side of the tubular body 41, and which has a function of ensuring a predetermined operation of the shaft member 550, and holding the shaft member 550 in the bearing member 540, and functions as one of means for moving and rotating the rotating force receiving member 58. The shaft member holding portion 545 includes a bottom plate 546 and a spiral groove 547 which functions as a spiral portion.

The bottom plate 546 is a disk-like member, and is disposed to block and partition at least a part of the inner side of the tubular body 41. Accordingly, a rotating shaft elastic member 566 is supported. In the aspect, a hole 546a is formed in the center portion thereof. A columnar member 553 of a rotating shaft 551 is inserted into the hole 546a. The attachment of the bottom plate 546 to the tubular body 41 can be performed by adhering or welding. In addition, the tubular body 41 and the bottom plate 546 may be integrally formed.

The spiral grooves 547 are a plurality of spiral grooves which function as a part formed in a spiral shape, and are formed on the inner surface of the tubular body 41, and can be formed according to the same idea as that of the spiral groove 47 of the above-described end member 30. One end of the spiral groove 547 in the longitudinal direction is blocked by the bottom plate 546, and the other end opposite thereto is blocked by the lid member 542.

The lid member 542 is a disk-like member which is disposed on the side opposite to the bottom plate 546 nipping the shaft member holding portion 545, and the hole 542a is formed at the center thereof. In the aspect, a claw 542b is provided, is engaged with the main body 541, and is fixed in a so-called snap-fit manner. However, means of fixing the lid member is not limited thereto, and the adhesive or welding by heat or ultrasound wave can be used as another means.

A material which configures each member of the bearing member 540 is not particularly limited, but various types of resin or metal can be used.

In a case of making the bearing member 540 by the resin, for example, polyacetal, polycarbonate, polyphenylene sulfide (PPS), polyamide imide (PAI), polyetherether ketone (PEEK), polyether imide (PEI), 4F-perfluoro alkyl vinyl ether (PFA), polyether sulfone (PES), liquid crystal polymer (LCP) resin, or polyamide MXD6 (PA-MXD6), can be appropriately used. However, in order to improve the rigidity of the member, the glass fiber, the carbon fiber, or the inorganic filler may be mixed into the resin in accordance with the load torque. In addition, by inserting metal into the resin, the rigidity may further be improved.

In addition, in order to make the attachment or the movement of the shaft member smooth, sliding properties may be improved by containing at least one type of a fluororesin, polyethylene, and silicon rubber in the resin. In addition, the resin may be coated with fluororesin or lubricant.

Meanwhile, in a case of making the bearing member 540 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the bearing member 540 and any of member included in the bearing member 540, may be made by bending a metal plate, or may be made by making the metal, glass, or carbon fiber infiltrate into the resin.

The shaft member 550 is provided with the rotating shaft 551 and a tip end member 555. Furthermore, the shaft member 550 is provided with a tip end member elastic member 565, the rotating shaft elastic member 566, a pin 567 and a pin 568. Both of the tip end member elastic member 565 and the rotating shaft elastic member 566 in the aspect are a coiled spring.

Hereinafter, each of the members will be described.

The rotating shaft 551 is a rotating force transmission portion which transmits the rotating force received by the tip end member 555 to the bearing member 540, and is a shaft-like member which functions as means for moving and rotating the rotating force receiving member 58.

In the rotating shaft 551, a cylindrical member 552 and the columnar member 553 are coaxially linked to each other. The inner side of the cylinder has the size by which a shaft 557 of the tip end member 555 and the tip end member elastic member 565 can be inserted. In the rotating shaft 551, two holes 551a which penetrate in the direction orthogonal to the shaft line direction are formed at the cylindrical parts. Two holes 551a are disposed on one diameter of the cylindrical member 552.

In addition, in the rotating shaft 551, a hole 551b which penetrates in the direction orthogonal to the shaft line direction is formed in the end portion on the columnar member 553 side in the end portion in the shaft line direction of the cylindrical member 552. Two holes 551a are disposed on one diameter of the cylindrical member 552.

The tip end member 555 is a member which receives the rotation driving force from the apparatus main body 2 (refer to FIG. 1) and transmits the driving force to the rotating shaft 551. The tip end member 555 is configured to include the shaft 557 and a rotating force receiving member 58.

The shaft 557 is a pillar-like member, and is a column in the aspect. In addition, in the shaft 557, a long hole 557a which penetrates in the direction orthogonal to the shaft line is formed. The longitudinal direction of the long hole 557a is the direction along the shaft line. In addition, in the aspect, the end portion opposite to the rotating force receiving member 58 in the shaft 557 is formed to be narrow.

Since the rotating force receiving member 58 is similar to the above-described end member 30, the description thereof will be omitted.

The tip end member elastic member 565 and the rotating shaft elastic member 566 are so-called elastic members, and both of the tip end member elastic member 565 and the rotating shaft elastic member 566 function as means for moving and rotating the rotating force receiving member 58. In the aspect, the tip end member elastic member 565 and the rotating shaft elastic member 566 are coiled springs. In addition, a pin 567 is means for holding the tip end member 555 to be movable along the shaft line direction in the rotating shaft 551. In addition, the pin 568 is means for holding the rotating shaft 551 in the bearing member 540, moving and rotating along the spiral groove 547, and moving and rotating the rotating shaft 551.

A material which configures each member of the shaft member 550 is not particularly limited, but various types of resin or metal can be used.

In a case of making the shaft member 550 by the resin, for example, polyacetal, polycarbonate, polyphenylene sulfide (PPS), polyamide imide (PAT), polyetherether ketone (PEEK), polyether imide (PEI), 4F-perfluoro alkyl vinyl ether (PFA), polyether sulfone (PES), liquid crystal polymer (LCP) resin, or polyamide MXD6 (PA-MXD6), can be appropriately used. However, in order to improve the rigidity of the member, the glass fiber, the carbon fiber, or the inorganic filler may be mixed into the resin in accordance with the load torque. In addition, by inserting metal into the resin, the rigidity may further be improved.

Meanwhile, in a case of making the shaft member 550 by metal, carving by cutting, aluminum die casting, zinc die casting, a metal powder injection molding method (so-called MIM method), or a metal powder sintering lamination method (so-called 3D printing), can be employed. In addition, regardless of the material of the metal, iron, stainless steel, aluminum, brass, copper, zinc, or an alloy of the materials, may be used. In addition, it is possible to improve functionality (lubrication properties or corrosion resistance) of the surface by performing various types of plating.

In addition, from the viewpoint of having elasticity, the shaft member 550 and any member included in the shaft member 550, may be made by bending a metal plate, or may be made by making the metal, glass, or carbon fiber infiltrate into the resin.

By combining the bearing member 540 and the shaft member 550 with each other as follows, the end member 530 is made. In addition, by describing the combination, the size of each member and part, the structure, or the relationship of the sizes of the members and parts, are further understood.

As can be ascertained from FIG. 44, the shaft 557 of the tip end member 555 is disposed on the inner side of the cylindrical member 552 of the rotating shaft 551, and the pin 567 passes through the long hole 551a of the rotating shaft 551 and the hole 557a of the tip end member 555. Accordingly, the tip end member 555 is held in the rotating shaft 551. At this time, the tip end member elastic member 565 is disposed on the inner side of the cylindrical member 552, and accordingly, the tip end member 555 is biased in the projecting direction from the rotating shaft 551.

In this manner, in the rotating shaft 551 combined by the tip end member 555, the tip end member elastic member 565, and the pin 567, the columnar member 553 which is on the side on which the tip end member 555 is not disposed is inserted toward the bottom plate 546 side of the shaft member holding portion 545 formed on the inner side of the main body 541 of the bearing member 540. At this time, the pin 568 is inserted into the hole 551b of the rotating shaft 551, and each of both ends of the pin 568 is disposed to protrude from the side surface of the rotating shaft 551. In addition, the protruded end portion of the pin 568 is disposed in the groove of the spiral groove 547 of the bearing member 540. In addition, the columnar member 553 passes through the hole 546a of the bottom plate 546. In addition, the rotating shaft elastic member 566 is disposed between the bottom plate 546 and the columnar member 553, and the rotating shaft 551 is biased toward the tip end member 555 side.

In addition, the lid member 542 is disposed, and the rotating shaft 551 is held in the bearing member 540. At this time, since the cylindrical member 552 in the rotating shaft 551 is disposed in a hole 542a of the lid member 542, and the pin 568 cannot pass through the hole 542a, the rotating shaft 551 is held in a state of being biased without falling out of the bearing member 540.

Above, in the posture in which each member is combined, the shaft lines of the bearing member 540, the rotating shaft 551, and the tip end member 555 match each other.

According to the above-described end member 530, the relationship between the spiral groove 547 and the pin 568 acts in accordance with the example of the relationship between the spiral groove 47 and the pin 67 in the end member 30, and the end member 530 can also operate similar to the end member 30. In addition, the tip end member 555 can move in the shaft line direction with respect to the rotating shaft 551 regardless of the rotation of the shaft member 550. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

Figure 45:
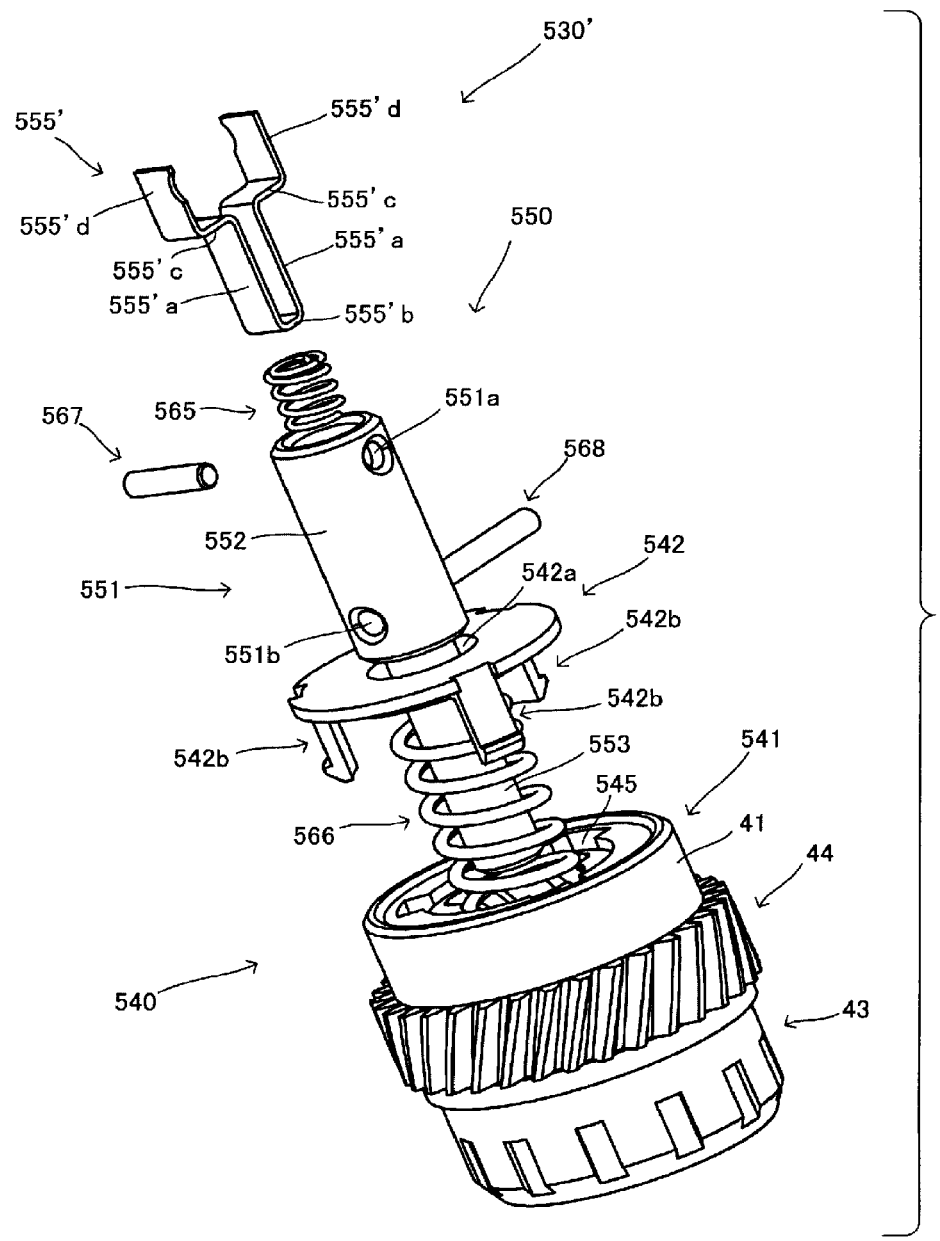
FIG. 45 is an exploded perspective view of an end member 530'.
Figure 46:
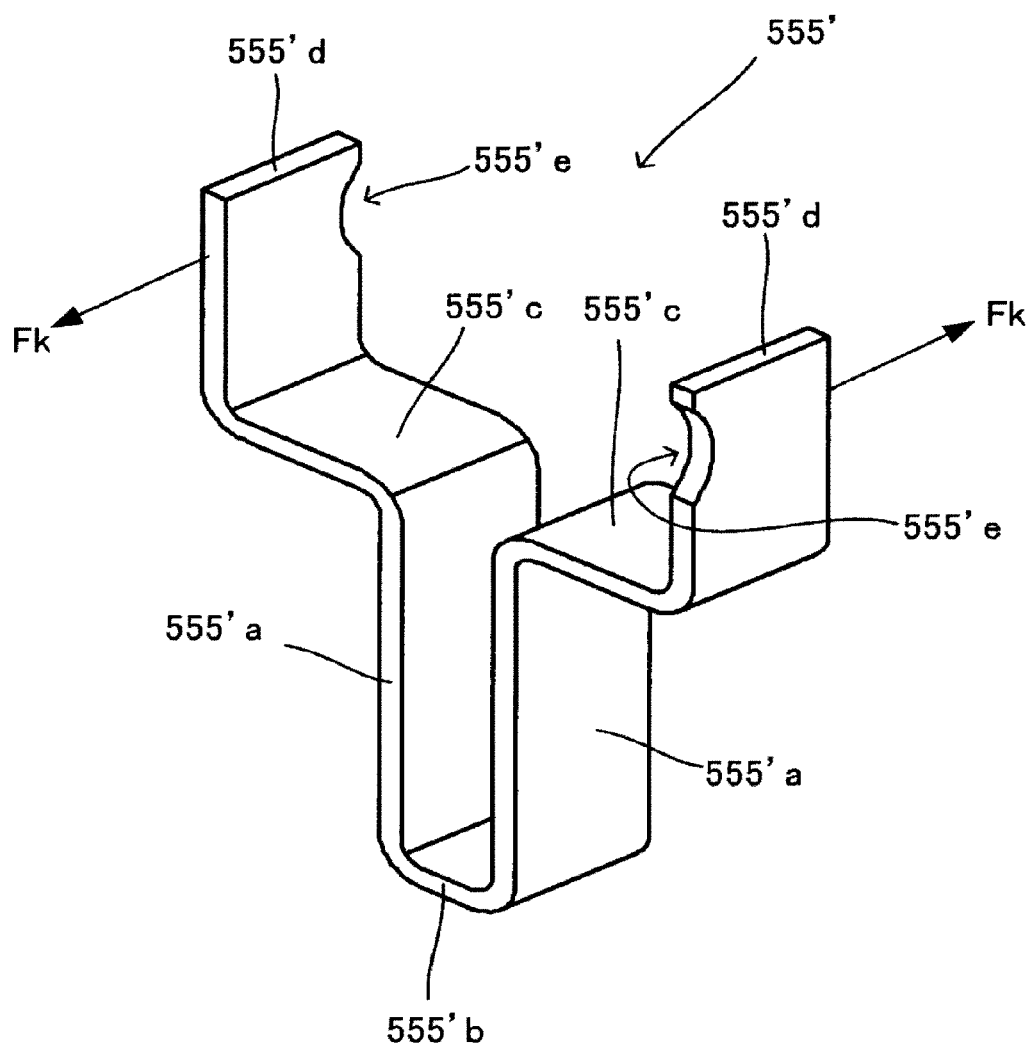
FIG. 46 is a perspective view of a tip end member 555'.

FIG. 45 is an exploded perspective view of an end member 530' which is a modification example of the end member 530. In the end member 530' of the example, instead of the tip end member 555 of the end member 530, a tip end member 555' is employed. Here, the tip end member 555' will be described. FIG. 46 is a perspective view of the tip end member 555'. Other parts are the same as the end member 530.

As can be ascertained from FIGS. 45 and 46, the tip end member 555' has an aspect in which one long plate is formed to be folded, and functions as the rotating force receiving member. The shape is as follows.

The tip end member 555' includes two base plates 555'a in which plate surfaces on one side are disposed substantially in parallel at a predetermined interval, and end portions on one side of two base plates 555'a are linked to each other by a linking plate 555'b. Interval expansion plates 555'c which are plate-like members that extend in the direction of being separated, are disposed from each of the end portions (other end portions) opposite to the side which is linked by the linking plate 555'b of two base plates 555'a. In addition, an engaging plate 555'd which functions as an engaging member that extends in the direction of being separated from the base plate 555'a, is disposed from the tip end of the interval expansion plate 555'c. Therefore, two engaging plates 555'd are substantially parallel at a predetermined interval so that the plate surfaces thereof oppose each other.

Here, in the engaging plate 555'd, a hollow 555'e is provided at least in one end portion in the plate width direction. Here, the engaging projection 72 of the above-described driving shaft 70 (refer to FIG. 15(a)) is disposed to bump into the hollow 555'e. Therefore, two hollows 555'e are disposed on the opposite side in the plate width direction. In addition, the interval of two engaging plate 555'd is the interval by which the tip end of the shaft portion 71 of the driving shaft 70 can get into.

The tip end member 555' is formed of a material having excellent elasticity. For example, stainless steel or phosphor bronze can be employed. In addition, the metal maximizes an elastic limit by low sound annealing (tempering treatment), and can improve spring properties.

Figure 47:
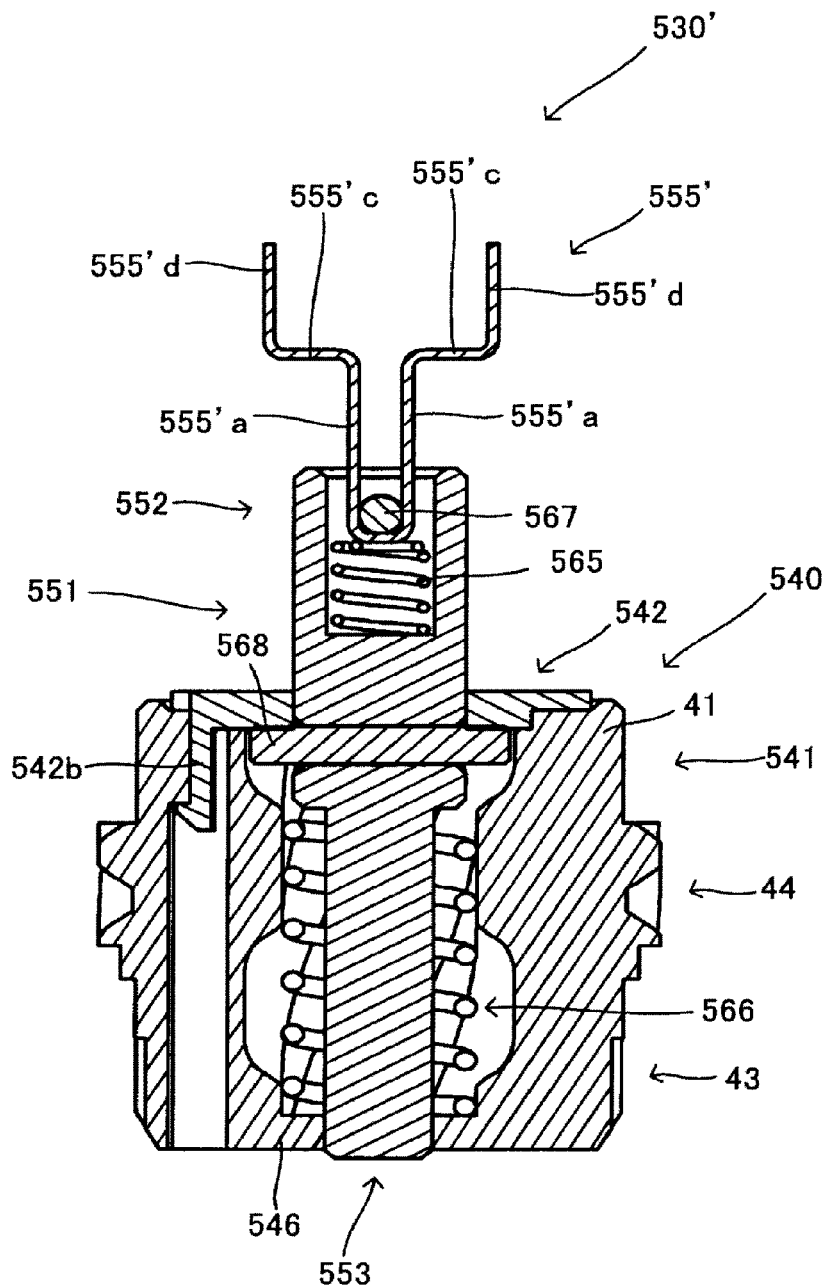
FIG. 47 is a sectional view along a shaft line of the end member 530'.

FIG. 47 is a sectional view along the shaft line of the end member 530'. As can be ascertained from FIG. 47, in the aspect, as the pin 567 is inserted into between two base plates 555'a of the tip end member 555', the pin 567 is held in the cylindrical member 552.

Figure 48:
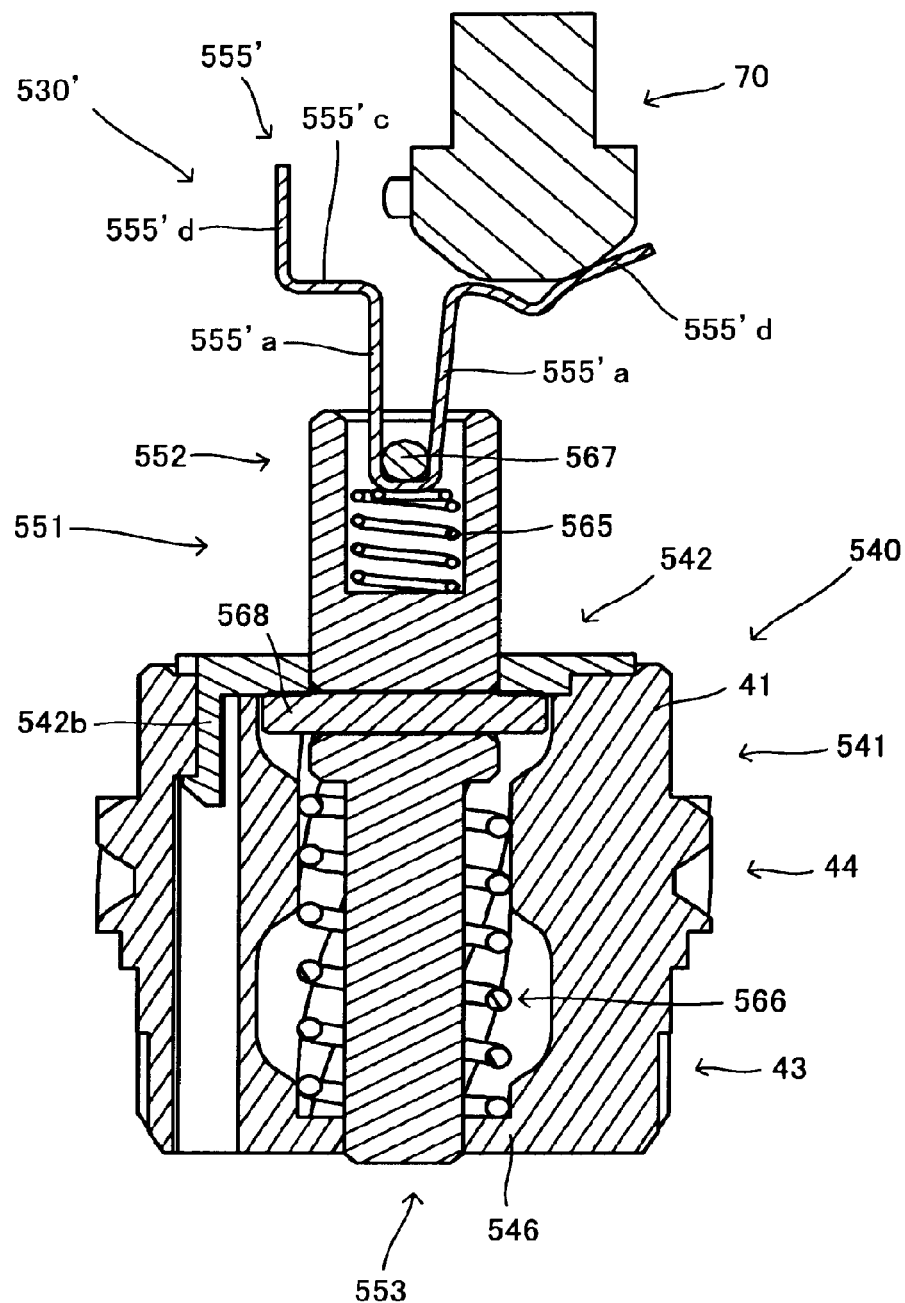
FIG. 48 is another sectional view along the shaft line of the end member 530'.

According to the end member 530', in addition to the effects similar to the above-described end member 530, as illustrated in FIG. 48, the engaging plate 555'd is elastically deformed and smoothly disengaged when being disengaged from the driving shaft 70. In addition, when the rotating force is transmitted in a state where the driving shaft 70 is engaged with the end member 530', as illustrated by Fk in FIG. 46, since the rotating force is transmitted in the plate width direction of the engaging plate 555'd, the rotating force is appropriately transmitted without largely deforming the engaging plate 555'd.

Any of the end members in each aspect described above can perform both the operation (for example, refer to FIG. 11) in which the shaft member moves in the shaft line direction as the shaft member rotates around the shaft line, and an operation (for example, refer to FIG. 14) in which the rotating force receiving member moves in the shaft line direction regardless of the rotation, by the action of the part formed in a spiral shape. Regarding this, only the "operation in which the shaft member moves in the shaft line direction as the shaft member rotates around the shaft line" may be performed by the action of the part formed in a spiral shape, but from the viewpoint of more smooth attachment and detachment of the process cartridge, the "operation in which the rotating force receiving member moves in the shaft line direction regardless of the rotation" may be added as an auxiliary operation. Therefore, in the present invention, only the "operation in which the shaft member moves in the shaft line direction as the shaft member rotates around the shaft line" may be performed. In addition, when the "operation in which the rotating force receiving member moves in the shaft line direction regardless of the rotation" is also employed, it is preferable that a force (for example, an elastic force of the tip end member elastic member 65) by the means which is provided for performing the operation, is weaker than a force (for example, an elastic force of a rotating shaft elastic member 66) by the means which is provided for performing the "operation in which the shaft member moves in the shaft line direction as the shaft member rotates around the shaft line".

Here, next, an example of an aspect which is configured only of the "operation in which the shaft member moves in the shaft line direction as the shaft member rotates around the shaft line" will be described.

Figure 49:
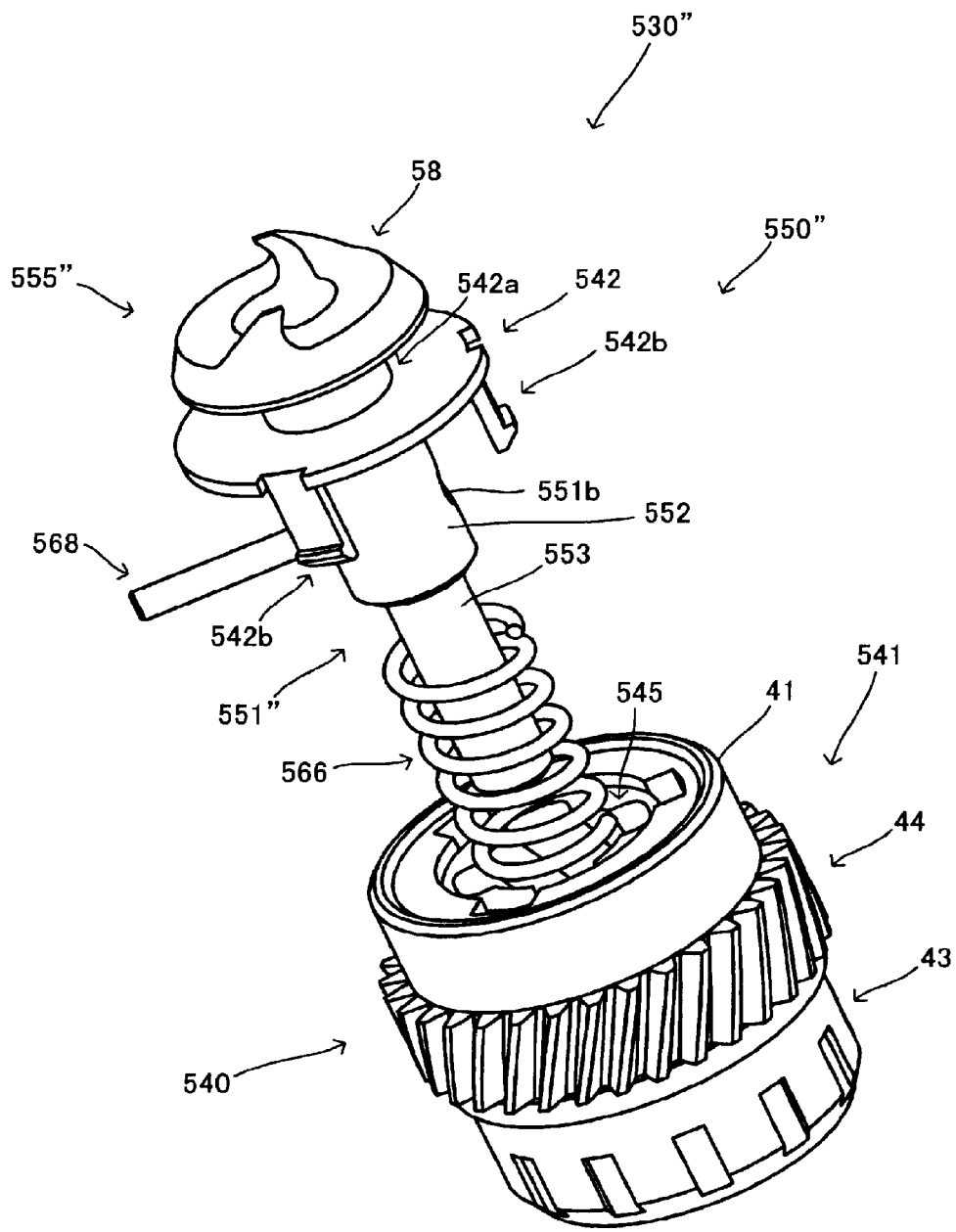
FIG. 49 is an exploded perspective view of an end member 530".
Figure 50:
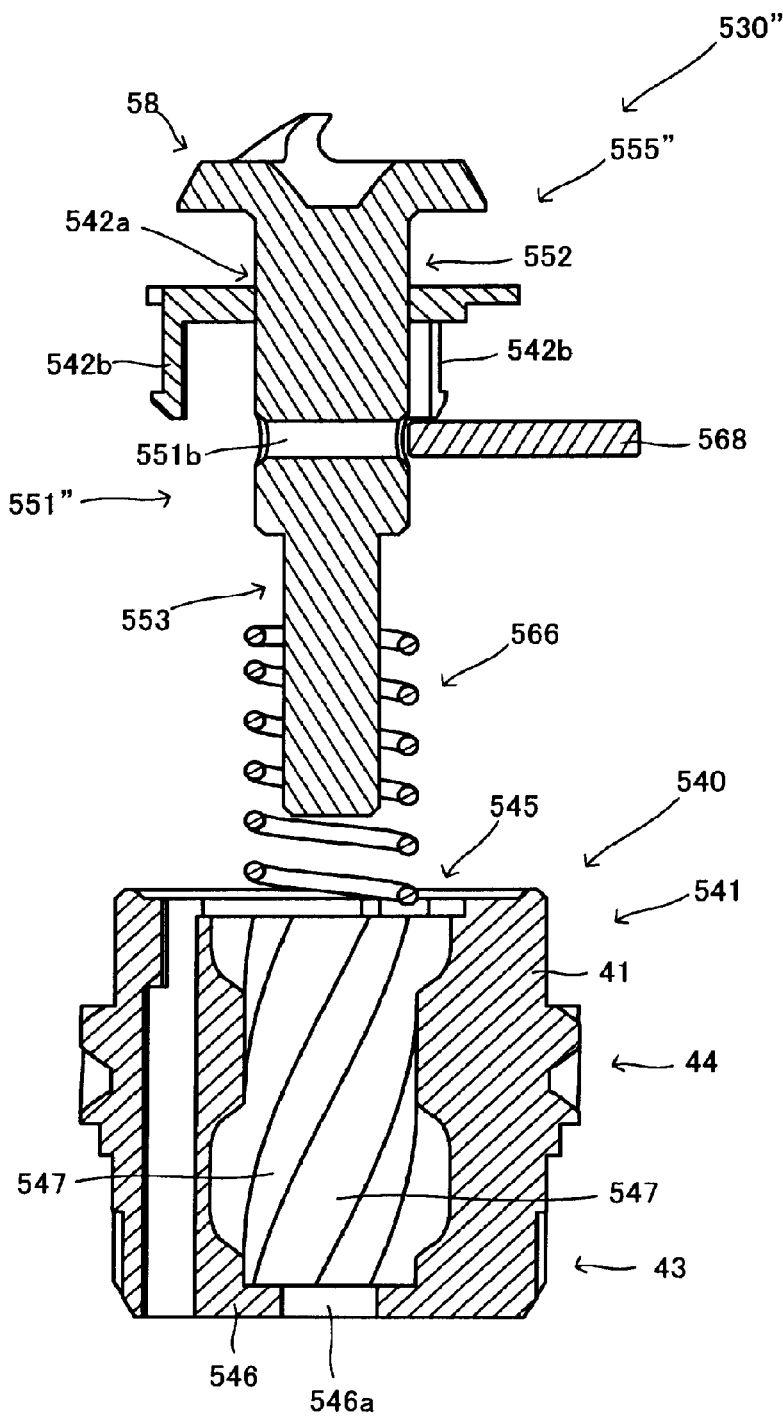
FIG. 50 is an exploded sectional view of the end member 530".
Figure 51:
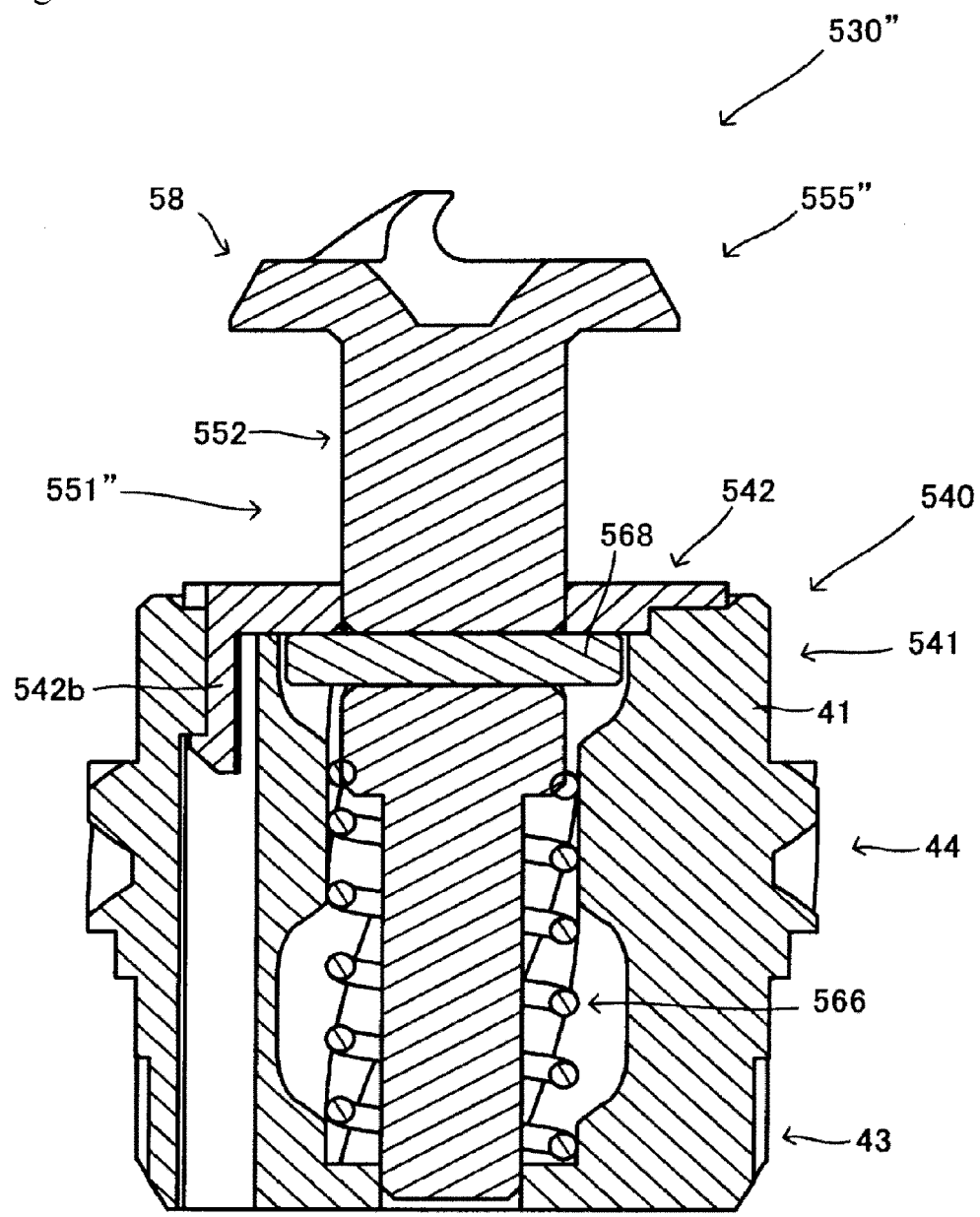
FIG. 51 is a sectional view of the end member 530".

FIGS. 49, 50, and 51 are views illustrating an end member 530" according to another modification example of the end member 530 of the fourth aspect. FIG. 49 is an exploded perspective view of the end member 530". FIG. 50 is an exploded sectional view along the shaft line direction of the end member 530". FIG. 51 is a sectional view along the shaft line direction of the end member 530" in which each member is combined. In the end member 530", a shaft member 550" is employed instead of the shaft member 550 of the end member 530. The bearing member 540 is the same as the bearing member 540 of the end member 530.

The shaft member 550" is formed to be integrated with a rotating shaft 551" and a tip end member 555", and is not provided with the tip end member elastic member 565. Therefore, the rotating shaft 551" and the tip end member 555" cannot relatively move, and move and rotate integrally all the time. Parts except this are the same as the shaft member 550. Therefore, in the example, the "operation in which the rotating force receiving member moves in the shaft line direction regardless of the rotation" cannot be performed, and the shaft member 550" becomes an end member only for performing the "operation in which the shaft member moves in the shaft line direction as the shaft member rotates around the shaft line" by the actions of the spiral groove 547 and the pin 568.

By the end member 530", since the relationship between the spiral groove 547 and the pin 568 can also act in accordance with the relationship between the spiral groove 47 and the pin 67 in the end member 30, the transmission of the rotating force equivalent to that in the related art can be performed, and more smooth attachment to and detachment from the apparatus main body can be performed. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

Figure 52:
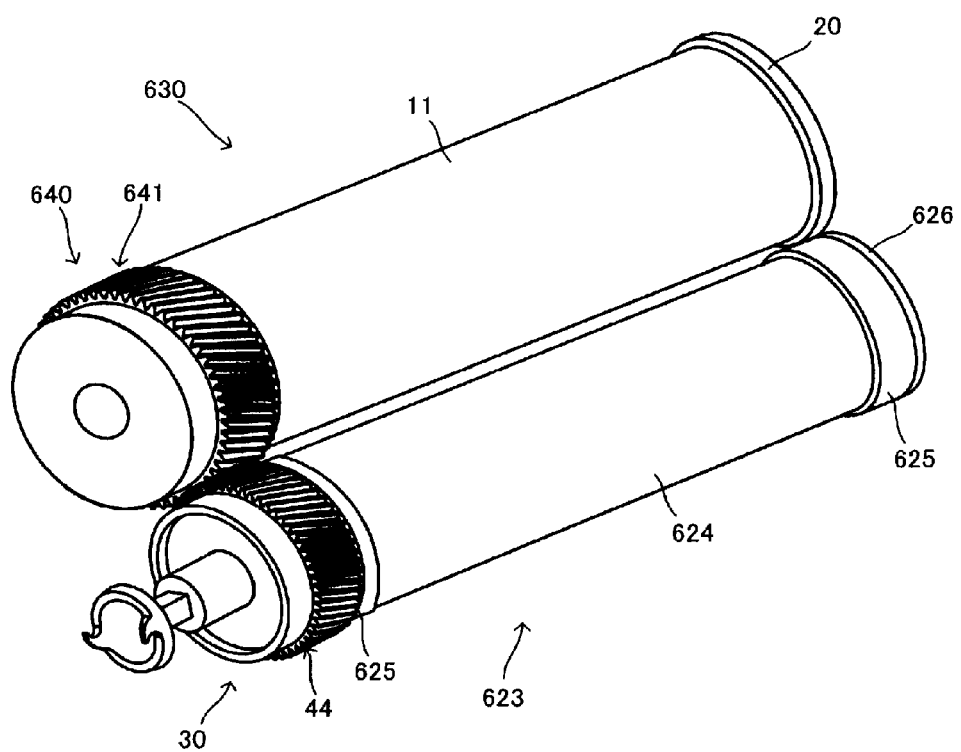
FIG. 52 is a perspective view illustrating an example in which the end member 30 is employed in a developing roller unit.

Above, aspects in which all of the described end members are disposed in the end portion of the photoreceptor drum 11, and accordingly, the photoreceptor drum unit is formed, are described. Meanwhile, as described in FIG. 2, the developing roller unit or the charging roller unit which is provided with another drum-like member is provided in the process cartridge. Here, in all of the end members according to the above-described aspects and the modification examples, instead of being disposed in the photoreceptor drum, it is possible to be employed in the developing roller unit or the charging roller unit and receive the rotation driving force from the apparatus main body. FIG. 52 is one aspect, and illustrates a developing roller unit 623 provided in the end member 30. FIG. 52 is a perspective view of a photoreceptor drum unit 630 which is disposed to be adjacent to the developing roller unit 623, matching the developing roller unit 623.

The developing roller unit 623 is provided with a developing roller 624, a spacer ring 625, a lid material 626, a magnetic roller (not illustrated), and the end member 30. The end member 30 is as the description above. In addition, regarding other members, known members can be employed, but for example, the following configuration is provided.

The developing roller 624 is a member which covers a developing layer on the outer circumferential surface of the columnar rotating body. The developing roller 624 is a conductive cylinder made of aluminum or the like in the aspect, and here, the developing roller 624 is configured to be coated with the material which configures the developing layer.

The spacer ring 625 is a circular member which is disposed to be wound around the outer circumferential surface of each of both ends of the developing roller 624, and accordingly, a void between the developing roller 624 and the photoreceptor drum 11 is held to be constant. The thickness of the spacer ring 625 is approximately from 200 μm to 400 μm.

Similar to the above-described lid material 20, the lid material 626 is disposed on one end side of the developing roller 624, and becomes a bearing for making the developing roller 624 rotate around the shaft line at one end of the developing roller unit 623.

The magnetic roller is not illustrated in FIG. 52 since the magnetic roller is disposed on the inside of the developing roller 624, but a plurality of magnetic poles are disposed along the shaft line by a roller formed of a resin, including a magnetic body or a non-magnetic body. Accordingly, by using magnetism, the developer can be adsorbed on a surface of the developing roller 624.

The end member 30 is as the description above, but the end member 30 is disposed in the end portion opposite to the end portion in which the lid material 626 is disposed among the end portions of the developing roller 624. Here, an example in which the end member 30 is employed is illustrated, but the invention is not limited thereto, and any other end members which are generally described can be employed.

In addition, at this time, the photoreceptor drum unit 630 can be configured, for example, as follows. In other words, the photoreceptor drum unit 630 is provided with the photoreceptor drum 11, the lid material 20 which becomes a bearing for rotating the photoreceptor drum 11 around the shaft line at each of both ends of the photoreceptor drum 11, and an end member 640. At this time, one end member 640 is provided with a gear portion 641 which receives the rotating force being meshed with the gear portion 44 of the end member 30 disposed in the developing roller unit 623.

Above, each end member may be a configuration member included in the developing roller unit, and even in this case, each end member acts similar to those when the end members are provided in the photoreceptor drum unit. In the aspect, the rotating force receiving member is also formed to be inclined similar to the end member, the above-described expressions (1) and (3) are satisfied, and thus further stabilized transmission of the rotating force and the smooth disengagement from the driving shaft are possible.

This application is based upon and claims the benefit of priority from Japanese Patent Application No. 2014-142720, filed Jul. 10, 2014; and Japanese Patent Application No. 2014-163063, filed Aug. 8, 2014 the contents of which are incorporated herein by reference.

REFERENCE SIGNS LIST

1 IMAGE FORMING APPARATUS
2 IMAGE FORMING APPARATUS MAIN BODY (APPARATUS MAIN BODY)
3 PROCESS CARTRIDGE
10 PHOTORECEPTOR DRUM UNIT
11 PHOTORECEPTOR DRUM (COLUMNAR ROTATING BODY)
20 LID MATERIAL
30 END MEMBER
40 BEARING MEMBER
50 SHAFT MEMBER
51 ROTATING SHAFT
55 TIP END MEMBER
58 ROTATING FORCE RECEIVING MEMBER
59 RECEIVING MEMBER
60 ENGAGING MEMBER

The invention claimed is:

1. An end member which is disposed in an end portion of a columnar rotating body mounted on an image forming apparatus main body, the end member comprising:
a tubular bearing member; and
a shaft member held by the tubular bearing member, wherein the shaft member comprises:
a rotating shaft which is disposed coaxially to the tubular bearing member, and which moves in a shaft line direction by rotating around a shaft line with respect to the tubular bearing member; and
a tip end member which is disposed coaxially to the rotating shaft,
wherein the shaft member is further provided with a tip end member elastic member, a rotating shaft elastic member, and a pin,
wherein a rotating force receiving member comprising an engaging member which engages with a driving shaft of the image forming apparatus main body is disposed at a tip end of the tip end member, and
wherein a rotating force around the shaft line is transmitted to the rotating force receiving member, the rotating shaft, and the bearing member, in this order, and the rotating force receiving member moves to be inclined with respect to the shaft line.

2. The end member according to claim 1, wherein the rotating shaft and/or the tip end member move in the shaft line direction regardless of the rotation around the shaft line of the shaft member.

3. The end member according to claim 1, wherein a range where the rotating force receiving member moves to be inclined with respect to the shaft line is larger than 0° and equal to or smaller than 18°.

4. The end member according to claim 1, wherein a range where the rotating force receiving member moves to be inclined with respect to the shaft line is larger than 0° and equal to or smaller than 10°.

5. The end member according to claim 1, wherein the engaging member comprises an inclined surface inclined to the shaft line direction or a curved surface.

6. The end member according to claim 1, wherein a recessed portion with which the driving shaft is engaged is formed in the engaging member.

7. The end member according to claim 1, wherein a part formed in a spiral shape is contained on an inner surface of the tubular bearing member, wherein a member which moves inside the part formed in the spiral shape is included in the rotating shaft, and wherein the rotating shaft moves in the shaft line direction by rotating around the shaft line with respect to the tubular bearing member.

8. A photoreceptor drum unit comprising a photoreceptor chum which is a columnar rotating body; and the end member according to claim 1 which is disposed in at least one end portion of the photoreceptor chum.

9. A process cartridge comprising:
a housing; and
the photoreceptor drum unit according to claim 8 which is held by the housing.

10. A developing roller unit comprising a developing roller which is a columnar rotating body; and the end member according to claim 1 which is disposed in at least one end portion of the developing roller.

11. A process cartridge comprising:
a housing; and
the developing roller unit according to claim 10 which is held by the housing.

12. The end member according to claim 1, wherein the tip end member elastic member and the rotating shaft elastic member form a coiled spring.

* * * * *